United States Patent
Akiyama et al.

(10) Patent No.: US 11,370,299 B2
(45) Date of Patent: Jun. 28, 2022

(54) POWER TRANSMISSION DEVICE

(71) Applicant: TOYOTA JIDOSHA KABUSHIKI KAISHA, Aichi-ken (JP)

(72) Inventors: Yosuke Akiyama, Susono (JP); Akira Ijichi, Odawara (JP); Taichi Kobayashi, Susono (JP); Koji Takaira, Okazaki (JP); Akinori Homan, Toyota (JP); Yohei Habata, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/177,207

(22) Filed: Feb. 17, 2021

(65) Prior Publication Data
US 2021/0260995 A1 Aug. 26, 2021

(30) Foreign Application Priority Data

Feb. 20, 2020 (JP) .............................. JP2020-027579
Dec. 16, 2020 (JP) .............................. JP2020-208851

(51) Int. Cl.
*F16H 48/10* (2012.01)
*B60K 17/346* (2006.01)
*F16H 48/36* (2012.01)

(52) U.S. Cl.
CPC ......... *B60K 17/3462* (2013.01); *F16H 48/10* (2013.01); *F16H 48/36* (2013.01); *F16H 2048/364* (2013.01)

(58) Field of Classification Search
CPC ...... B60K 17/3462; F16H 48/10; F16H 48/36
See application file for complete search history.

(56) References Cited

U.S. PATENT DOCUMENTS 6,589,128 B2 * 7/2003 Bowen .................... B60K 6/52
475/5
8,888,638 B2 11/2014 Mueller et al.
2003/0085062 A1 5/2003 Bowen

FOREIGN PATENT DOCUMENTS

DE 102017211749 A1 1/2019
GB 2219363 A 12/1989
WO 2010141682 A1 12/2010

* cited by examiner

*Primary Examiner* — Derek D Knight
(74) *Attorney, Agent, or Firm* — Hauptman Ham, LLP

(57) ABSTRACT

A power transmission device include: a differential having three rotational elements; and a connection switching device that selectively switches a connection relationship among an input shaft, a first output shaft, a second output shaft, and the three rotational elements. Further, the connection switching device selectively fixes any one rotational element to a fixing member, the second power source is coupled to rotational elements other than the rotational element fixed to the fixing member, the differential can be switched between modes including a first mode where any one rotational element among the three rotational elements is coupled to the input shaft, one of the remaining rotational elements is fixed to the fixing member, and the other is coupled to the first output shaft, and a second mode where the three rotational elements are respectively coupled to the second power source, the first output shaft, and the second output shaft.

20 Claims, 32 Drawing Sheets

POWER TRANSMISSION DEVICE

CROSS-REFERENCE TO RELATED APPLICATION(S)

The present application claims priority to and incorporates by reference the entire contents of Japanese Patent Application No. 2020-027579 filed in Japan on Feb. 20, 2020 and Japanese Patent Application No. 2020-208851 filed in Japan on Dec. 16, 2020.

BACKGROUND

The present disclosure relates to a power transmission device.

As a power transmission device mounted on a vehicle, a transfer that distributes and transmits power from an engine (first power source) to front wheels and rear wheels has been known. An output side of the transfer is coupled to a front-wheel propeller shaft and a rear-wheel propeller shaft. Then, the transfer can be switched between a two-wheel driving state in which power is output only to one propeller shaft and a four-wheel driving state in which power is output to both propeller shafts.

International Publication WO2010/141682 discloses that, in a transfer including an auxiliary power source (second power source) in a transfer case, power output from the second power source is transmitted to front wheels and rear wheels via one planetary gear device (differential). In the configuration described in International Publication WO2010/141682, by fixing one rotational element among three rotational elements included in the differential to the transfer case (fixing member), it is possible to cause the differential to function as a transmission, and to transmit a rotation of the first power source to an output member while changing a speed thereof by the differential.

In a case where a rotational element of a differential is fixed while two power sources are connected to the differential, power of the two power sources cannot be transmitted to an output shaft in a power transmission device in which a rotational element that can be fixed to a fixing member and a rotational element connected to any of the power sources are configured to be identical in a manner of a configuration described in International Publication WO2010/141682.

SUMMARY

There is a need for providing a power transmission device that can transmit power of one power source to drive wheels in a state in which one rotational element among three rotational elements included in a differential is fixed to a fixing member.

According to an embodiment, a power transmission device included: an input shaft that inputs power from a first power source; a second power source; a first output shaft that transmits power to first drive wheels; a second output shaft that transmits power to second drive wheels; a differential having three rotational elements; and a connection switching device that selectively switches a connection relationship among the input shaft, the first output shaft, the second output shaft, and the three rotational elements. Further, the connection switching device is configured to selectively fix any one rotational element among the three rotational elements to a fixing member, the second power source is coupled to rotational elements other than the rotational element fixed to the fixing member by the connection switching device among the three rotational elements, the differential can be switched between a plurality of modes by the connection switching device, and the plurality of modes includes a first mode in which any one rotational element among the three rotational elements is coupled to the input shaft, one of the remaining rotational elements is fixed to the fixing member, and the other is coupled to the first output shaft, and a second mode in which the three rotational elements are respectively coupled to the second power source, the first output shaft, and the second output shaft.

DETAILED DESCRIPTION

In the following, a power transmission device in embodiments of the present disclosure will be described in detail with reference to the drawings. Note that the present disclosure is not limited to the embodiments described in the following.

Figure 1:
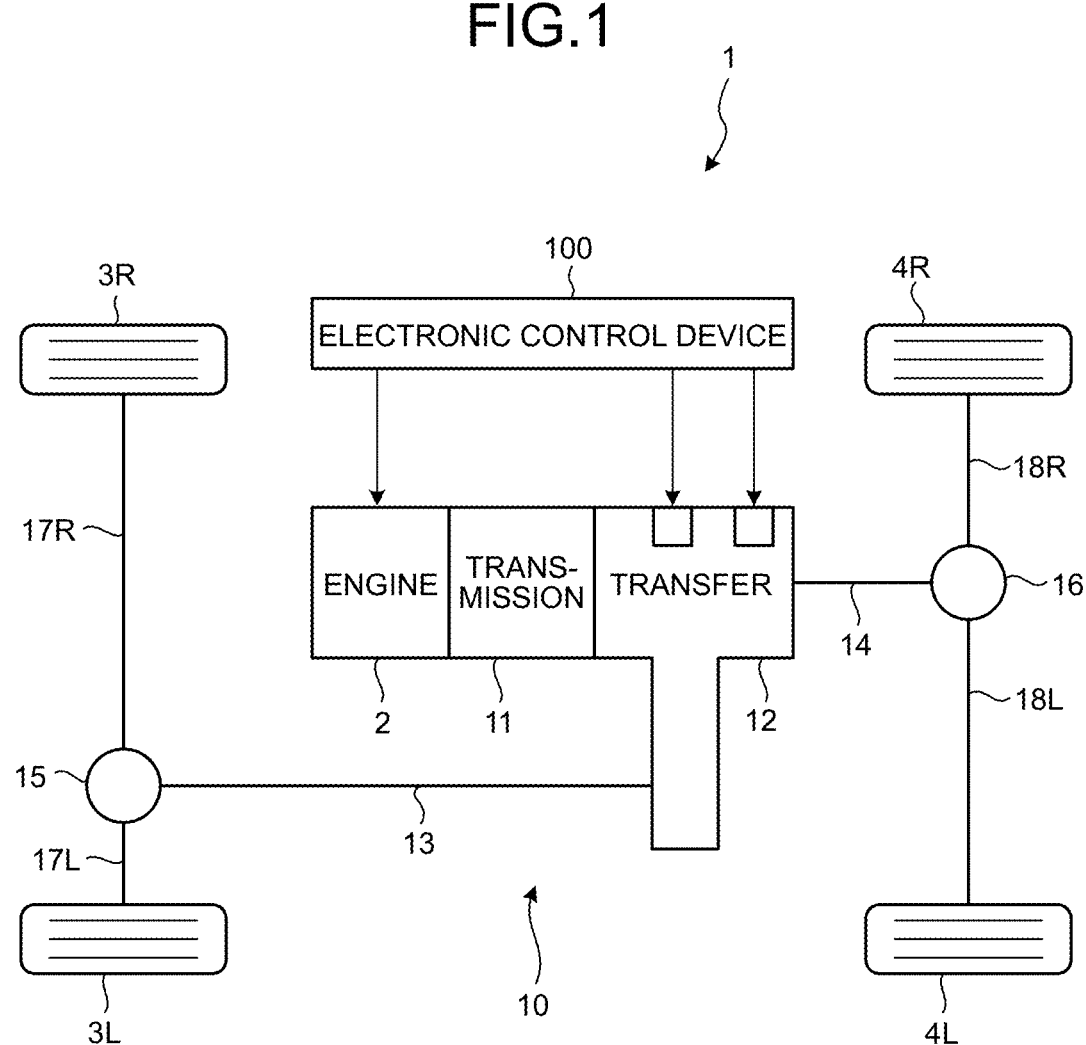
FIG. 1 is a skeleton diagram schematically illustrating a vehicle equipped with a power transmission device of a first embodiment.

FIG. 1 is a skeleton diagram schematically illustrating a vehicle equipped with a power transmission device of a first embodiment. A vehicle 1 includes an engine 2 as a power source, left and right front wheels 3L and 3R, left and right rear wheels 4L and 4R, and a power transmission device 10 to respectively transmit power of the engine 2 to the front wheels 3 and the rear wheels 4. This vehicle 1 is a four-wheel-drive vehicle based on front-engine rear-wheel drive. The rear wheels 4 are main drive wheels that serve as drive wheels during both two-wheel-drive traveling and four-wheel-drive traveling. On the one hand, the front wheels 3 are auxiliary drive wheels, and become driven wheels during two-wheel-drive traveling and become drive wheels during four-wheel-drive traveling.

The power transmission device 10 includes a transmission 11 coupled to the engine 2, a transfer 12 that is a front/rear wheel power distribution device coupled to the transmission 11, a front propeller shaft 13 and rear propeller shaft 14 that are respectively coupled to the transfer 12, a front-wheel differential gear mechanism 15 coupled to the front propeller shaft 13, a rear-wheel differential gear mechanism 16 coupled to the rear propeller shaft 14, left and right front wheel axles 17L and 17R coupled to the front-wheel differential gear mechanism 15, and left and right rear wheel axles 18L and 18R coupled to the rear-wheel differential gear mechanism 16. Note that wheels and axles are described as front wheels 3, rear wheels 4, front wheel axles 17, and rear wheel axles 18 with the reference signs L and R being omitted in a case where the left and right thereof are not specifically distinguished.

The power output from the engine 2 is transmitted to the transfer 12 via the transmission 11. Then, the power transmitted to the transfer 12 is transmitted from the transfer 12 to the rear wheels 4 serially through a rear wheel-side power transmission path of the rear propeller shaft 14, the rear-wheel differential gear mechanism 16, and the rear wheel axles 18. Also, a part of the power transmitted to a side of the rear wheels 4 is distributed to a side of the front wheels 3 by the transfer 12, and is transmitted to the front wheels 3 serially through a front wheel-side power transmission path of the front propeller shaft 13, the front-wheel differential gear mechanism 15, and the front wheel axles 17.

Figure 2:
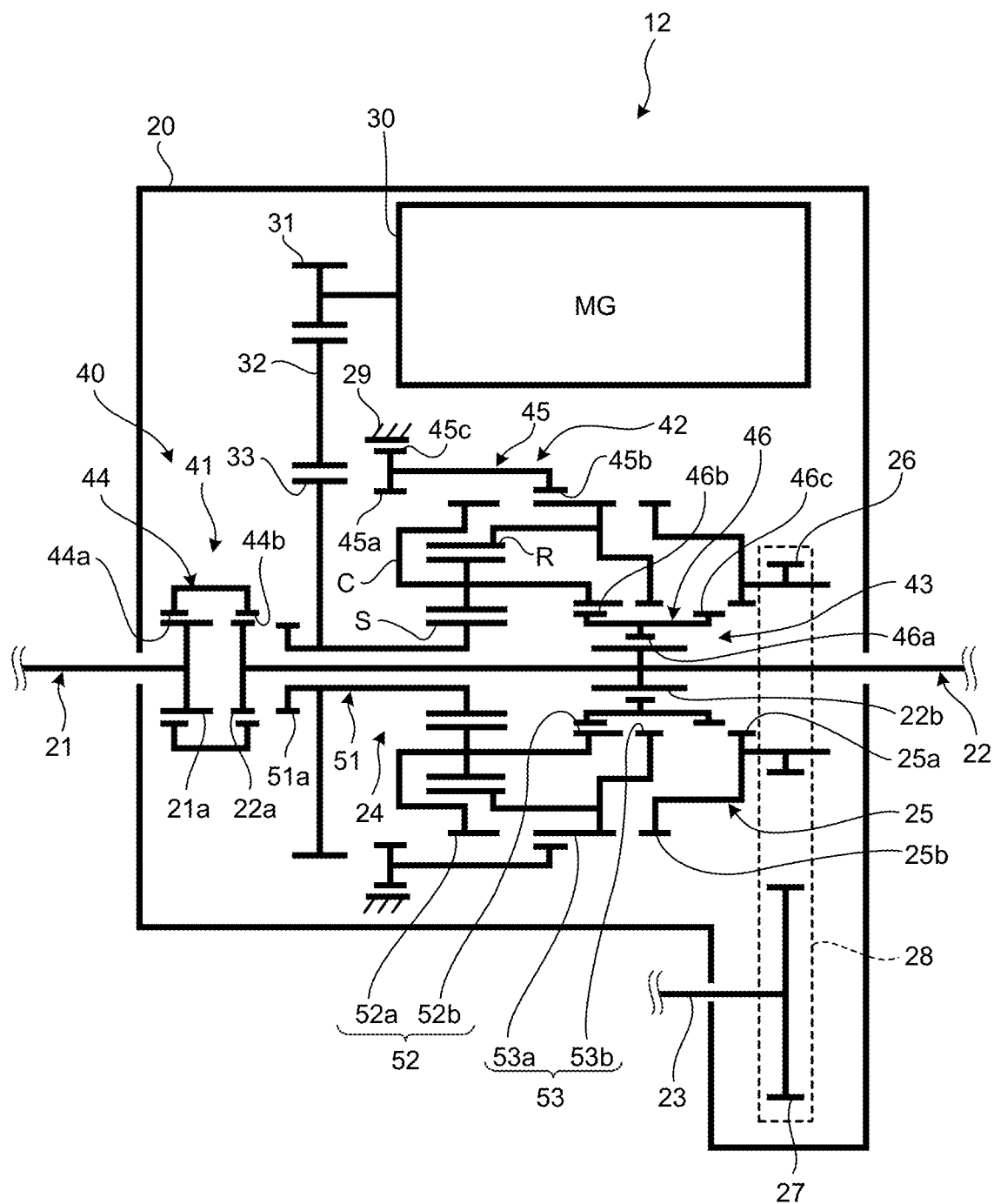
FIG. 2 is a skeleton diagram illustrating a case where a transfer of the first embodiment is in a first driving state.

FIG. 2 is a skeleton diagram illustrating a case where the transfer of the first embodiment is in a first driving state. The transfer 12 of the first embodiment includes a transfer case 20 that is a non-rotational member. In the transfer case 20, the transfer 12 includes an input shaft 21, a rear wheel-side output shaft 22 as a first output shaft that outputs power to the rear wheels 4 that are main drive wheels, a front wheel-side output shaft 23 as a second output shaft that outputs power to the front wheels 3 that are auxiliary drive wheels, and a planetary gear device 24 as a transmission unit that transmits a rotation of the input shaft 21 to the rear wheel-side output shaft 22 while changing a speed thereof. Also, inside the transfer case 20, the transfer 12 includes, as rotational members to form a power transmission path on a side of the front wheels, a transmitting unit 25 that functions as an input unit for the side of the front wheels, a drive gear 26 that outputs power to the front wheel-side output shaft 23, a driven gear 27 that is provided integrally with the front wheel-side output shaft 23, and a front-wheel drive chain 28 that couples the drive gear 26 and the driven gear 27. Furthermore, the transfer 12 includes, inside the transfer case 20, a motor 30 that functions as a power source, and a connection switching device 40 that switches connection states of the rotational members.

The input shaft 21 is an input member that inputs power from the engine 2 into the transfer 12. The power from the engine 2 is transmitted to the input shaft 21 via the transmission 11. For example, the input shaft 21 is spline-fitted to an output member (not illustrated) of the transmission 11.

The rear wheel-side output shaft 22 is an output member that outputs power from the transfer 12 to the rear wheels 4. This rear wheel-side output shaft 22 is a main drive shaft that is arranged on the same axis as the input shaft 21 and that is coupled to the rear propeller shaft 14.

The front wheel-side output shaft 23 is an output member that outputs power from the transfer 12 to the front wheels 3. This front wheel-side output shaft 23 is an auxiliary drive shaft that is arranged on an axis different from that of the input shaft 21 and the rear wheel-side output shaft 22 and that is coupled to the front propeller shaft 13. The front wheel-side output shaft 23 rotates as the drive gear 26 rotates. The drive gear 26 is coupled in such a manner as to rotate integrally with the transmitting unit 25.

The transmitting unit 25 is a rotational member that transmits power to the front wheel-side output shaft 23. The transmitting unit 25 is switched by the connection switching device 40 between a connection state in which the power of the rear wheel-side output shaft 22 is transmitted and a disconnection state in which the power of the rear wheel-side output shaft 22 is not transmitted. The transmitting unit 25 and the drive gear 26 are arranged in such a manner as to be rotatable relative to the rear wheel-side output shaft 22. In the transfer 12, the transmitting unit 25, the drive gear 26, and the planetary gear device 24 are arranged on the same rotation center as the rear wheel-side output shaft 22.

The planetary gear device 24 includes a single pinion-type planetary gear device having three rotational elements. This planetary gear device 24 functions as a transmission unit that outputs a rotation from the engine 2 while changing a speed thereof. As illustrated in FIG. 2, the planetary gear device 24 includes, as three rotational elements, a sun gear S, a carrier C that rotatably and revolvably supports a plurality of pairs of pinion gears that mesh with each other, and a ring gear R that meshes with the sun gear S via the pinion gears. The sun gear S is a first rotational element that functions as an input element. A motor 30 that functions as a second power source is constantly coupled to the sun gear S. The carrier C is a second rotational element that functions as an output element. The ring gear R is a third rotational element that functions as a reaction force element. The carrier C is a third rotational element that functions as an output element.

The connection switching device 40 selectively switches connection destinations of the sun gear S, the carrier C, and the ring gear R that are the three rotational elements. To each of the three rotational elements, a rotational member that integrally rotates therewith is coupled.

A first rotational member 51 that functions as an input unit of the planetary gear device 24 is coupled to the sun gear S. The first rotational member 51 is a member that rotates integrally with the sun gear S, and has an input gear tooth 51a. A rotational member on a side of the engine 2 which member is a first power source is coupled to the input gear tooth 51a. Also, an input gear 33 to which the power from the motor 30 is input is attached to the first rotational member 51. The input gear 33 and the first rotational member 51 rotate integrally.

A second rotational member 52 that functions as an output unit of the planetary gear device 24 is coupled to the carrier C. The second rotational member 52 is a member that rotates integrally with the carrier C, and has a first output gear tooth 52a and a second output gear tooth 52b.

A third rotational member 53 that functions as an output unit of the planetary gear device 24 is coupled to the ring gear R. The third rotational member 53 is a member that rotates integrally with the ring gear R, and has a first output gear tooth 53a and a second output gear tooth 53b.

The motor 30 is a motor generator (MG) that can function as an electric motor and a generator. The motor 30 includes a rotor, a stator, and an output shaft rotating integrally with the rotor, and is electrically connected to a battery via an inverter. As illustrated in FIG. 2, a reduction gear 31 is provided on the output shaft of the motor 30. The reduction gear 31 meshes with a counter gear 32. The counter gear 32 meshes with the input gear 33. The reduction gear 31, the counter gear 32, and the input gear 33 form a reduction gear train. Thus, when the power output from the motor 30 is transmitted to the input gear 33 via the counter gear 32, a rotation of the motor 30 is transmitted to the sun gear S with a speed thereof being changed (reduced).

The connection switching device 40 is a device that switches connection states of the rotational members included in the transfer 12. More specifically, the connection switching device 40 selectively switches connection destinations of the first rotational member 51, the second rotational member 52, and the third rotational member 53 that integrally rotate with the rotational elements of the planetary gear device 24 respectively. As illustrated in FIG. 2, the connection switching device 40 includes a first dog clutch 41, a second dog clutch 42, and a third dog clutch 43.

The first dog clutch 41 is an engagement device that functions as an input switching unit and a transmission switching unit. As illustrated in FIG. 2, the first dog clutch 41 selectively couples the input shaft 21 to the sun gear S or the rear wheel-side output shaft 22. The first dog clutch 41 is a so-called high/low switching unit (transmission switching unit), and switches a speed-changing state in which a rotation of the input shaft 21 is transmitted to the rear wheel-side output shaft 22 with a speed thereof being changed by the planetary gear device 24, and a direct coupling state in which the rotation of the input shaft 21 is transmitted to the rear wheel-side output shaft 22 without a speed change. That is, the first dog clutch 41 switches a first input state in which the power from the engine 2 is transmitted to the rear wheel-side output shaft 22 without the planetary gear device 24, and a second input state in which the power from the engine 2 is transmitted to the rear wheel-side output shaft 22 via the planetary gear device 24.

This first dog clutch 41 has a first switching sleeve 44 as an input switching member. The first switching sleeve 44 has a first gear tooth 44a that meshes with a gear tooth 21a of the input shaft 21, and a second gear tooth 44b that meshes with a first gear tooth 22a of the rear wheel-side output shaft 22 or the input gear tooth 51a of the first rotational member 51. The first switching sleeve 44 is moved in an axial direction by an actuator of the first dog clutch 41. Then, in a state in which the first gear tooth 44a constantly meshes with the input shaft 21, the first switching sleeve 44 is switched in such a manner that a meshing partner of the second gear tooth 44b becomes one of the rear wheel-side output shaft 22 and the first rotational member 51. In a case where the second gear tooth 44b meshes with the input gear tooth 51a of the first rotational member 51, the first dog clutch 41 is in the speed-changing state (second input state). On the one hand, in a case where the second gear tooth 44b meshes with the first gear tooth 22a of the rear wheel-side output shaft 22, the first dog clutch 41 is in the direct coupling state (first input state).

The second dog clutch 42 is an engagement device that functions as a transmission switching unit and a distribution switching unit. The second dog clutch 42 has, as the transmission switching unit, a function of selectively fixing the ring gear R of the planetary gear device 24 to a fixing member 29 and a function of coupling the carrier C and the ring gear R in such a manner as to rotate integrally. The second dog clutch 42 has, as the distribution switching unit, a function of coupling the carrier C, which is to be an output element, to the transmitting unit 25. That is, the second dog clutch 42 switches a fixed state in which the ring gear R is mechanically fixed (speed-changing state), an integrated state in which the carrier C and the ring gear R are integrated, and a distribution state in which the carrier C is coupled to the transmitting unit 25 (differential state). The fixing member 29 is the transfer case 20 itself or a non-rotational member integrated with the transfer case 20.

This second dog clutch 42 has a second switching sleeve 45 as a second distribution switching member. The second switching sleeve 45 has a first gear tooth 45a that meshes with the first output gear tooth 52a of the second rotational member 52 that rotates integrally with the carrier C, a second gear tooth 45b that meshes with the first output gear tooth 53a of the third rotational member 53 that rotates integrally with the ring gear R or a first input gear tooth 25a of the transmitting unit 25, and a third gear tooth 45c that meshes with the fixing member 29. The second switching sleeve 45 is moved in the axial direction by an actuator of the second dog clutch 42. Then, the second switching sleeve 45 is switched between an integrated state in which the carrier C and the ring gear R are coupled integrally rotatably, a fixed state in which the ring gear R is coupled to the fixing member 29, and a distribution state in which the carrier C and the transmitting unit 25 are coupled.

The third dog clutch 43 is an engagement device that functions as a distribution switching unit. The third dog clutch 43 selectively couples the rear wheel-side output shaft 22 to the transmitting unit 25 on the side of the front wheels 3. That is, the third dog clutch 43 switches a distribution state in which a part of the power transmitted to the rear wheel-side output shaft 22 is distributed to the front wheel-side output shaft 23, and a non-distribution state in which the power transmitted to the rear wheel-side output shaft 22 is not distributed to the front wheel-side output shaft 23.

This third dog clutch 43 has a third switching sleeve 46 as a first distribution switching member. The third switching sleeve 46 has a first gear tooth 46a that meshes with a second gear tooth 22b of the rear wheel-side output shaft 22, a second gear tooth 46b that meshes with the second output gear tooth 52b of the second rotational member 52 that rotates integrally with the carrier C, and a third gear tooth 46c that meshes with a second input gear tooth 25b of the transmitting unit 25. The second gear tooth 46b and the third gear tooth 46c can mesh with the second output gear tooth 53b of the third rotational member 53 that rotates integrally with the ring gear R. The third switching sleeve 46 is moved in the axial direction by an actuator of the third dog clutch 43. Then, the third switching sleeve 46 connects the ring gear R or the carrier C to the rear wheel-side output shaft 22, and selectively couples the rear wheel-side output shaft 22 to the transmitting unit 25. That is, the third switching sleeve 46 switches a non-distribution state in which the rear wheel-side output shaft 22 and the transmitting unit 25 are not coupled, and a distribution state in which the rear wheel-side output shaft 22 and the transmitting unit 25 are coupled.

In such a manner, the connection switching device 40 functions as an input switching unit, a transmission switching unit, and a distribution switching unit. The input switching unit switches a direct coupling state in which the input shaft 21 is directly coupled to the rear wheel-side output shaft 22 (first input state), and a speed-changing state in which the input shaft 21 is coupled to the sun gear S of the planetary gear device 24 (second input state). Since being a high/low switching unit, this input switching unit is included in the transmission switching unit. The transmission switching unit switches a speed-changing state in which a rotation of the input shaft 21 is transmitted to the rear wheel-side output shaft 22 with a speed thereof being changed, and a non-speed-changing state in which the rotation of the input shaft 21 is transmitted to the rear wheel-side output shaft 22 without a speed change. Then, the distribution switching unit switches a non-distribution state in which power input from the input shaft 21 is transmitted only to the rear wheels 4 (two-wheel driving state), and a distribution state in which the power input from the input shaft 21 is distributed and transmitted to the front wheels 3 and the rear wheels 4 (four-wheel driving state).

By causing the planetary gear device 24 to function as a transmission unit, the transfer 12 can establish either a high speed-side gear position Hi or a low speed-side gear position Lo and transmit a rotation from the transmission 11 to the following stage while changing a speed thereof. Also, when being in the four-wheel driving state, the transfer 12 switches a differential state in which rotational differential motions between the rear propeller shaft 14 and the front propeller shaft 13 is not limited, and a non-differential state in which rotational differential motions therebetween is limited. That is, in the distribution state, the transfer 12 can switch a case where the rear wheel-side output shaft 22 and the transmitting unit 25 are in a state of being able to make differential motions, and a case where the rear wheel-side output shaft 22 and the transmitting unit 25 are in a non-differential state.

Also, as illustrated in FIG. 1, the vehicle 1 includes an electronic control device 100 that controls the vehicle 1. The electronic control device 100 outputs a command signal to an actuator that operates the connection switching device 40, and controls the operation of the connection switching device 40. For example, the electronic control device 100 includes a microcomputer including a Central Processing Unit (CPU), a Random Access Memory (RAM), a Read Only Memory (ROM), an input/output interface and the like. The CPU executes various kinds of control of the vehicle 1 by using a temporary storage function of the RAM, and performing signal processing according to a program stored in advance in the ROM.

Signals from various sensors mounted on the vehicle 1 are input into the electronic control device 100. For example, sensor signals from an engine speed sensor, a motor rotation angle sensor, a vehicle speed sensor, an accelerator position sensor, a Hi range selection switch to select a high speed-side gear position Hi by an operation by a driver, and a 4WD selection switch to select a four-wheel driving state by an operation by the driver are input into the electronic control device 100. The electronic control device 100 executes drive control and the like of the vehicle 1 on the basis of the input sensor signals. Then, the electronic control device 100 outputs a command signal to control the engine 2, a command signal to control the transmission 11, a command signal to control the transfer 12 and the like. The command signal to control the transfer 12 includes a command signal to control the motor 30 and a command signal to control the connection switching device 40. That is, the transfer 12 can be switched to a plurality of driving states by the planetary gear device 24 and the connection switching device 40.

Thus, when controlling a driving state of the transfer 12, the electronic control device 100 controls an operation state of the planetary gear device 24 by controlling an operation of the motor 30 that is the second power source, and controlling a connection state of the connection switching device 40. The planetary gear device 24 can be switched among a first mode (first operation state), a second mode (second operation state), and a third mode (third operation state) when the electronic control device 100 executes switching control of the connection switching device 40.

The third mode is an operation state in which two rotational elements among the three rotational elements included in the planetary gear device 24 are coupled to each other and any one of the rotational elements is coupled to the rear wheel-side output shaft 22. The first mode is an operation state in which any one rotational element among the three rotational elements included in the planetary gear device 24 is coupled to the input shaft 21, and one of the remaining rotational elements is fixed to the fixing member 29, and the other is coupled to the rear wheel-side output shaft 22. The second mode is an operation state in which the motor 30, the rear wheel-side output shaft 22, and the front wheel-side output shaft 23 are respectively coupled to the three rotational elements included in the planetary gear device 24.

In such a manner, the planetary gear device 24 functions not only as a transmission unit but also as a transmission switching unit and a distribution switching unit. That is, in the transfer 12, switching between a plurality of driving states is performed when a configuration including the connection switching device 40 and the planetary gear device 24 functions as an input switching unit, a transmission switching unit, and a distribution switching unit. The transfer 12 of the first embodiment can be set to a first driving state, a second driving state, a third driving state, a fourth driving state, and a fifth driving state.

Here, the first to fifth driving states will be described with reference to FIG. 2 to FIG. 11. Note that in FIG. 3, FIG. 5, FIG. 7, FIG. 9, and FIG. 11, collinear diagrams illustrating rotational states of the planetary gear device 24 are illustrated, and the motor 30 is described as "MG", the engine 2 is described as "ENG", the sun gear S is described as "S", the carrier C is described as "C", the ring gear R is described as "R", and the second dog clutch 42 is described as "CL1".

Figure 3:
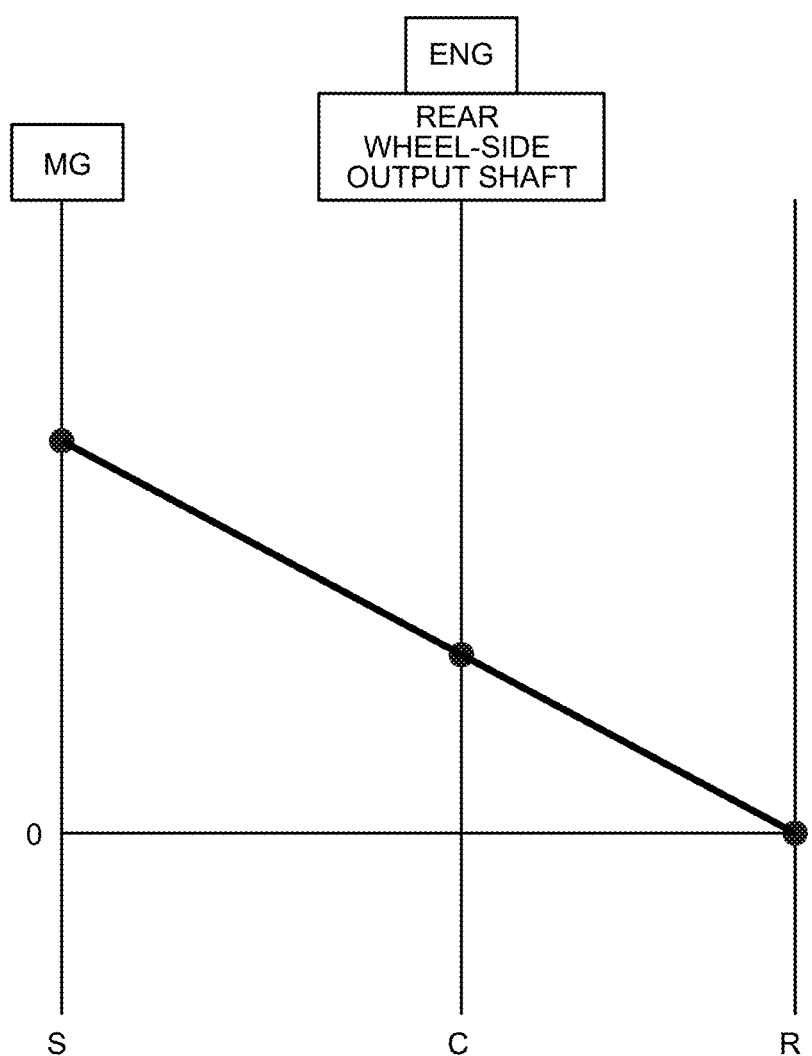
FIG. 3 is a collinear diagram illustrating states of rotational elements in a planetary gear device in a case of the first driving state.

First, the first driving state will be described with reference to FIG. 2 to FIG. 3. The first driving state is a two-wheel driving state in which power is transmitted only to the rear wheels 4 among the front and rear wheels, and is a case where the connection switching device 40 is in the non-distribution state and the planetary gear device 24 is in the speed-changing state. In the first driving state, the power of the engine 2 and the motor 30 can be transmitted to the rear wheels 4, and two-wheel driving can be performed with a speed of a rotation of the engine 2 not being reduced by the transfer 12.

As illustrated in FIG. 2, in a case where the transfer 12 is in the first driving state, the planetary gear device 24 is in the first mode in which the ring gear R is mechanically fixed, and the first dog clutch 41 is in the direct coupling state and the third dog clutch 43 is in the non-distribution state in the connection switching device 40. That is, the first switching sleeve 44 meshes with the input shaft 21 and the rear wheel-side output shaft 22. The second switching sleeve 45 meshes with the third rotational member 53 and the fixing member 29. The third switching sleeve 46 meshes with the second rotational member 52 and the rear wheel-side output shaft 22.

In such a manner, in the first driving state, the input shaft 21 is in a state of being directly coupled to the rear wheel-side output shaft 22. Thus, power transmitted from the engine 2 to the input shaft 21 is transmitted to the rear wheel-side output shaft 22 without the planetary gear device 24. Thus, a rotation of the input shaft 21 is transmitted to the rear wheel-side output shaft 22 with a speed thereof not being changed. On the one hand, the motor 30 is coupled to the rear wheel-side output shaft 22 via the planetary gear device 24 in the speed-changing state. Thus, in the first driving state, when the power of the motor 30 is transmitted to the rear wheel-side output shaft 22, a rotation of the motor 30 is transmitted to the rear wheel-side output shaft 22 with the speed thereof being changed by the planetary gear device 24 as illustrated in FIG. 3. Also, in the first driving state, an EV traveling mode in which the vehicle 1 travels only with the power of the motor 30 is possible.

Next, the second driving state will be described with reference to FIG. 4 to FIG. 5. The second driving state is a two-wheel driving state in which power is transmitted only to the rear wheels 4 among the front and rear wheels, and is a case where the connection switching device 40 is in the non-distribution state and the planetary gear device 24 is in the non-speed-changing state. In the second driving state, the power of the engine 2 and the motor 30 can be transmitted to the rear wheels 4, and two-wheel driving can be performed with a speed of a rotation of the engine 2 not being reduced by the transfer 12.

Figure 4:
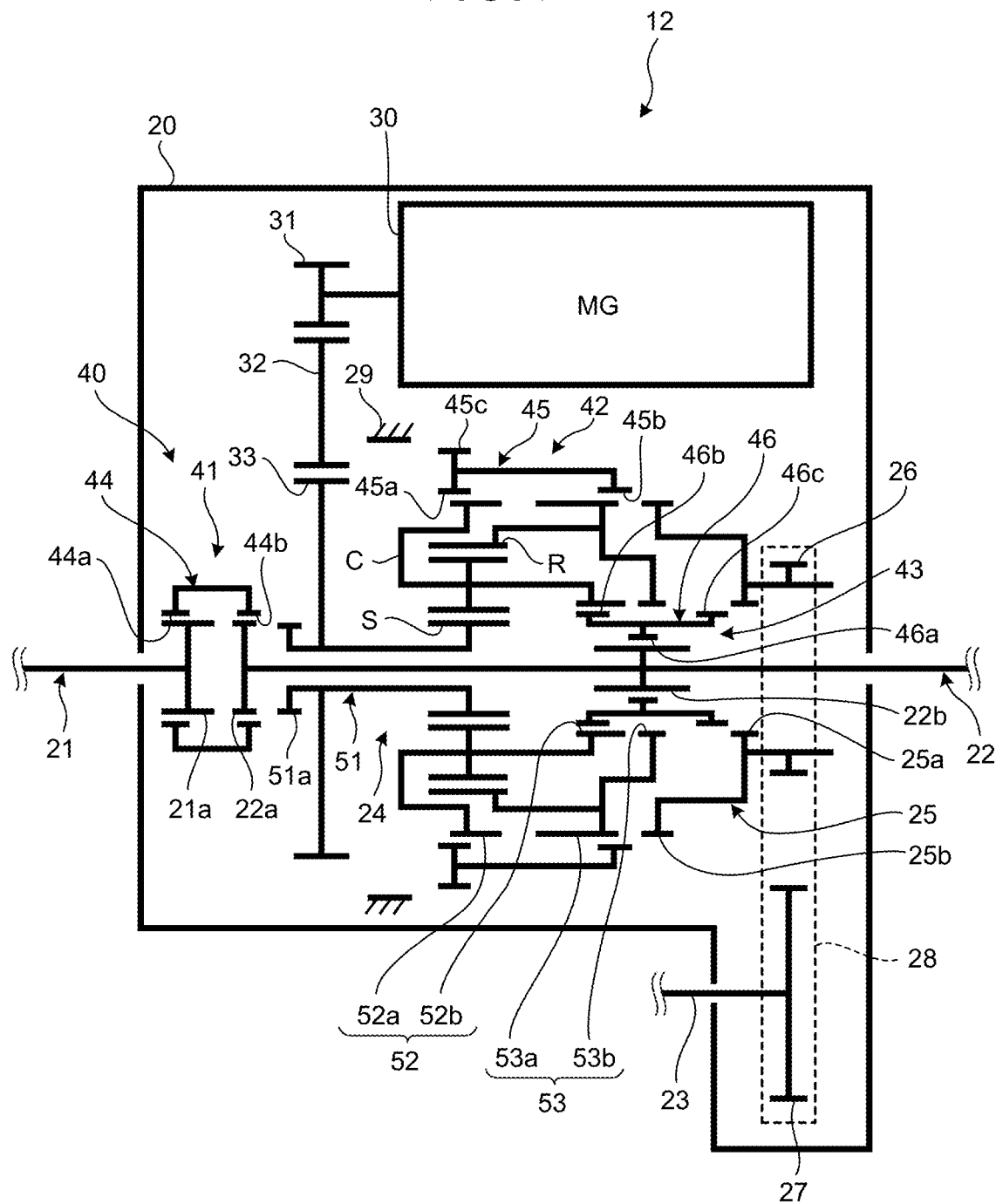
FIG. 4 is a skeleton diagram illustrating a case where the transfer of the first embodiment is in a second driving state.
Figure 5:
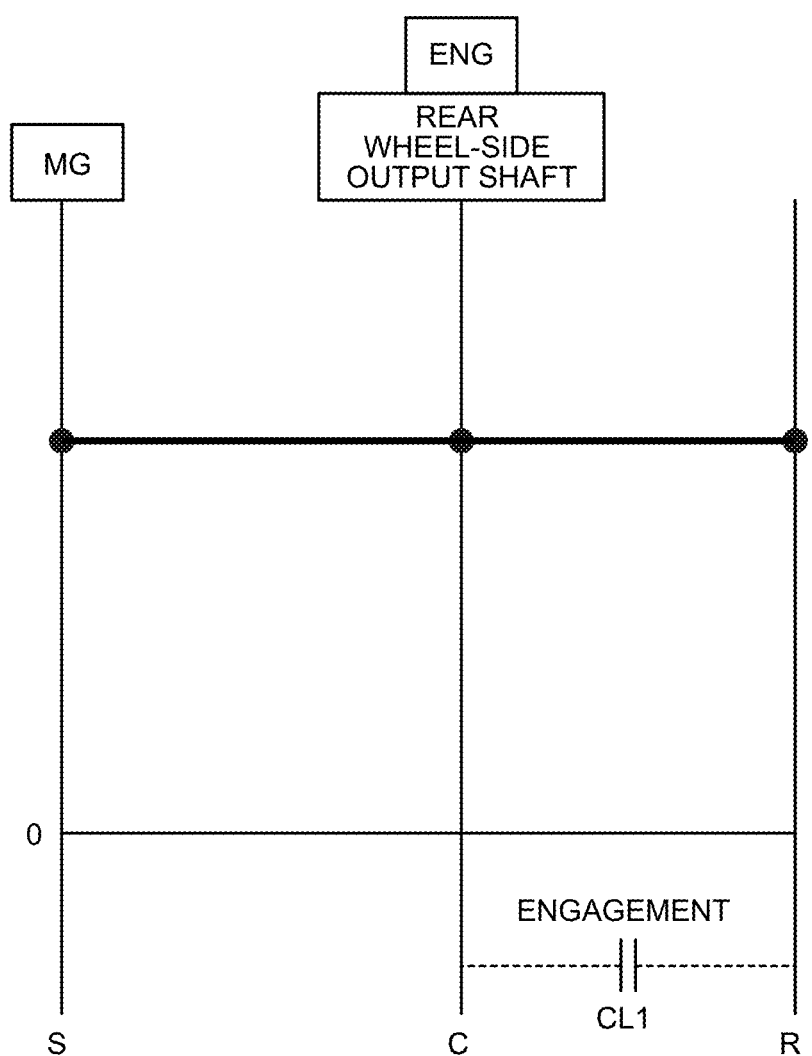
FIG. 5 is a collinear diagram illustrating states of the rotational elements in the planetary gear device in a case of the second driving state.

As illustrated in FIG. 4, in a case where the transfer 12 is in the second driving state, the planetary gear device 24 is in the third mode in which the carrier C and the ring gear R are integrally rotatably coupled, and the first dog clutch 41 is in the direct coupling state and the third dog clutch 43 is in the non-distribution state in the connection switching device 40. That is, the first switching sleeve 44 meshes with the input shaft 21 and the rear wheel-side output shaft 22. The second switching sleeve 45 meshes with the second rotational member 52 and the third rotational member 53. The third switching sleeve 46 meshes with the second rotational member 52 and the rear wheel-side output shaft 22.

In such a manner, the input shaft 21 is directly coupled to the rear wheel-side output shaft 22 in the second driving state. Thus, the power transmitted from the engine 2 to the input shaft 21 is transmitted to the rear wheel-side output shaft 22 without the planetary gear device 24. Thus, a rotation of the input shaft 21 is transmitted to the rear wheel-side output shaft 22 with a speed thereof not being changed. Also, although the motor 30 is coupled to the rear wheel-side output shaft 22 via the planetary gear device 24, the planetary gear device 24 is in the non-speed-changing state. Thus, in the second driving state, when the power of the motor 30 is transmitted to the rear wheel-side output shaft 22, the three rotational elements have the same rotational speed as illustrated in FIG. 5.

Next, the third driving state will be described with reference to FIG. 6 to FIG. 7. The third driving state is a four-wheel driving state in which power is transmitted to the front wheels 3 and the rear wheels 4, and is a case where the connection switching device 40 is in the distribution state and the planetary gear device 24 is in the distribution state (differential state). In the third driving state, front/rear distribution control can be performed by motor torque output from the motor 30. The third driving state is a so-called torque split 4WD mode. The torque split mode is to generate driving force in the front wheels 3 by the power of the motor 30 and to change a distribution of power transmitted to the transmitting unit 25 and the rear wheel-side output shaft 22.

Figure 6:
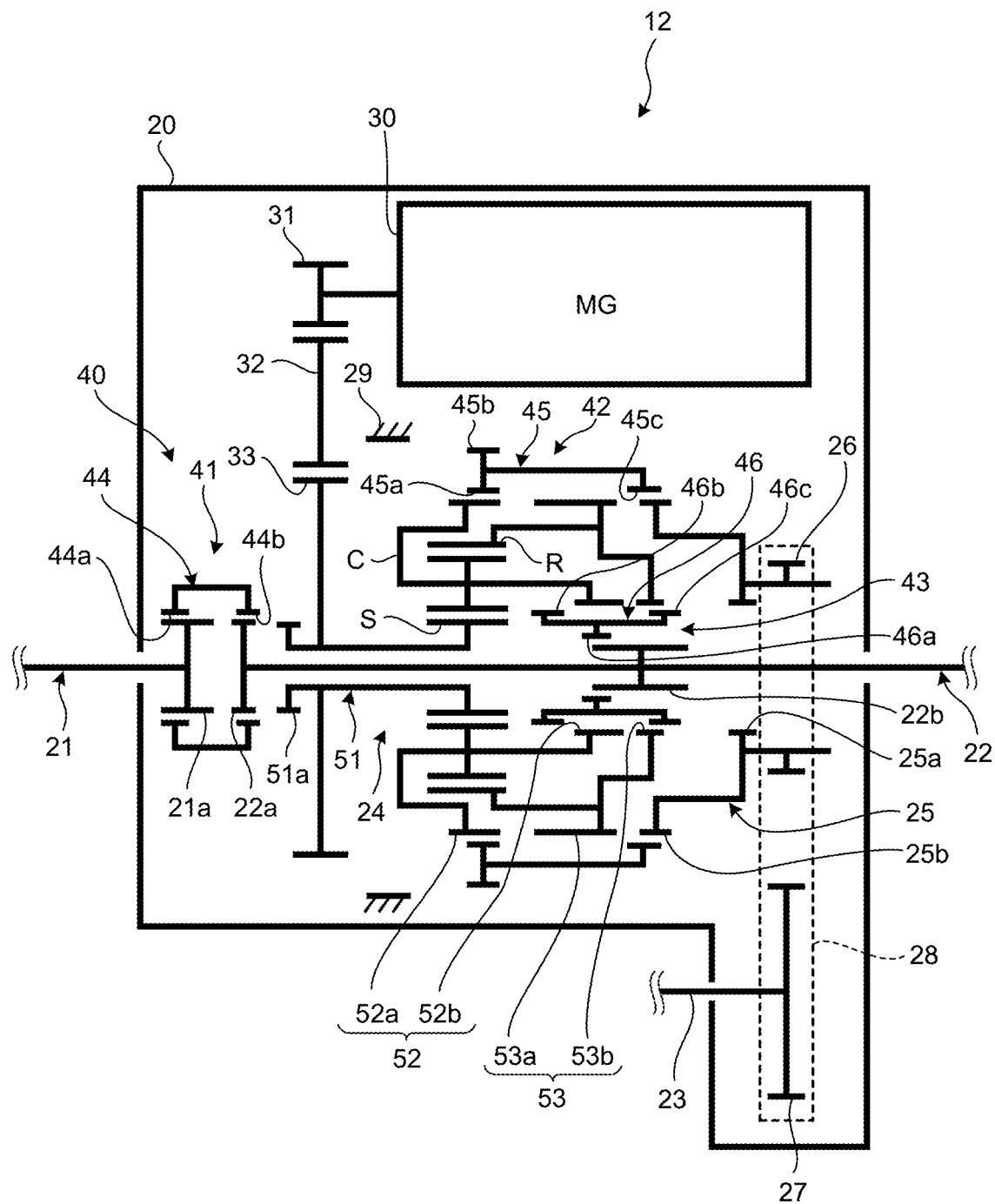
FIG. 6 is a skeleton diagram illustrating a case where the transfer of the first embodiment is in a third driving state.
Figure 7:
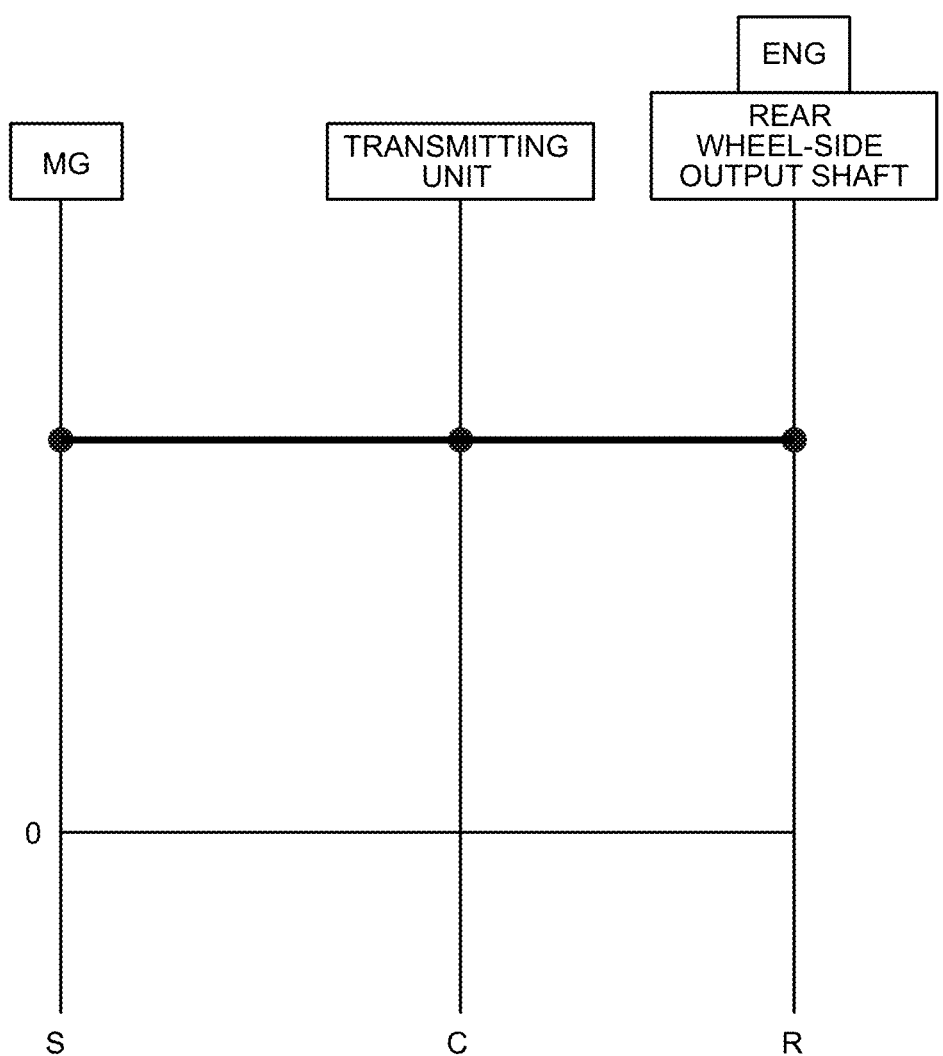
FIG. 7 is a collinear diagram illustrating states of the rotational elements in the planetary gear device in a case of the third driving state.

As illustrated in FIG. 6, in a case where the transfer 12 is in the third driving state, the planetary gear device 24 is in the second mode in which the sun gear S, the carrier C, and the ring gear R can make differential motions, and the first dog clutch 41 is in the direct coupling state, the second dog clutch 42 is in the distribution state, and the third dog clutch 43 is in the distribution state in the connection switching device 40. That is, the first switching sleeve 44 meshes with the input shaft 21 and the rear wheel-side output shaft 22. The second switching sleeve 45 meshes with the second rotational member 52 and the transmitting unit 25. The third switching sleeve 46 meshes with the third rotational member 53 and the rear wheel-side output shaft 22. In such a manner, in a case where the third rotational member 53 and the rear wheel-side output shaft 22 are coupled by the third switching sleeve 46, the first gear tooth 46a of the third switching sleeve 46 meshes with the second gear tooth 22b of the rear wheel-side output shaft 22, and the second gear tooth 46b of the third switching sleeve 46 meshes with the second output gear tooth 53b of the third rotational member 53.

In such a manner, the input shaft 21 is in a state of being directly coupled to the rear wheel-side output shaft 22 in the third driving state. Thus, the power transmitted from the engine 2 to the input shaft 21 is transmitted to the rear wheel-side output shaft 22 without the planetary gear device 24. Thus, a rotation of the input shaft 21 is transmitted to the rear wheel-side output shaft 22 with a speed thereof not being changed. Also, since the planetary gear device 24 is in the distribution state in which a differential motion can be made, the power of the motor 30 is distributed and transmitted to the transmitting unit 25 and the rear wheel-side output shaft 22 via the planetary gear device 24. Thus, in the third driving state, a distribution of the power transmitted to the side of the front wheels and the side of the rear wheels can be controlled by the torque output from the motor 30, as illustrated in FIG. 7.

Next, the fourth driving state will be described with reference to FIG. 8 to FIG. 9. The fourth driving state is a four-wheel driving state in which power is transmitted to the front wheels 3 and the rear wheels 4, and is a case where the connection switching device 40 is in the distribution state and the planetary gear device 24 is in the non-speed-changing state. In the fourth driving state, a fixed distribution 4WD mode can be set while a speed of a rotation of the engine 2 is not reduced by the transfer 12. Also, the fourth driving state is a Hi mode in which the transfer 12 is set to the high speed-side gear position Hi.

Figure 8:
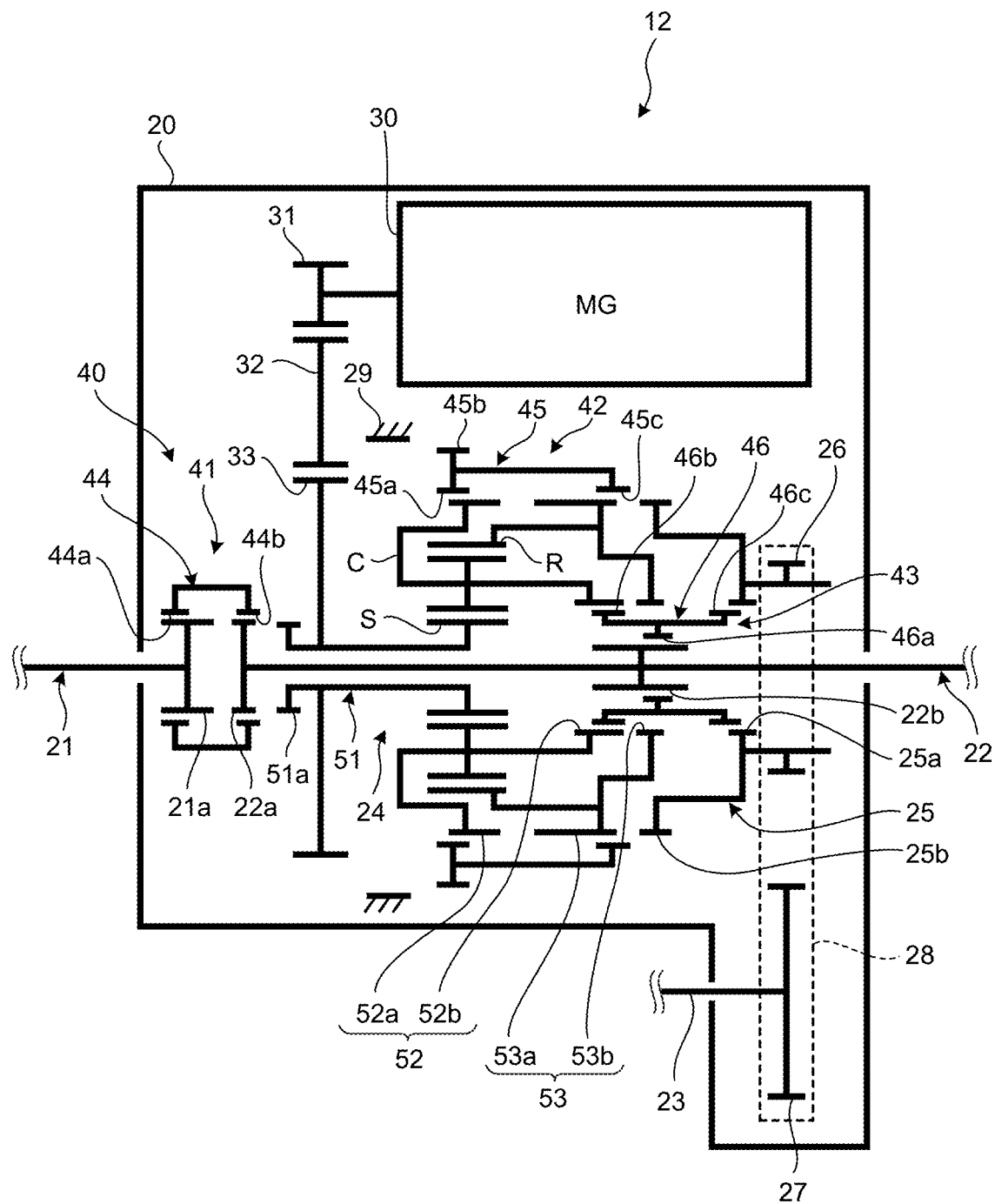
FIG. 8 is a skeleton diagram illustrating a case where the transfer of the first embodiment is in a fourth driving state.
Figure 9:
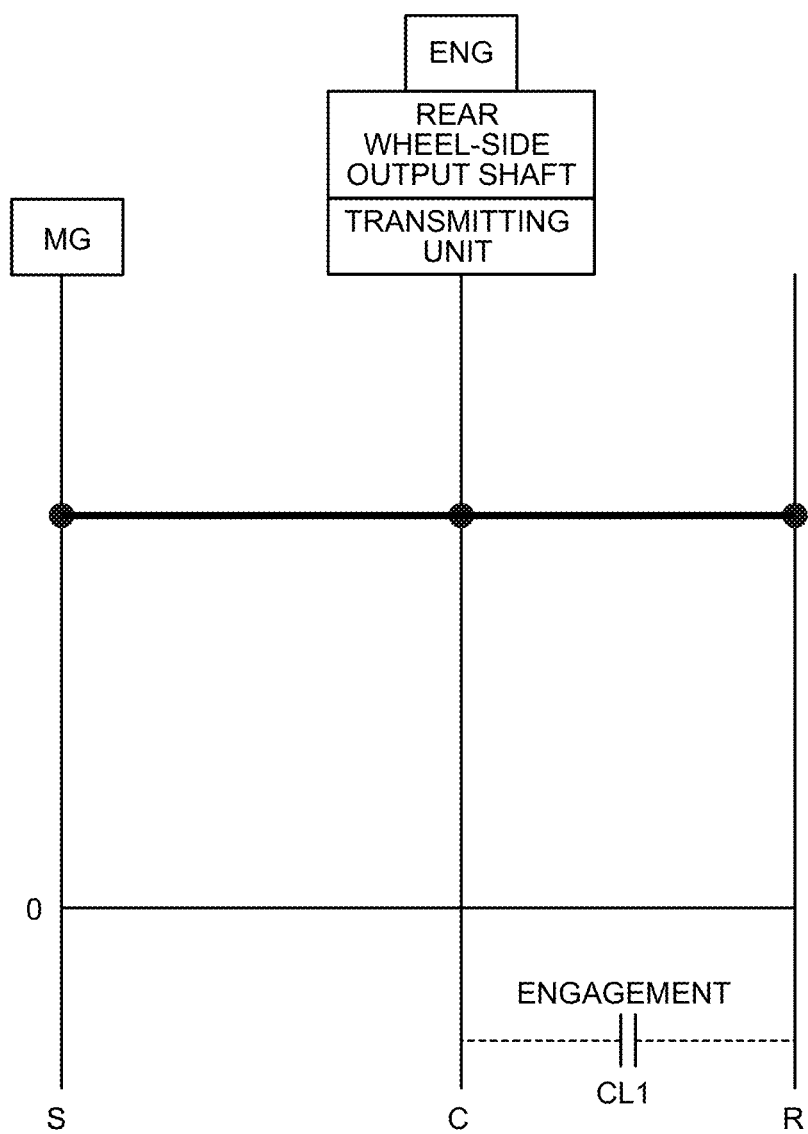
FIG. 9 is a collinear diagram illustrating states of the rotational elements in the planetary gear device in a case of the fourth driving state.

As illustrated in FIG. 8, in a case where the transfer 12 is in the fourth driving state, the planetary gear device 24 is in the third mode in which the carrier C and the ring gear R are integrally rotatably coupled, and the first dog clutch 41 is in the direct coupling state and the third dog clutch 43 is in the distribution state in the connection switching device 40. That is, the first switching sleeve 44 meshes with the input shaft 21 and the rear wheel-side output shaft 22. The second switching sleeve 45 meshes with the second rotational member 52 and the third rotational member 53. The third switching sleeve 46 meshes with the second rotational member 52 or the third rotational member 53, the rear wheel-side output shaft 22, and the transmitting unit 25. In such a manner, in a case where the rear wheel-side output shaft 22 and the transmitting unit 25 are coupled by the third switching sleeve 46, the second gear tooth 46b of the third switching sleeve 46 only desired to mesh with any one of the second output gear tooth 52b of the second rotational member 52 and the second output gear tooth 53b of the third rotational member 53.

In such a manner, the input shaft 21 is directly coupled to the rear wheel-side output shaft 22 in the fourth driving state. Thus, the power transmitted from the engine 2 to the input shaft 21 is transmitted to the rear wheel-side output shaft 22 without the planetary gear device 24. Thus, a rotation of the input shaft 21 is transmitted to the rear wheel-side output shaft 22 with a speed thereof not being changed. Also, although the motor 30 is coupled to the rear wheel-side output shaft 22 via the planetary gear device 24, the planetary gear device 24 is in the non-speed-changing state. Thus, in the fourth driving state, when the power of the motor 30 is transmitted to the rear wheel-side output shaft 22, the three rotational elements have the same rotational speed as illustrated in FIG. 9.

Next, the fifth driving state will be described with reference to FIG. 10 to FIG. 11. The fifth driving state is a four-wheel driving state in which power is transmitted to the front wheels 3 and the rear wheels 4, and is set when the connection switching device 40 becomes the distribution state and the planetary gear device 24 becomes the speed-changing state. In the fifth driving state, a fixed distribution 4WD mode in which a speed of a rotation of the engine 2 is reduced by the transfer 12 is possible. Also, the fifth driving state is a Lo mode in which the transfer 12 is set to the low speed-side gear position Lo. That is, in the fifth driving state, the rear wheels 4 can be driven by the motor 30 even in the Lo mode.

Figure 10:
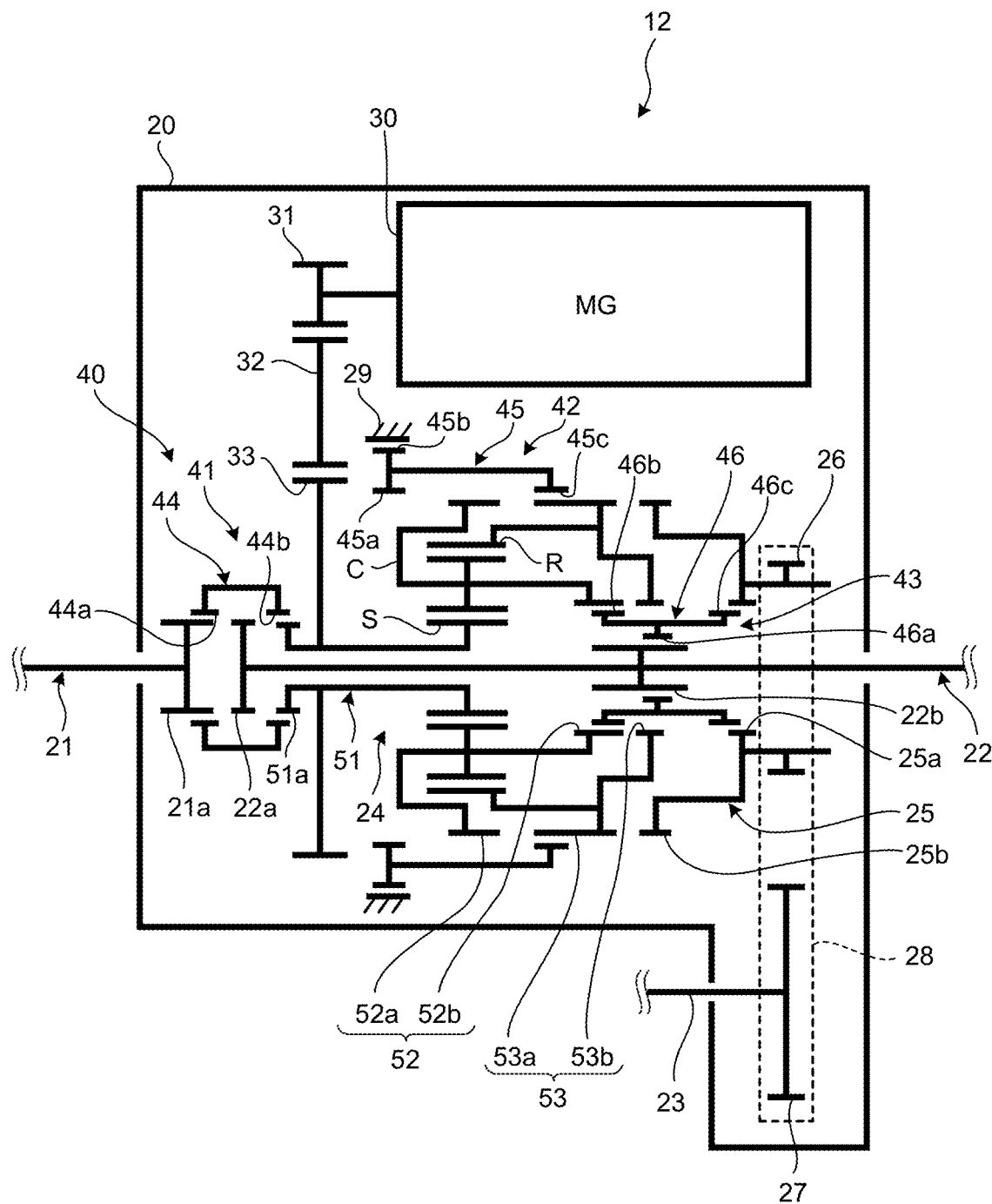
FIG. 10 is a skeleton diagram illustrating a case where the transfer of the first embodiment is in a fifth driving state.
Figure 11:
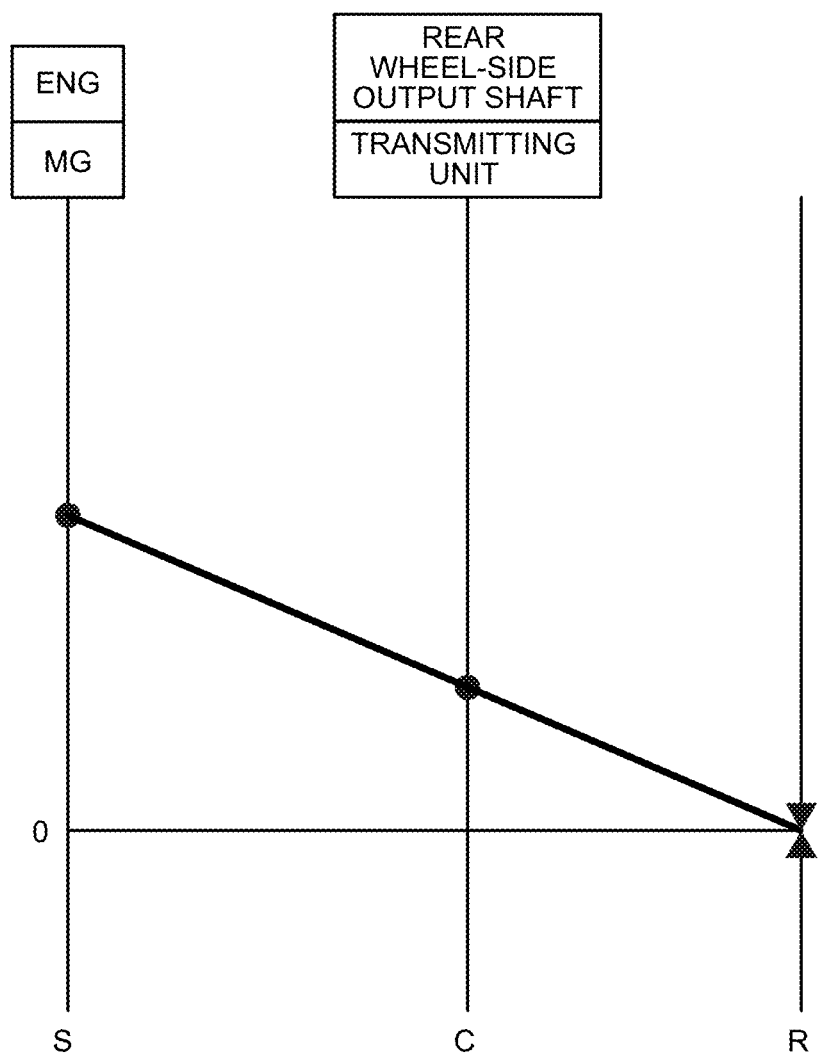
FIG. 11 is a collinear diagram illustrating states of the rotational elements in the planetary gear device in a case of the fifth driving state.

As illustrated in FIG. 10, in a case where the transfer 12 is in the fifth driving state, the planetary gear device 24 is in the first mode in which the ring gear R is mechanically fixed, and the first dog clutch 41 is in the second input state (speed-changing state) and the third dog clutch 43 is in the distribution state in the connection switching device 40. That is, the first switching sleeve 44 meshes with the input shaft 21 and the first rotational member 51. The second switching sleeve 45 meshes with the third rotational member 53 and the fixing member 29. The third switching sleeve 46 meshes with the third rotational member 53 and the rear wheel-side output shaft 22.

In such a manner, in the fifth driving state, since the input shaft 21 is coupled to the first rotational member 51, power transmitted from the engine 2 to the input shaft 21 is transmitted to the rear wheel-side output shaft 22 via the planetary gear device 24. Also, since the planetary gear device 24 is in the speed-changing state, a rotation of the input shaft 21 is transmitted to the rear wheel-side output shaft 22 with a speed thereof being changed by the planetary gear device 24. Similarly, the motor 30 is also coupled to the rear wheel-side output shaft 22 via the planetary gear device 24 in the speed-changing state. Thus, in the fifth driving state, when power of the motor 30 is transmitted to the rear wheel-side output shaft 22, a rotation of the motor 30 is transmitted to the rear wheel-side output shaft 22 with a speed thereof being changed by the planetary gear device 24, as illustrated in FIG. 11.

As described above, according to the first embodiment, the motor 30 is constantly coupled to rotational elements other than a rotational element fixed to the fixing member 29 among the three rotational elements included in the planetary gear device 24. Thus, even when the planetary gear device 24 is in the speed-changing state in which one rotational element is fixed to the fixing member 29, power of the motor 30 can be transmitted to the rear wheel-side output shaft 22. Accordingly, in a case where the planetary gear device 24 is in the speed-changing state, the power of the engine 2 can be transmitted to the rear wheels 4 with the power of the motor 30 being added thereto. Moreover, in a case where the planetary gear device 24 is in the speed-changing state, a rotation of the motor 30 can be transmitted to the rear wheels 4 with a speed thereof being changed by the planetary gear device 24.

Note that as a modification example of the above-described first embodiment, a planetary gear device 24 may include a double pinion-type planetary gear device. In a case where a transfer 12 includes the double pinion-type planetary gear device, a motor 30 is constantly coupled to a sun gear S, a rotational element selectively fixed to a fixing member 29 is a carrier C, and a rotational element that functions as an output element is a ring gear R.

Also, as a different modification example, a configuration in which an input shaft 21 is constantly connected to a sun gear S of a planetary gear device 24 may be employed. In this case, a first dog clutch 41 is switched between an engaged state in which an input shaft 21 is directly coupled to a rear wheel-side output shaft 22 and a released state in which the input shaft 21 is separated from the rear wheel-side output shaft 22.

Also, as a different modification example, a case where a carrier C and a ring gear R are coupled integrally rotatably is not a limitation in a case where three rotational elements of a planetary gear device 24 rotate integrally in a third mode. That is, two rotational elements coupled integrally rotatably are not specifically limited. Moreover, all three rotational elements may be coupled integrally rotatably.

Also, as a different modification example, a rotational element fixed to a fixing member 29 in a first mode among three rotational elements of a planetary gear device 24 may be any rotational element as long as being other than an input element. For example, a carrier C may be a fixed element fixed to a fixing member 29, and a ring gear R may be an output element. That is, it is only necessary to fix one rotational element of the planetary gear device 24 with respect to an input from the input shaft 21 and to differentiate rotational speeds of an input element and an output element. In the above-described embodiment, a configuration in which a sun gear S is an input element, a carrier C is an output element, and a ring gear R is a fixed element is used as a combination with which speed can be reduced most greatly.

Also, in the above-described embodiment, a sun gear S is an input element and a carrier C is an output element as a combination that maximizes power transmission to a side of front wheels in a second mode. However, other combinations are also possible. For example, in a third mode, a ring gear R may be an input element and a carrier C may be an output element. Note that a configuration in which a motor 30 is connected to a carrier C in a case where a planetary gear device 24 is a single pinion type, and a configuration in which a motor 30 is connected to a ring gear R in a case where a planetary gear device 24 is a double pinion type are not included in the present disclosure since a torque split cannot be performed.

Also, as another modification example, an engagement device included in a connection switching device 40 only desired to realize connection states in a first mode, a second mode, and a third mode, and the number and form thereof (such as dog clutch and friction clutch) can be freely selected. The above-described embodiment is a configuration example in which all connection states can be realized by three dog clutches for the sake of downsizing.

Also, a configuration desired is to enable motor driving in a Lo mode, and a motor 30 may be connected to any rotational element as long the rotational element is other than a fixed element. In addition, an arrangement of a motor 30 and presence or absence of speed reduction at the time of connection (such as reduction gear 31), addition of a transmission mechanism to the motor 30, and the like are not specifically limited. Selection can be made arbitrarily according to specifications of a vehicle 1 and a motor 30. The above-described embodiment is a configuration example in which a motor is connected to a sun gear S similarly to an engine 2 and a transmission function only for the motor is omitted as an example in which speeds of a rotation of an engine 2 and a rotation of a motor 30 can be simultaneously reduced by a planetary gear device 24 in a Lo mode and a speed reduction function can be shared in a two-wheel driving state.

Next, a power transmission device of a second embodiment will be described. In the second embodiment, unlike the first embodiment, an output element that outputs power to front wheels 3 is configured to be a ring gear R in a case where three rotational elements of a planetary gear device 24 can make differential motions. Note that in the description of the second embodiment, the same reference signs are used for configurations similar to those of the first embodiment, and a description thereof is omitted.

Figure 12:
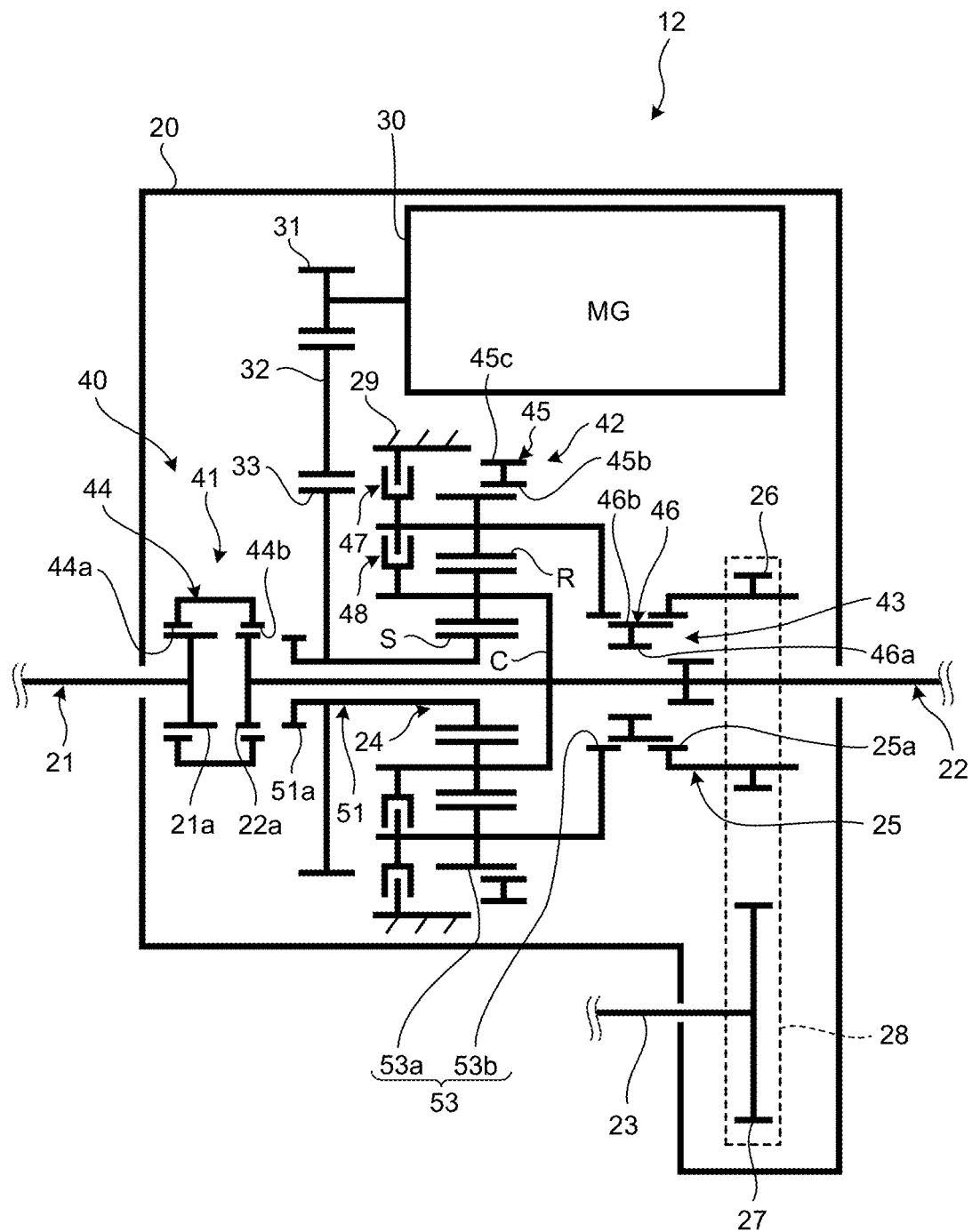
FIG. 12 is a skeleton diagram schematically illustrating a transfer in a power transmission device of a second embodiment.

FIG. 12 is a skeleton diagram schematically illustrating a transfer in a power transmission device of the second embodiment. In a transfer 12 of the second embodiment, a carrier C of a planetary gear device 24 is constantly coupled to a rear wheel-side output shaft 22. The carrier C and the rear wheel-side output shaft 22 are coupled in such a manner as to rotate integrally.

A connection switching device 40 includes a first dog clutch 41, a second dog clutch 42, a third dog clutch 43, a first friction clutch 47, and a second friction clutch 48.

The second dog clutch 42 selectively fixes a ring gear R to a fixing member 29. A second switching sleeve 45 included in the second dog clutch 42 constantly meshes with a first output gear tooth 53a of a third rotational member 53. The second switching sleeve 45 is moved in an axial direction by an actuator of the second dog clutch 42, and switched between an engaged state of meshing with the fixing member 29 and a released state of not meshing with the fixing member 29.

The third dog clutch 43 is switched between a first distribution state in which the ring gear R is coupled to a transmitting unit 25 and a second distribution state in which the rear wheel-side output shaft 22 is coupled to the transmitting unit 25. A third switching sleeve 46 included in the third dog clutch 43 is moved in the axial direction by an actuator of the third dog clutch 43, and is switched between a first distribution state of meshing with the third rotational member 53 and the transmitting unit 25 in a state of not meshing with the rear wheel-side output shaft 22, and a second distribution state of meshing with the rear wheel-side output shaft 22 and the transmitting unit 25 in a state of not meshing with the third rotational member 53.

The first friction clutch 47 is a friction engagement device that selectively fixes the ring gear R to the fixing member 29, and is a hydraulic type that is operated by a hydraulic actuator. This first friction clutch 47 has a first friction engagement element on a fixation side, and a second friction engagement element on a rotation side which element rotates integrally with the ring gear R. Engagement force is generated by a hydraulic pressure. That is, in the first friction clutch 47, it is possible to control the engagement force by controlling the hydraulic pressure. Then, the ring gear R becomes unrotatable when the first friction clutch 47 is engaged, and the ring gear R becomes rotatable when the first friction clutch 47 is released.

For example, when the ring gear R is fixed to the fixing member 29, the first friction clutch 47 is switched from the released state to the engaged state in a state in which the second dog clutch 42 is released. Then, the second dog clutch 42 is switched from the released state to the engaged state with the first friction clutch 47 being kept in the engaged state. Subsequently, when the second dog clutch 42 becomes the engaged state, the first friction clutch 47 can be released. As a result, it becomes possible to fix the ring gear R by mechanical force without supplying a hydraulic pressure for generating engagement force to the second friction clutch 48.

The second friction clutch 48 is a friction engagement device that selectively engages the ring gear R and the carrier C, and is a hydraulic type operated by the hydraulic actuator. This second friction clutch 48 has a first friction engagement element on a rotation side which element rotates integrally with the ring gear R, and a second friction engagement element on the rotation side which element rotates integrally with the carrier C. Engagement force is generated by a hydraulic pressure. The second friction clutch 48 can also control the engagement force by controlling the hydraulic pressure. Then, the carrier C and the ring gear R are integrally rotatably coupled to each other when the second friction clutch 48 is engaged, and the carrier C becomes rotatable relative to the ring gear R when the second friction clutch 48 is released.

Also, as illustrated in FIG. 12, in a case where the transfer 12 of the second embodiment is in a third driving state, the planetary gear device 24 is in a second mode in which a sun gear S, the carrier C, and the ring gear R can make differential motions, and the first dog clutch 41 is in a direct coupling state, the second dog clutch 42 is in the released state, the third dog clutch 43 is in the first distribution state, the first friction clutch 47 is in the released state, and the second friction clutch 48 is in the released state in the connection switching device 40. That is, the second switching sleeve 45 does not mesh with the fixing member 29. In such a manner, in the third driving state of the second embodiment, the planetary gear device 24 can make a differential motion, and power of a motor 30 is transmitted from the ring gear R to the transmitting unit 25 via the planetary gear device 24.

Note that a configuration including the second dog clutch 42 has been described in the above-described second embodiment. However, as a modification example of the second embodiment, a configuration including no second dog clutch 42 may be used. Also, it is possible to apply the above-described modification examples of the first embodiment to the second embodiment.

Next, a power transmission device of a third embodiment will be described. In the third embodiment, unlike the first embodiment and the second embodiment, an input shaft 21 is constantly coupled to a sun gear S, and a motor 30 is constantly coupled to a ring gear R. Note that in the description of the third embodiment, the same reference signs are used for configurations similar to those of the first embodiment and the second embodiment, and a description thereof is omitted.

Figure 13:
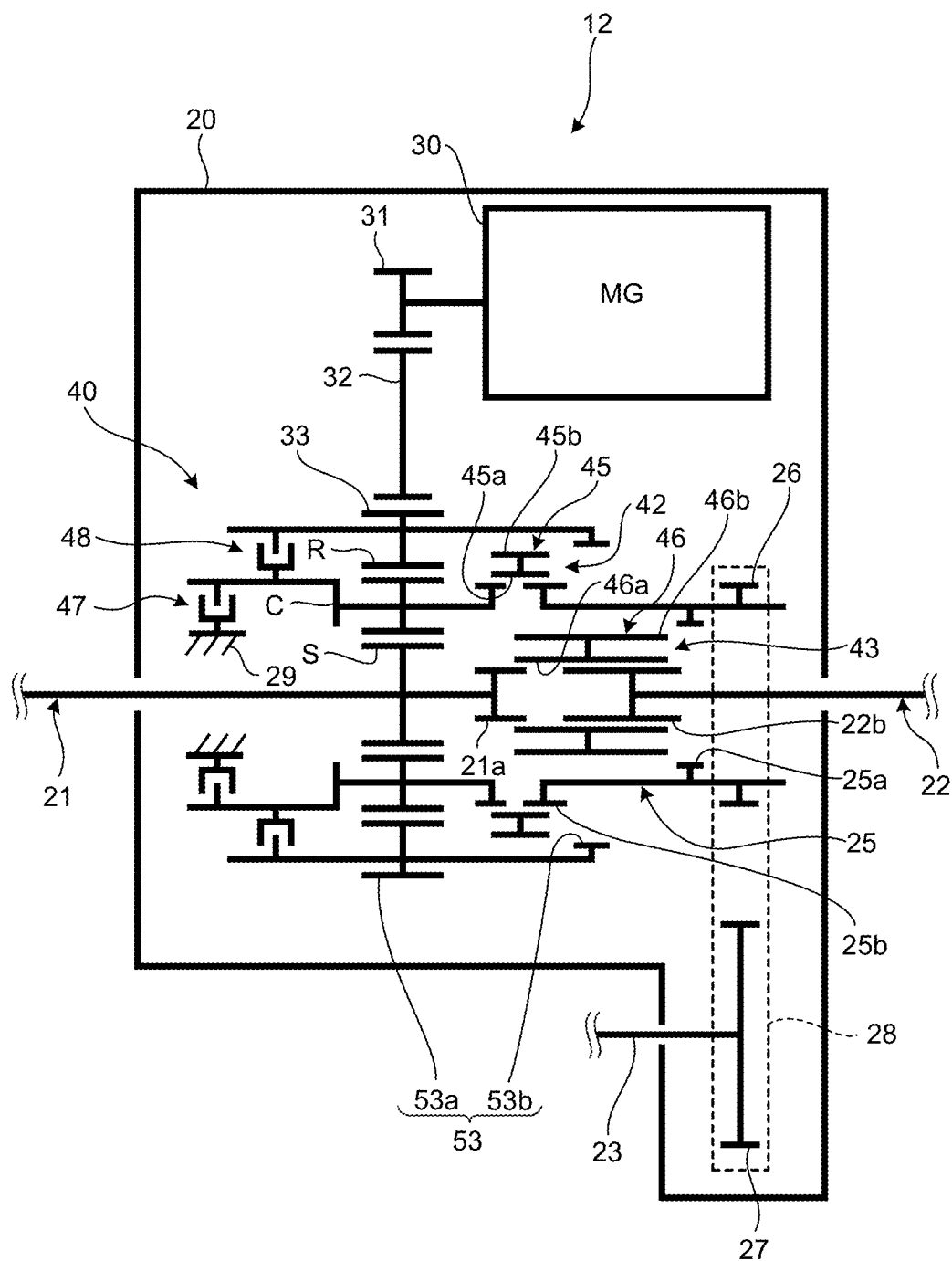
FIG. 13 is a skeleton diagram schematically illustrating a transfer in a power transmission device of a third embodiment.

FIG. 13 is a skeleton diagram schematically illustrating a transfer in the power transmission device of the third embodiment. In a transfer 12 of the third embodiment, a sun gear S is constantly coupled to an input shaft 21. The sun gear S and the input shaft 21 are coupled in such a manner as to rotate integrally. Furthermore, a motor 30 is constantly coupled to a ring gear R.

A connection switching device 40 includes a second dog clutch 42, a third dog clutch 43, a first friction clutch 47, and a second friction clutch 48. That is, the above-described first dog clutch 41 is not included in the third embodiment. Note that since the second friction clutch 48 is similar to that in the second embodiment, a description thereof is omitted.

The second dog clutch 42 switches a connection relationship between a planetary gear device 24 and a transmitting unit 25, and selectively couples the transmitting unit 25 to a carrier C or the ring gear R. A second switching sleeve 45 included in this second dog clutch 42 is a switching member that meshes with a second rotational member 52, a third rotational member 53, and the transmitting unit 25, and is switched between a distribution state in which the carrier C and the transmitting unit 25 are coupled, and a distribution state in which the ring gear R and the transmitting unit 25 are coupled.

The third dog clutch 43 switches a connection relationship among the input shaft 21, a rear wheel-side output shaft 22, and the transmitting unit 25. The third dog clutch 43 is switched between a direct coupling state in which the input shaft 21 and the rear wheel-side output shaft 22 are directly coupled, and a speed-changing state in which the transmitting unit 25 is coupled to the rear wheel-side output shaft 22. A third switching sleeve 46 included in the third dog clutch 43 meshes with the input shaft 21, the rear wheel-side output shaft 22, and the transmitting unit 25. The third switching sleeve 46 is moved in an axial direction by an actuator of the third dog clutch 43, and is switched between the direct coupling state of meshing with the input shaft 21 and the rear wheel-side output shaft 22, and the speed-changing state of meshing with the rear wheel-side output shaft 22 and the transmitting unit 25.

The first friction clutch 47 is a friction engagement device that selectively fixes the carrier C to a fixing member 29, and is a hydraulic type operated by a hydraulic actuator. This first friction clutch 47 has a first friction engagement element on a fixation side, and a second friction engagement element on a rotation side which element rotates integrally with the carrier C. Engagement force is generated by a hydraulic pressure. Then, the carrier C becomes unrotatable when the first friction clutch 47 is engaged, and the carrier C becomes rotatable when the first friction clutch 47 is released.

Also, as illustrated in FIG. 13, in a case where the transfer 12 of the third embodiment is in a third driving state, the planetary gear device 24 is in a second mode in which the sun gear S, the carrier C, and the ring gear R can make differential motions, and the second dog clutch 42 is in the distribution state, the third dog clutch 43 is in a non-distribution state, the first friction clutch 47 is in a released state, and the second friction clutch 48 is in the released state in the connection switching device 40. That is, the second switching sleeve 45 meshes with the second rotational member 52 and the transmitting unit 25. The third switching sleeve 46 meshes with the input shaft 21 and the rear wheel-side output shaft 22. In such a manner, in the third driving state of the third embodiment, the planetary gear device 24 can make a differential motion, and power of the motor 30 is transmitted from the carrier C to the transmitting unit 25.

Note that as a modification example of the above-described third embodiment, a dog clutch to selectively couple a carrier C to a fixing member 29 may be included. It is possible to apply the above-described modification examples of the first embodiment to the third embodiment.

Next, a power transmission device of a fourth embodiment will be described. Unlike the first embodiment, a third dog clutch 43 is configured to also function as an input switching unit in the fourth embodiment. Note that in the description of the fourth embodiment, the same reference signs are used for configurations similar to those of the first embodiment, and a description thereof is omitted.

Figure 14:
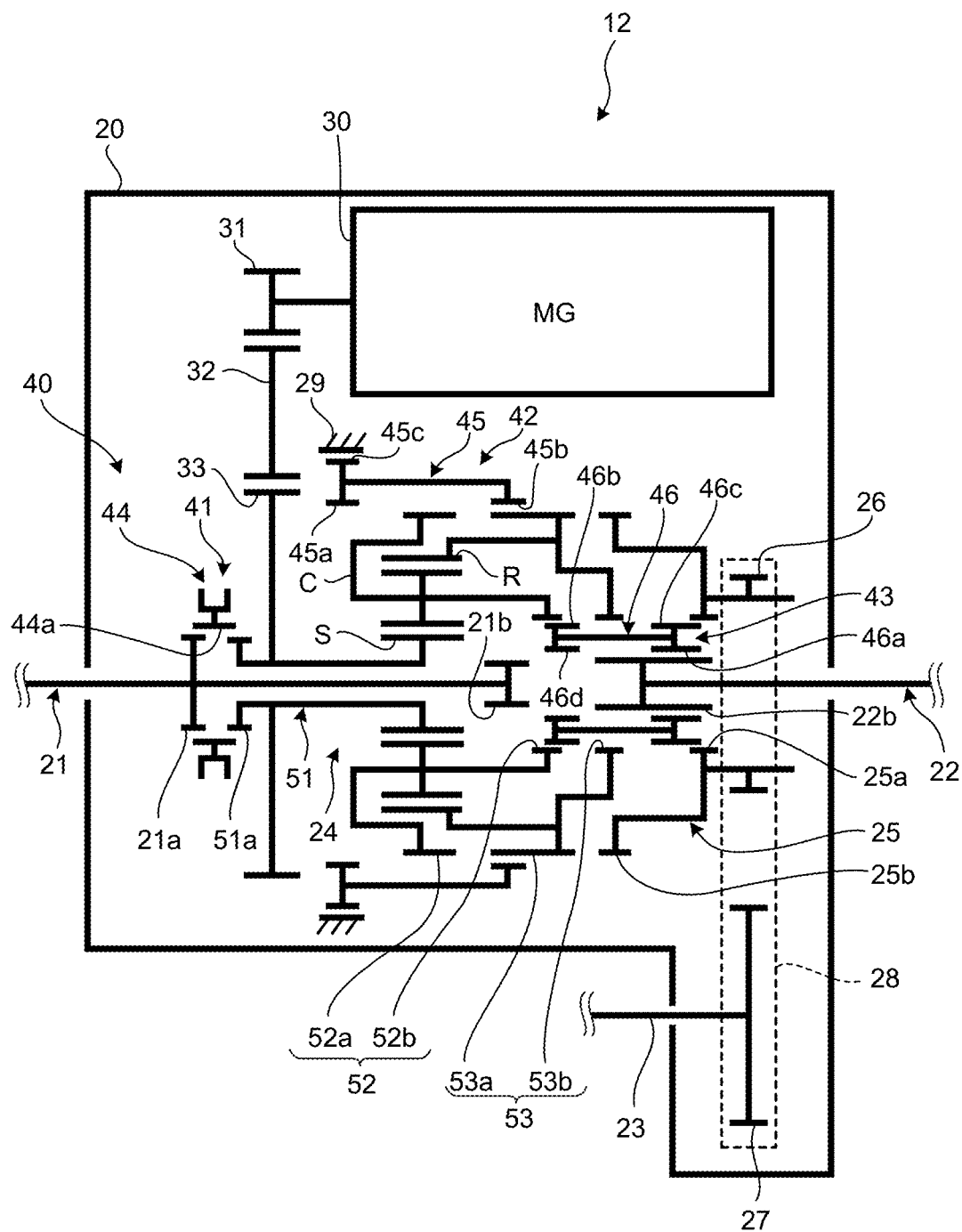
FIG. 14 is a skeleton diagram schematically illustrating a transfer in a power transmission device of a fourth embodiment.

FIG. 14 is a skeleton diagram schematically illustrating a transfer in the power transmission device of the fourth embodiment. In a transfer 12 of the fourth embodiment, a third dog clutch 43 can selectively couple an input shaft 21 and a rear wheel-side output shaft 22.

A first dog clutch 41 is switched between a speed-changing state in which the input shaft 21 and a sun gear S are coupled (engaged state) and a non-speed-changing state in which the input shaft 21 and the sun gear S are not coupled (released state).

The third dog clutch 43 switches a connection relationship among the input shaft 21, the rear wheel-side output shaft 22, a carrier C, a ring gear R, and a transmitting unit 25. A third switching sleeve 46 included in the third dog clutch 43 is switched among a first non-distribution state of meshing with the input shaft 21, a second rotational member 52, and the rear wheel-side output shaft 22, a second non-distribution state of meshing with the input shaft 21, a third rotational member 53, and the rear wheel-side output shaft 22, and a distribution state of meshing with the second rotational member 52, the rear wheel-side output shaft 22, and the transmitting unit 25. The third switching sleeve 46 further has a fourth gear tooth 46d. The fourth gear tooth 46d meshes with a gear tooth 21b of the input shaft 21.

Also, as illustrated in FIG. 14, in a case where the transfer 12 of the fourth embodiment is in a fifth driving state, the planetary gear device 24 is in a first mode in which the ring gear R is mechanically fixed, and the first dog clutch 41 is in the speed-changing state (engaged state) and the third dog clutch 43 is in the distribution state in a connection switching device 40. That is, the first switching sleeve 44 meshes with the input shaft 21 and the first rotational member 51. A second switching sleeve 45 meshes with the third rotational member 53 and a fixing member 29. The third switching sleeve 46 meshes with the second rotational member 52, the rear wheel-side output shaft 22, and the transmitting unit 25.

Note that it is possible to apply the above-described modification examples of the first embodiment to the fourth embodiment.

Also, since EV traveling in two-wheel driving can be performed in the first embodiment, a rotation of the motor 30 is transmitted to the rear wheels 4 with a speed thereof being changed by the transfer 12 when an EV traveling mode is performed in a case where the transfer 12 is in the first driving state. Moreover, in the first embodiment, the EV traveling mode can be performed in a case where the transfer 12 is in the second driving state. That is, when the EV traveling mode is performed in a case where the transfer 12 is in the second driving state, the rotation of the motor 30 is transmitted to the rear wheels 4 with a speed thereof not being reduced by the transfer 12. Then, in the first embodiment, the rear wheels 4 are first drive wheels, and the front wheels 3 are second drive wheels.

Also, in the first embodiment, the second dog clutch 42 is a fixation switching unit that selectively couples one of the three rotational elements included in the planetary gear device 24 to the fixing member 29. That is, the connection switching device 40 includes a fixation switching unit. Then, the fixation switching unit is switched between a fixed state in which a third rotational element is coupled to the fixing member 29, and a non-fixed state in which the third rotational element is rotatably released.

Also, in the first embodiment, in a case where the transfer 12 is in the fourth driving state and the fifth driving state, the third switching sleeve 46 is coupled to the transmitting unit 25. On the one hand, in a case where the transfer 12 is in the first driving state, the second driving state, or the third driving state, the third switching sleeve 46 is not coupled to the transmitting unit 25. Moreover, in a case where the transfer 12 is in the third driving state, the second switching sleeve 45 is coupled to the transmitting unit 25. On the one hand, in a case where the transfer 12 is in the first driving state, the second driving state, the fourth driving state, or the fifth driving state, the second switching sleeve 45 is not coupled to the transmitting unit 25.

Also, in the first embodiment, the connection switching device 40 selectively switches a connection relationship among the input shaft 21, the rear wheel-side output shaft 22, the front wheel-side output shaft 23, the sun gear S, the carrier C, and the ring gear R. Then, the input switching unit switches a connection destination of the input shaft 21. Also, the distribution switching unit selectively couples the rear wheel-side output shaft 22 to the carrier C or the ring gear R. This distribution switching unit is switched between a first connection state in which the rear wheel-side output shaft 22 is coupled to the carrier C, and a second connection state in which the rear wheel-side output shaft 22 is coupled to the ring gear R. Moreover, the distribution switching unit can be switched to a third connection state in which the rear wheel-side output shaft 22 is coupled to the carrier C and the ring gear R.

In more detail, the distribution switching unit includes a first distribution switching member that selectively couples the rear wheel-side output shaft 22 to the carrier C or the ring gear R, and a second distribution switching member that selectively couples the carrier C and the ring gear R. The first distribution switching member is switched among the first connection state, the second connection state, and the third connection state. The second distribution switching member is switched between a fourth connection state in which the carrier C and the ring gear R are coupled, and a fifth connection state in which the carrier C and the ring gear R are not coupled. That is, the third dog clutch 43 and the third switching sleeve 46 are switched among the first connection state, the second connection state, and the third connection state. The second dog clutch 42 and the second switching sleeve 45 are switched between the fourth connection state and the fifth connection state.

Also, for example, in the second embodiment or the third embodiment having a configuration in which a connection switching device 40 includes a second friction clutch 48 and a ring gear R and a carrier C are selectively engaged by the second friction clutch 48, the second friction clutch 48 functions as a second distribution switching member. That is, as illustrated in FIG. 12, the third dog clutch 43 and the third switching sleeve 46 are switched between the first connection state and the second connection state in the second embodiment. Then, the second friction clutch 48 is switched between the fourth connection state and the fifth connection state.

Next, a power transmission device of a fifth embodiment will be described. Unlike the first embodiment, a power transmission device 10 can perform two-wheel-drive traveling in which only front wheels 3 are drive wheels in an EV traveling mode in the fifth embodiment. Note that in the description of the fifth embodiment, the same reference signs are used for configurations similar to those of the first embodiment, and a description thereof is omitted.

A vehicle 1 of the fifth embodiment includes a power transmission device 10 that can perform two-wheel-drive traveling in which front wheels 3 are drive wheels and rear wheels 4 are auxiliary drive wheels during an EV traveling mode. The front wheels 3 become drive wheels in two-wheel-drive traveling and four-wheel-drive traveling in the EV traveling mode. The rear wheels 4 become auxiliary drive wheels during the two-wheel-drive traveling in the EV traveling mode, and become drive wheels during the four-wheel-drive traveling. In this fifth embodiment, the rear wheels 4 are first drive wheels and the front wheels 3 are second drive wheels.

Figure 15:
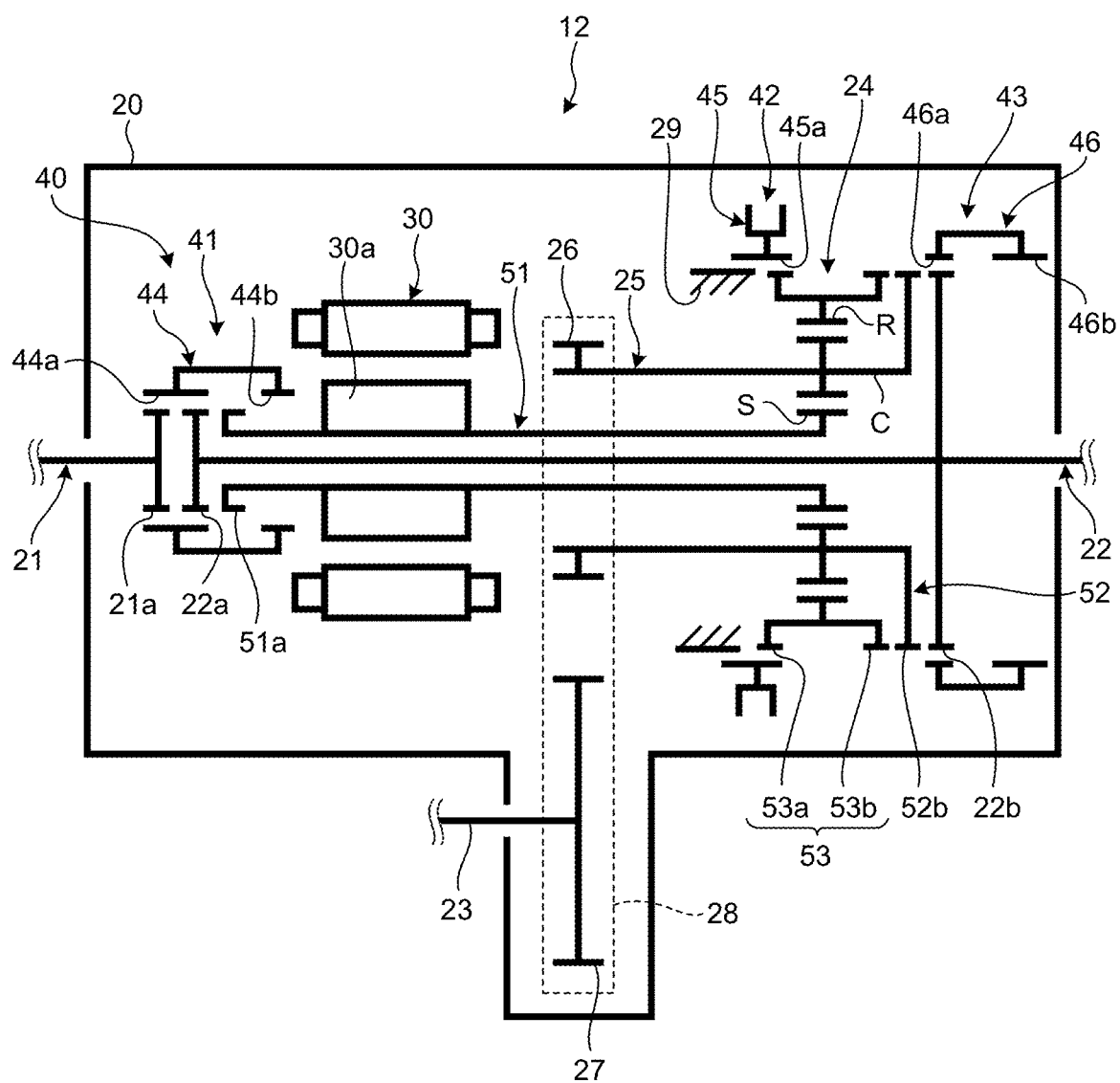
FIG. 15 is a skeleton diagram schematically illustrating a transfer in a power transmission device of a fifth embodiment.

FIG. 15 is a skeleton diagram schematically illustrating a transfer in the power transmission device in the fifth embodiment. In a transfer 12 of the fifth embodiment, a carrier C of a planetary gear device 24 is constantly coupled to a transmitting unit 25 that is an input unit on a side of the front wheels. The carrier C and the transmitting unit 25 are coupled in such a manner as to rotate integrally. That is, the carrier C is constantly connected to a front wheel-side output shaft 23 in a manner of being able to transmit power.

A motor 30 is arranged on the same axis as an input shaft 21 and a rear wheel-side output shaft 22, and is configured to rotate integrally with a first rotational member 51. The motor 30 includes a rotor 30a attached to the first rotational member 51. The rotor 30a is coupled in such a manner as to rotate integrally with a sun gear S. Thus, the rotor 30a, the first rotational member 51, and the sun gear S rotate integrally.

A second dog clutch 42 selectively fixes a ring gear R to a fixing member 29. That is, this second dog clutch 42 is a fixation switching unit. A second switching sleeve 45 included in the second dog clutch 42 constantly meshes with the fixing member 29. The second switching sleeve 45 is switched between an engaged state of meshing with a first output gear tooth 53a of a third rotational member 53 (fixed state), and a released state of not meshing with the first output gear tooth 53a (non-fixed state).

A third dog clutch 43 switches a connection relationship among the rear wheel-side output shaft 22, the carrier C, and the ring gear R. The third dog clutch 43 is switched among a first non-distribution state in which the rear wheel-side output shaft 22 is not coupled to the ring gear R and the carrier C (sixth connection state), a second non-distribution state in which the ring gear R is coupled to the carrier C (seventh connection state), a first distribution state in which the rear wheel-side output shaft 22 is coupled to the ring gear R (second connection state), a second distribution state in which the rear wheel-side output shaft 22 is coupled to the ring gear R and the carrier C (third connection state), and a third distribution state in which the rear wheel-side output shaft 22 is coupled to the carrier C (first connection state). That is, the third dog clutch 43 of the fifth embodiment can be switched, as a distribution switching unit, between the sixth connection state in which the rear wheel-side output shaft 22 is not coupled to the ring gear R and the carrier C, and the seventh connection state in which the ring gear R is coupled to the carrier C.

This third dog clutch 43 has a third switching sleeve 46 that functions as a first distribution switching member and a second distribution switching member. The third switching sleeve 46 includes a first gear tooth 46a that meshes with a second gear tooth 22b of the rear wheel-side output shaft 22 and a second output gear tooth 53b of the third rotational member 53, and a second gear tooth 46b that meshes with a second output gear tooth 52b of the second rotational member 52, the second output gear tooth 53b of the third rotational member 53, and the second gear tooth 22b of the rear wheel-side output shaft 22. Then, the third switching sleeve 46 is switched among a first non-distribution state of meshing only with the rear wheel-side output shaft 22 (sixth connection state), a second non-distribution state of meshing with the third rotational member 53 and the second rotational member 52 in a state of not meshing with the rear wheel-side output shaft 22 (seventh connection state), a first distribution state of meshing with the rear wheel-side output shaft 22 and the third rotational member 53 in a state of not meshing with the second rotational member 52 (second connection state), a second distribution state of meshing with the rear wheel-side output shaft 22, the third rotational member 53, and the second rotational member 52 (third connection state), and a third distribution state of meshing with the rear wheel-side output shaft 22 and the second rotational member 52 in a state of not meshing with the third rotational member 53 (first connection state). That is, the third switching sleeve 46 of the fifth embodiment can be switched, as a distribution switching member, between the sixth connection state of meshing only with the rear wheel-side output shaft 22, and the seventh connection state of meshing with the third rotational member 53 and the second rotational member 52 in a state of not meshing with the rear wheel-side output shaft 22. Then, since also functioning as the second distribution switching member, the third dog clutch 43 is in the first connection state, the third connection state, and the seventh connection state as the first distribution switching member, and is in the fourth connection state as the second distribution switching member in a case of coupling the carrier C and the ring gear R. Similarly, it means that the third dog clutch 43 becomes the fifth connection state as the second distribution switching member in a case of becoming the second connection state or the sixth connection state as the first distribution switching member.

Here, with reference to FIG. 15 to FIG. 19, first to fifth driving states realized by the transfer 12 of the fifth embodiment will be described.

First, with reference to FIG. 15, the first driving state of the fifth embodiment will be described. The first driving state of the fifth embodiment is a two-wheel driving state in which power is transmitted only to front wheels 3 among front and rear wheels, and is a case where a connection switching device 40 becomes a non-distribution state and a planetary gear device 24 becomes a speed-changing state. In this first driving state, power of a motor 30 can be transmitted to the front wheels 3 in a state in which an engine 2 is stopped, and two-wheel driving in which a rotation of the motor 30 is reduced by a transfer 12 can be performed.

As illustrated in FIG. 15, in a case where the transfer 12 of the fifth embodiment is in the first driving state, the planetary gear device 24 is in a first mode in which a ring gear R is mechanically fixed, and a first dog clutch 41 is in a direct coupling state, a second dog clutch 42 is in a released state, and a third dog clutch 43 is in a first non-distribution state (sixth connection state) in the connection switching device 40. That is, the second switching sleeve 45 meshes with the third rotational member 53 and the fixing member 29. The third switching sleeve 46 meshes only with the rear wheel-side output shaft 22.

In such a manner, in the first driving state, although the engine 2 is in a state of being directly coupled to a rear wheel-side output shaft 22, the rear wheel-side output shaft 22 is not driven by the engine 2 while the engine 2 is stopped. On the one hand, the motor 30 is coupled to a front wheel-side output shaft 23 via the planetary gear device 24 in the speed-changing state. Thus, in the first driving state, when the power of the motor 30 is transmitted to the front wheel-side output shaft 23, a rotation of the motor 30 is transmitted to the front wheel-side output shaft 23 with a speed thereof being changed by the planetary gear device 24.

Next, the second driving state of the fifth embodiment will be described with reference to FIG. 16. The second driving state of the fifth embodiment is a two-wheel driving state in which power is transmitted only to the front wheels 3 among the front and rear wheels, and is a case where the connection switching device 40 is in a non-distribution state and the planetary gear device 24 is in a non-speed-changing state. In this second driving state, it is possible to transmit power of the motor 30 to the front wheels 3 in a state in which the engine 2 is stopped, and two-wheel driving can be performed with a speed of a rotation of the motor 30 not being reduced by the transfer 12.

Figure 16:
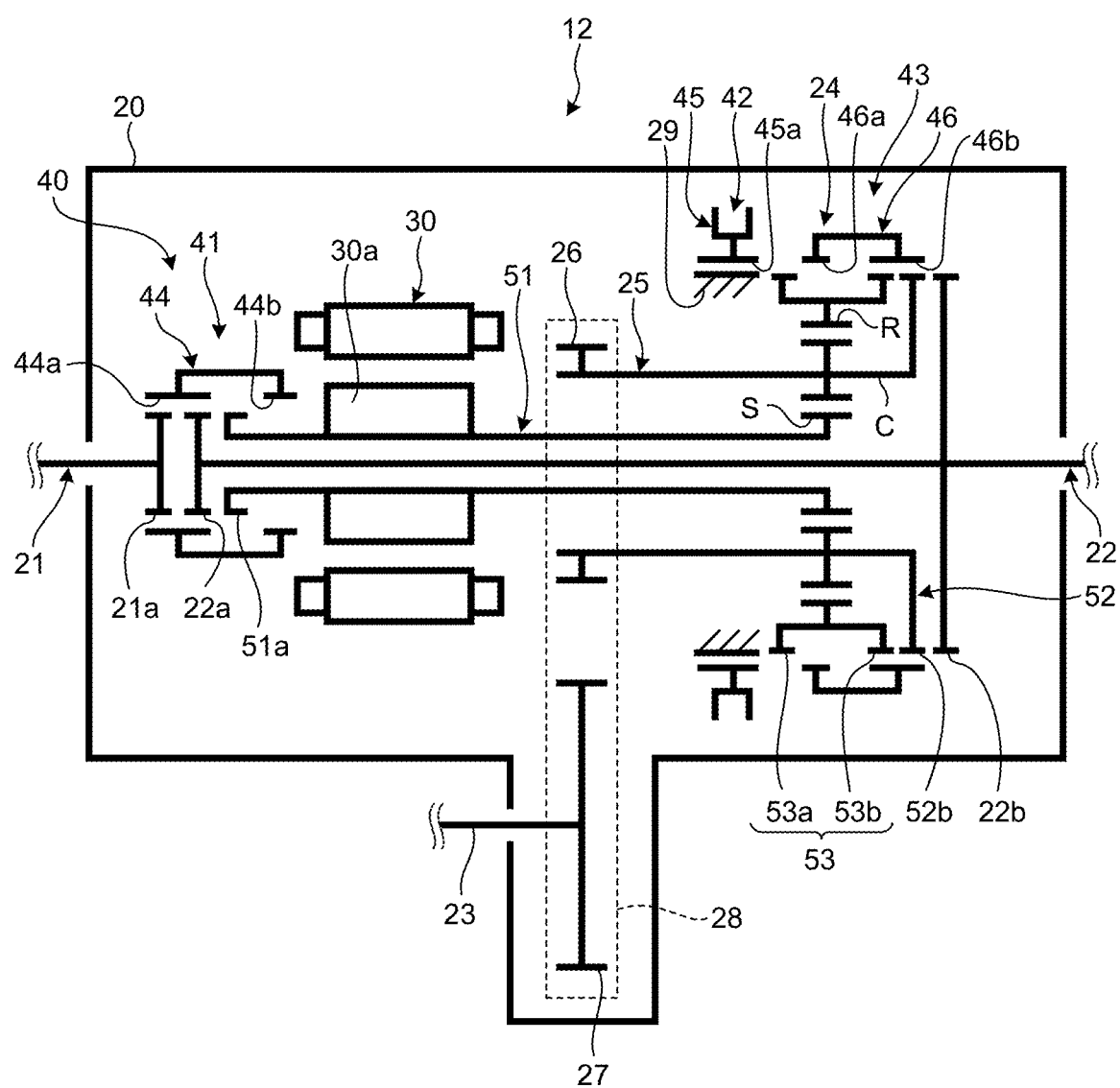
FIG. 16 is a skeleton diagram illustrating a case where the transfer of the fifth embodiment is in the second driving state.

As illustrated in FIG. 16, in a case where the transfer 12 of the fifth embodiment is in the second driving state, the planetary gear device 24 is in a third mode in which a carrier C and the ring gear R are coupled integrally rotatably, and the first dog clutch 41 is in the direct coupling state and the third dog clutch 43 is in a second non-distribution state (seventh connection state) in the connection switching device 40. That is, the second switching sleeve 45 does not mesh with the third rotational member 53. The third switching sleeve 46 meshes with a second rotational member 52 and the third rotational member 53.

In such a manner, in the second driving state, although the engine 2 is in a state of being directly coupled to the rear wheel-side output shaft 22, the rear wheel-side output shaft 22 is not driven by the engine 2 while the engine 2 is stopped. Also, although the motor 30 is coupled to the front wheel-side output shaft 23 via the planetary gear device 24, the planetary gear device 24 is in the non-speed-changing state. Thus, in the second driving state, when the power of the motor 30 is transmitted to the front wheel-side output shaft 23, three rotational elements of the planetary gear device 24 have the same rotational speed. That is, a rotation of the motor 30 is transmitted to the front wheel-side output shaft 23 with a speed thereof not being changed by the planetary gear device 24.

Figure 17:
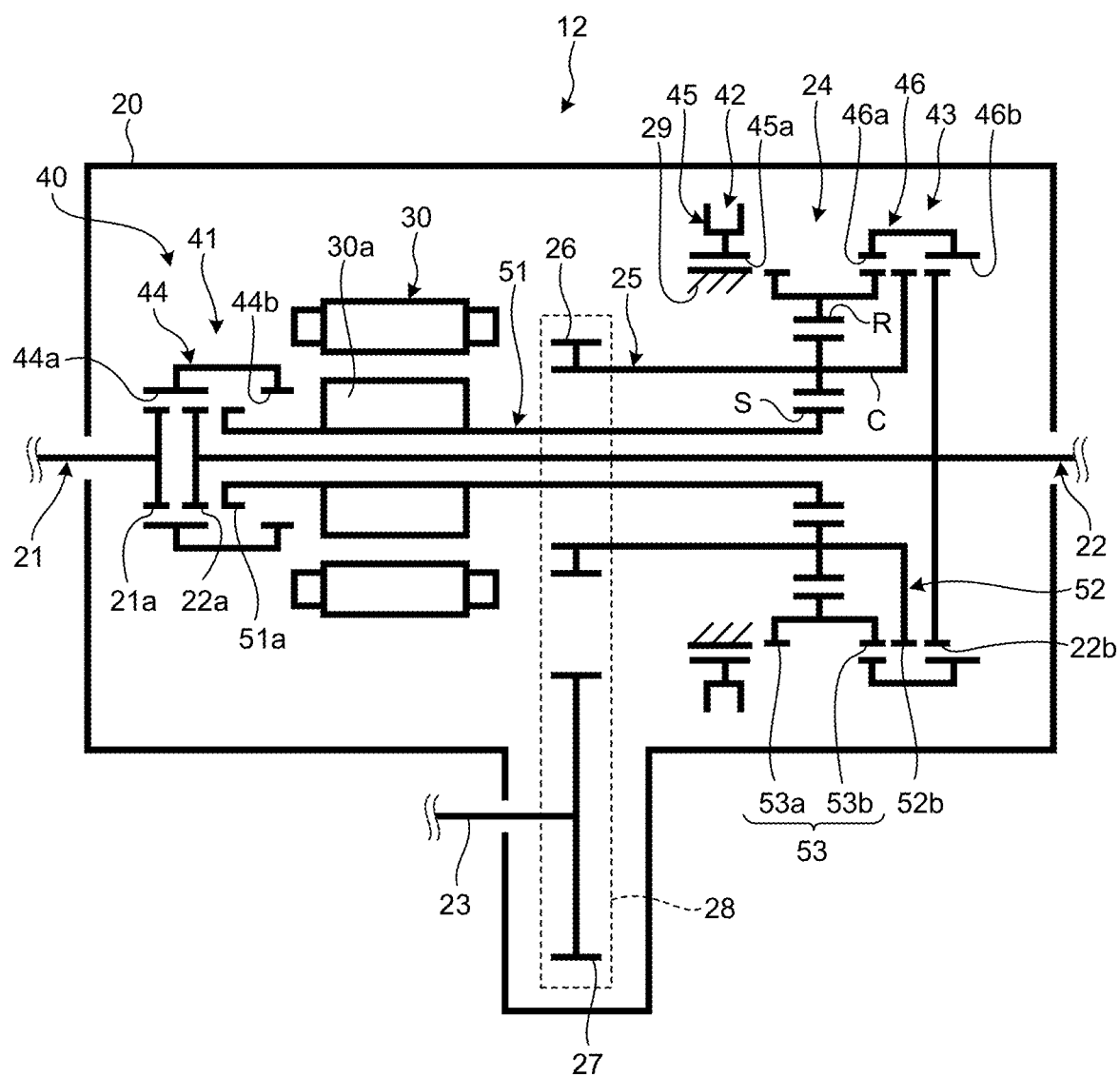
FIG. 17 is a skeleton diagram illustrating a case where the transfer of the fifth embodiment is in the third driving state.

Next, with reference to FIG. 17, a third driving state of the fifth embodiment will be described. As illustrated in FIG. 17, in a case where the transfer 12 of the fifth embodiment is in the third driving state, the planetary gear device 24 is in a second mode in which a sun gear S, the carrier C, and the ring gear R can make differential motions, and the first dog clutch 41 is in the direct coupling state, the second dog clutch 42 is in the released state, and the third dog clutch 43 is in a first distribution state (second connection state) in the connection switching device 40. That is, the second switching sleeve 45 does not mesh with the third rotational member 53. The third switching sleeve 46 meshes with the third rotational member 53 and the rear wheel-side output shaft 22.

Figure 18:
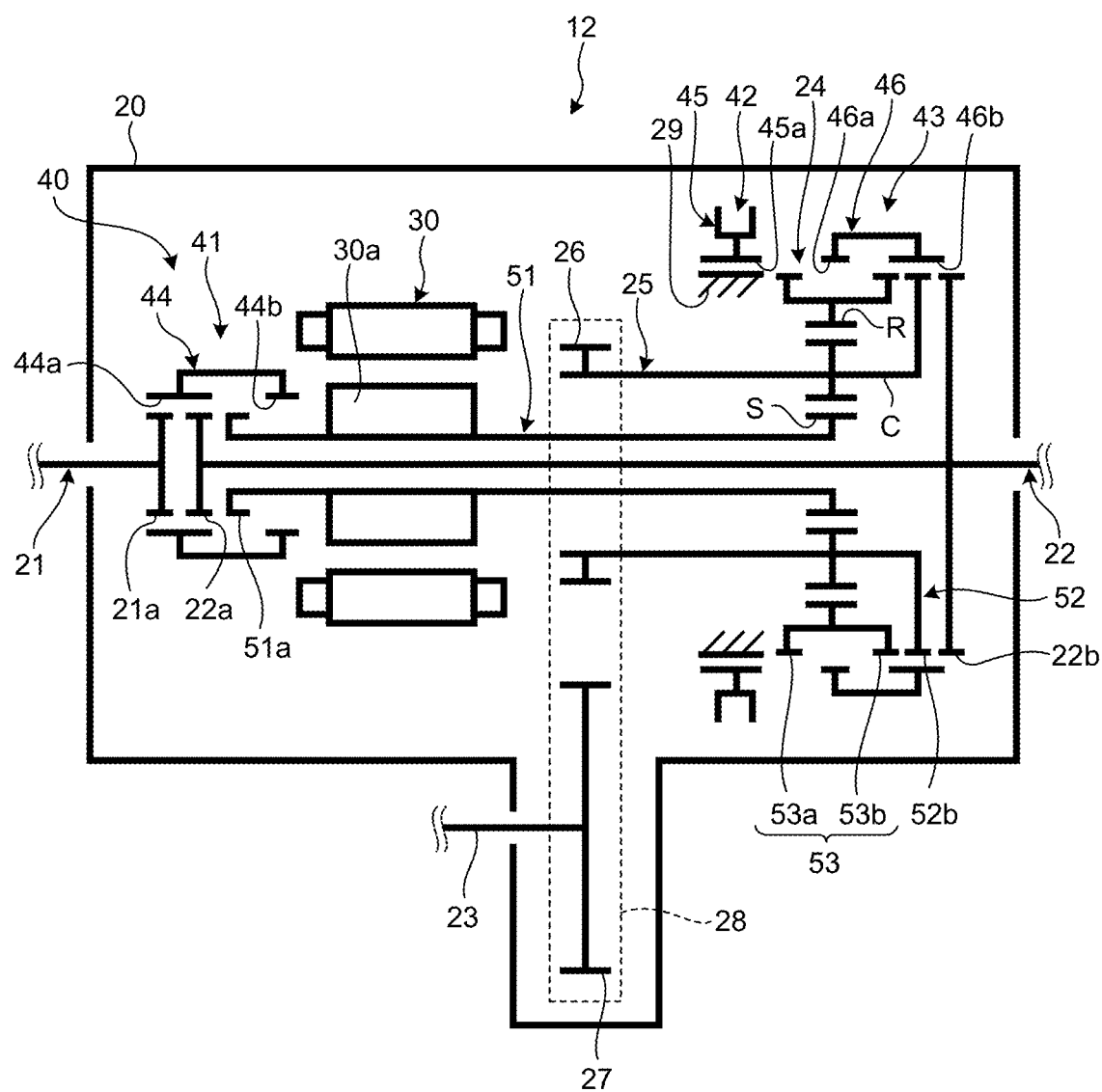
FIG. 18 is a skeleton diagram illustrating a case where the transfer of the fifth embodiment is in the fourth driving state.

Next, with reference to FIG. 18, a fourth driving state of the fifth embodiment will be described. As illustrated in FIG. 18, in a case where the transfer 12 of the fifth embodiment is in the fourth driving state, the planetary gear device 24 is in a third mode in which the carrier C and the ring gear R are coupled integrally rotatably, and the first dog clutch 41 is in the direct coupling state, the second dog clutch 42 is in the released state, and the third dog clutch 43 is in a second distribution state (third connection state) in the connection switching device 40. That is, the second switching sleeve 45 does not mesh with the third rotational member 53. The third switching sleeve 46 meshes with the second rotational member 52, the third rotational member 53, and the rear wheel-side output shaft 22.

Figure 19:
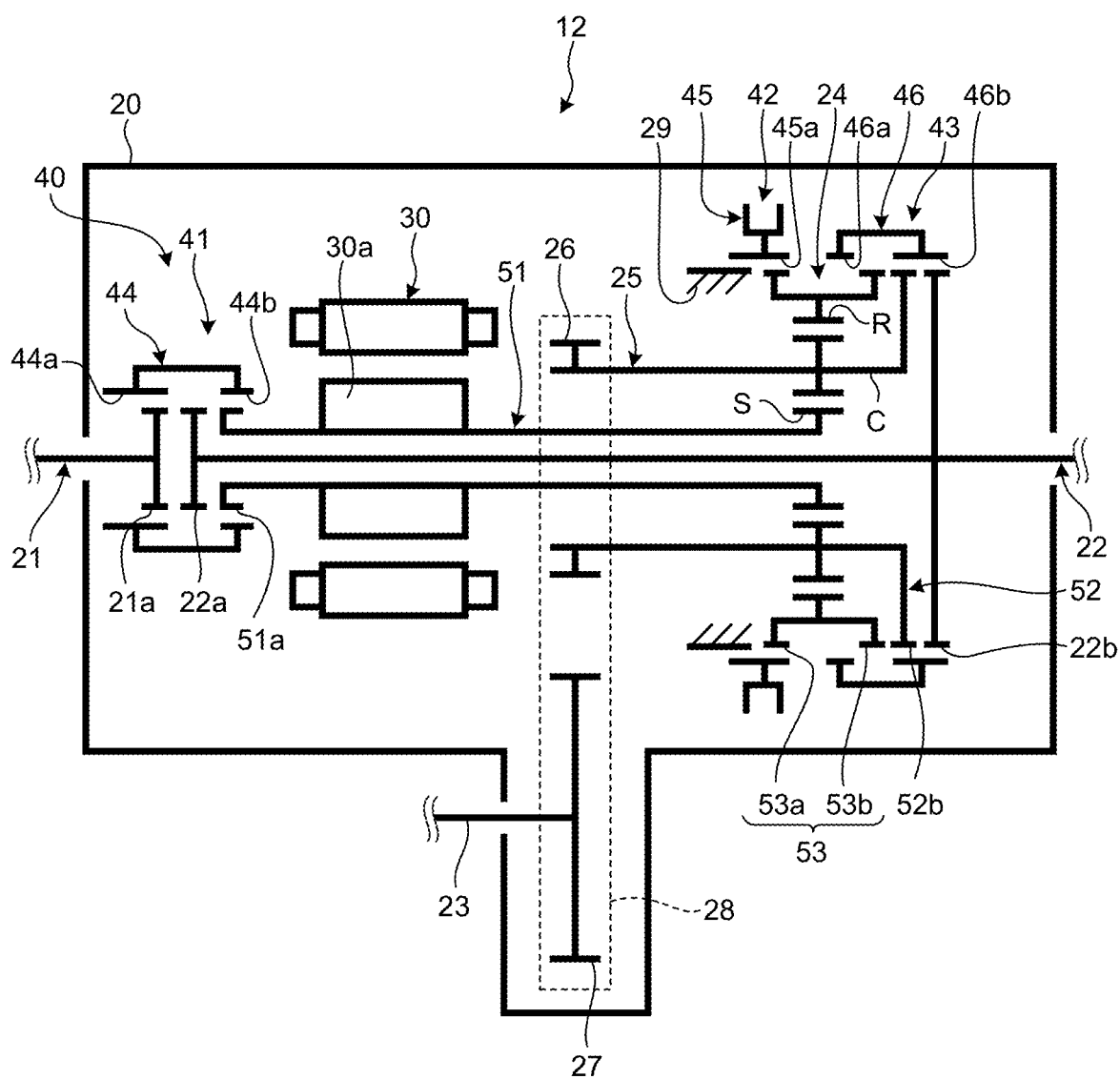
FIG. 19 is a skeleton diagram illustrating a case where the transfer of the fifth embodiment is in the fifth driving state.

Next, with reference to FIG. 19, a fifth driving state of the fifth embodiment will be described. First, in the fifth driving state of the fifth embodiment, it is possible to drive the front wheels 3 with the motor 30 even in a Lo mode. Then, as illustrated in FIG. 19, in a case where the transfer 12 of the fifth embodiment is in the fifth driving state, the planetary gear device 24 is in a first mode in which the ring gear R is mechanically fixed, and the first dog clutch 41 is in a second input state, the second dog clutch 42 is in an engaged state, and the third dog clutch 43 is in a third distribution state (first connection state) in the connection switching device 40. That is, the second switching sleeve 45 meshes with the fixing member 29 and the third rotational member 53. The third switching sleeve 46 meshes with the rear wheel-side output shaft 22 and the second rotational member 52.

As described above, according to the fifth embodiment, even in the power transmission device 10 that can only drive the front wheels 3 in the EV traveling mode, effects similar to those of the first embodiment can be acquired.

Note that as a modification example of the fifth embodiment, a friction engagement device that selectively couples a carrier C and a ring gear R may be included. This modification example is illustrated in FIG. 20 and FIG. 21.

Figure 20:
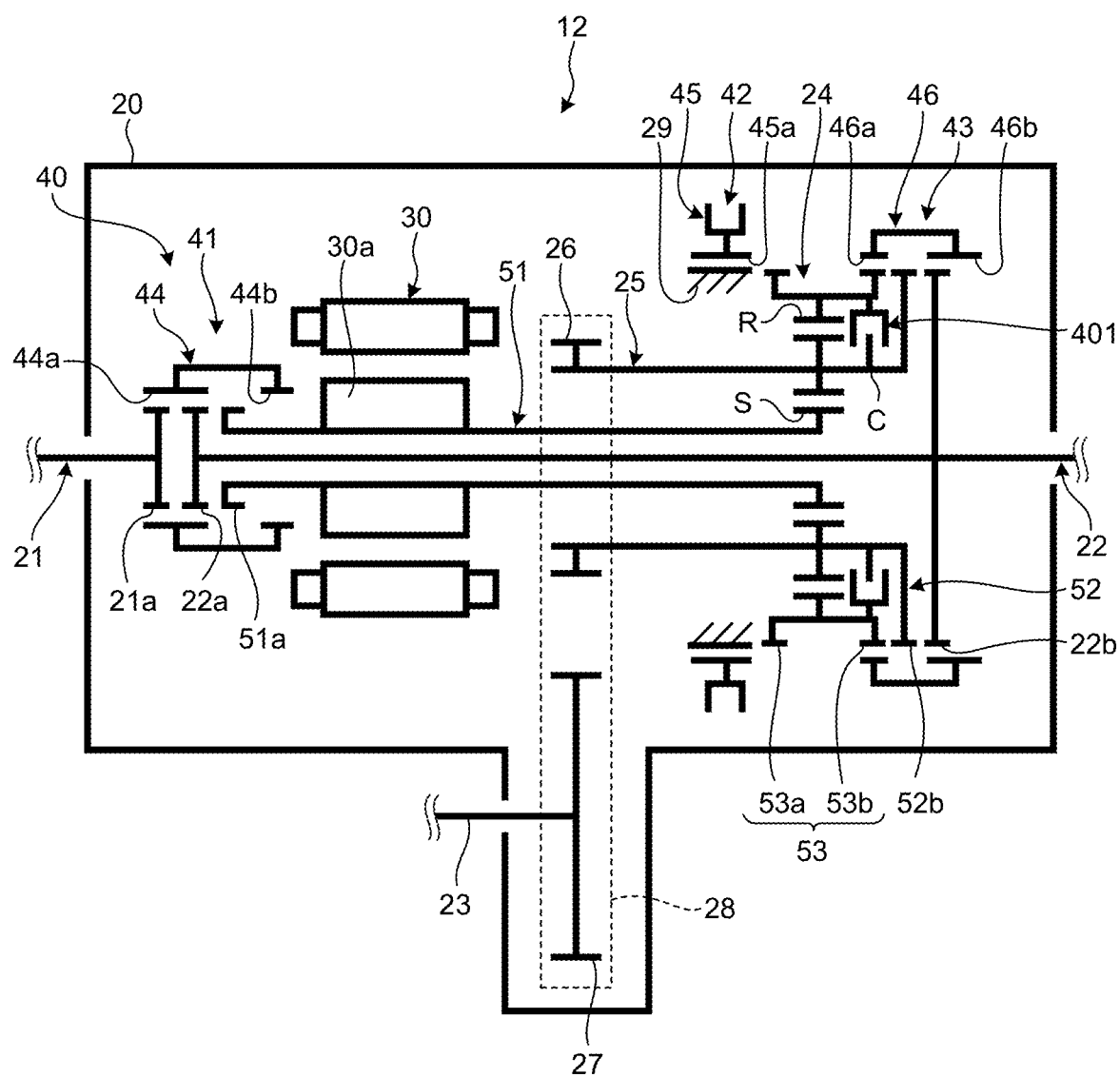
FIG. 20 is a skeleton diagram schematically illustrating a transfer in a first modification example of the fifth embodiment.
Figure 21:
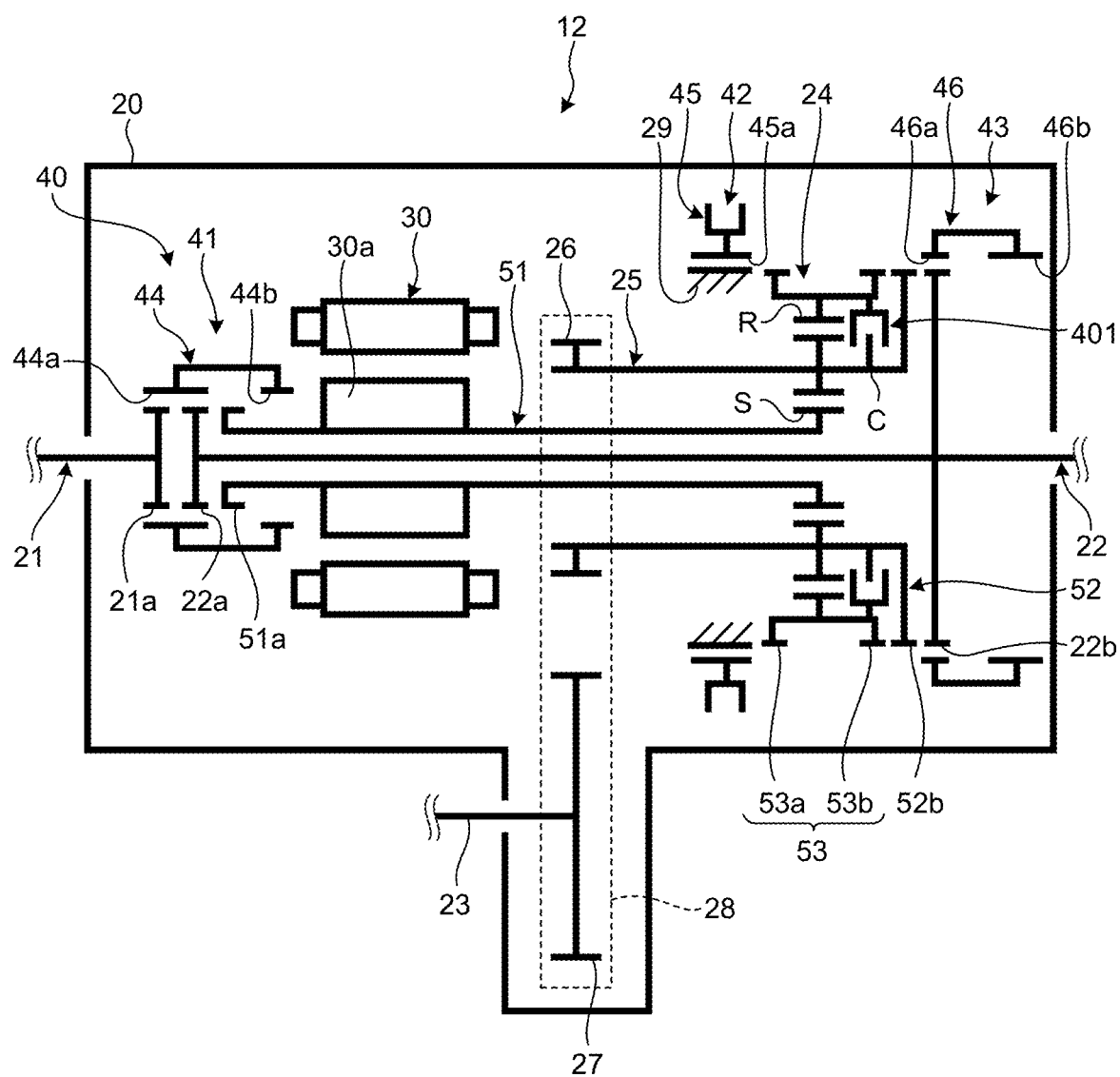
FIG. 21 is a skeleton diagram illustrating a case where the transfer in the first modification example of the fifth embodiment is in the second driving state.

As illustrated in FIG. 20, in a transfer 12 of a first modification example of the fifth embodiment, a connection switching device 40 includes a first dog clutch 41, a second dog clutch 42, a third dog clutch 43, and a friction clutch 401. Note that a hardware configuration of the friction clutch 401 is similar to that of the second friction clutch 48 of the second embodiment.

In this first modification example, since the first dog clutch 41 is in a direct coupling state, the second dog clutch 42 is in a released state, the third dog clutch 43 is in a first distribution state or a first non-distribution state, the friction clutch 401 can be switched between an engaged state and a released state in a case where a carrier C and a ring gear R rotate relatively in a planetary gear device 24.

For example, as illustrated in FIG. 20, in a case where the first dog clutch 41 couples an input shaft 21 and a rear wheel-side output shaft 22, the second dog clutch 42 is released, and the third dog clutch 43 couples the ring gear R and the rear wheel-side output shaft 22, the transfer 12 is in a fourth driving state when the friction clutch 401 is in the engaged state, and the transfer 12 is in a third driving state when the friction clutch 401 is in the released state. That is, in the first modification example, even when a third switching sleeve 46 is not moved in an axial direction by an actuator of the third dog clutch 43, it is possible to switch the third driving state and the fourth driving state by changing a state of the friction clutch 401. Then, in a case where the friction clutch 401 is switched from the released state to the engaged state and a transition from the third driving state to the fourth driving state is made, the third switching sleeve 46 may be moved in the axial direction and the third switching sleeve 46 may be coupled to a second rotational member 52, a third rotational member 53, and the rear wheel-side output shaft 22 while the friction clutch 401 is kept engaged. In this case, after the third switching sleeve 46 transitions from the first distribution state to the second distribution state, the friction clutch 401 may be switched from the engaged state to the released state.

Also, as illustrated in FIG. 21, in a case where the first dog clutch 41 couples the input shaft 21 and the rear wheel-side output shaft 22, the second dog clutch 42 is released, and the third dog clutch 43 is coupled only to the rear wheel-side output shaft 22, the friction clutch 401 is in the engaged state and the transfer 12 is in a second driving state. That is, in the first modification example, even when the third switching sleeve 46 is not moved in the axial direction by the actuator of the third dog clutch 43, it is possible to realize the second driving state by switching the friction clutch 401 from a released state to the engaged state.

Also, in the first modification example, a dedicated dog clutch to selectively engage the carrier C and the ring gear R may be included instead of the friction clutch 401. Moreover, in this first modification example, a dedicated friction engagement device to couple the ring gear R to the fixing member 29 may be included instead of the second dog clutch 42.

Also, as a second modification example of the fifth embodiment, a friction engagement device to selectively fix a ring gear R to a fixing member 29 may be included in addition to a friction engagement device (friction clutch 401) to selectively couple a carrier C and a ring gear R. This second modification example is illustrated in FIG. 22.

Figure 22:
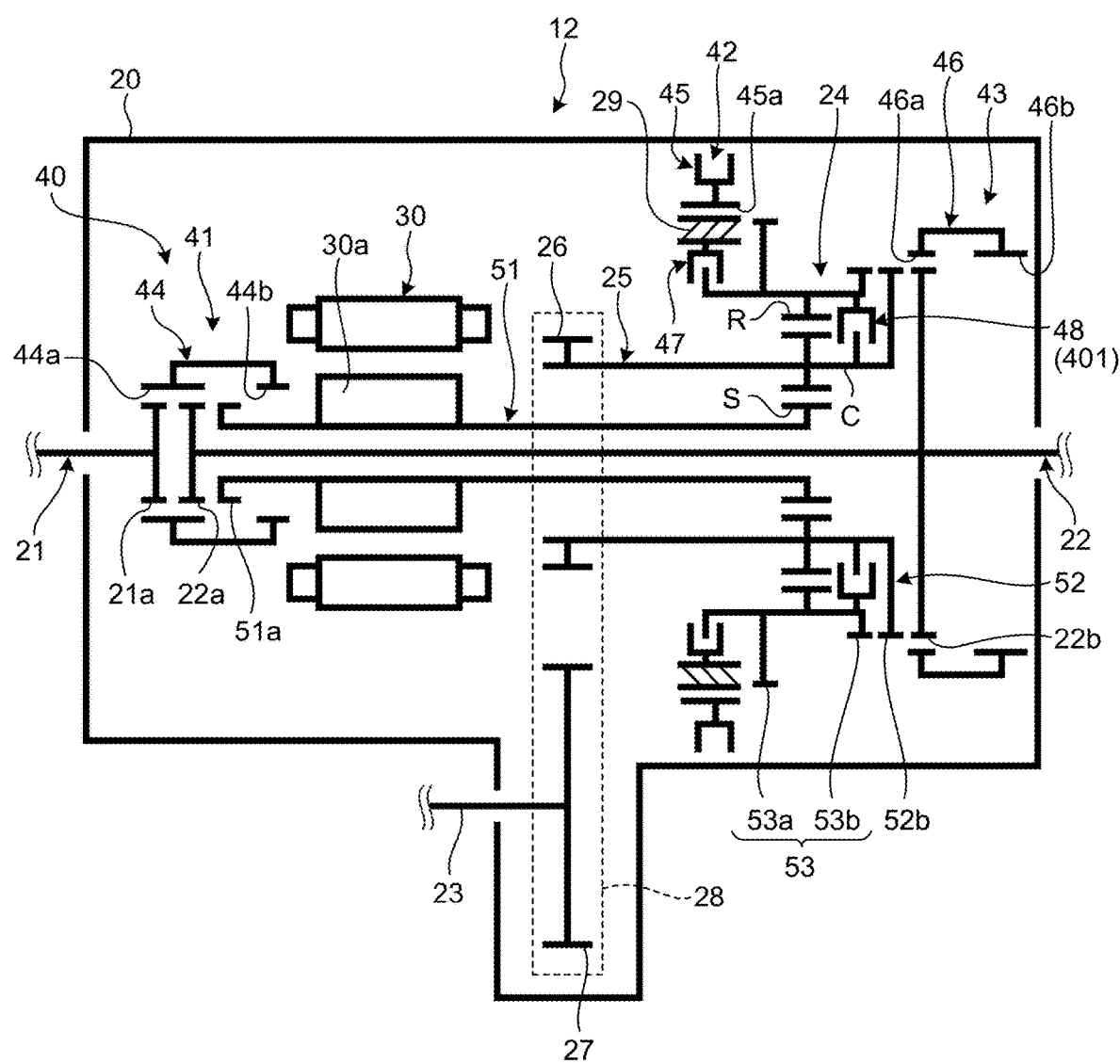
FIG. 22 is a skeleton diagram schematically illustrating a transfer in a second modification example of the fifth embodiment.

As illustrated in FIG. 22, in a transfer 12 in a second modification example of the fifth embodiment, a connection switching device 40 includes a first dog clutch 41, a second dog clutch 42, a third dog clutch 43, a first friction clutch 47, and a second friction clutch 48. Note that the first friction clutch 47 is similar to the first friction clutch 47 of the second embodiment. A hardware configuration of the second friction clutch 48 is similar to that of the friction clutch 401 of the modification example.

In this second modification example, since the first dog clutch 41 is in a direct coupling state, the second dog clutch 42 is in a released state, and the third dog clutch 43 is in a first non-distribution state, an engaged state and a released state of the first friction clutch 47 and the second friction clutch 48 can be switched in a case where a carrier C and a ring gear R rotate relatively in a planetary gear device 24.

For example, as illustrated in FIG. 22, in a case where the first dog clutch 41 couples an input shaft 21 and a rear wheel-side output shaft 22, the second dog clutch 42 is released, and the third dog clutch 43 is coupled only to the rear wheel-side output shaft 22, a transfer 12 is in a first driving state when the first friction clutch 47 is in the engaged state and the second friction clutch 48 is in the released state, and the transfer 12 is in a second driving state when the first friction clutch 47 is in the released state and the second friction clutch 48 is in the engaged state. That is, in the second modification example, even when the second dog clutch 42 and the third dog clutch 43 are not operated, it is possible to switch the first driving state and the second driving state by changing states of the first friction clutch 47 and the second friction clutch 48.

Next, a power transmission device of a sixth embodiment will be described. In the sixth embodiment, unlike the fifth embodiment, a power transmission device 10 can selectively separate a front wheel-side output shaft 23 from a carrier C. Note that in the description of the sixth embodiment, the same reference signs are used for configurations similar to those of the fifth embodiment, and a description thereof is omitted.

First, similarly to the first embodiment, a vehicle 1 of the sixth embodiment includes a power transmission device 10 that can perform two-wheel-drive traveling in which rear wheels 4 are drive wheels and front wheels 3 are auxiliary drive wheels during an EV traveling mode. In this sixth embodiment, the rear wheels 4 are first drive wheels and the front wheels 3 are second drive wheels.

Figure 23:
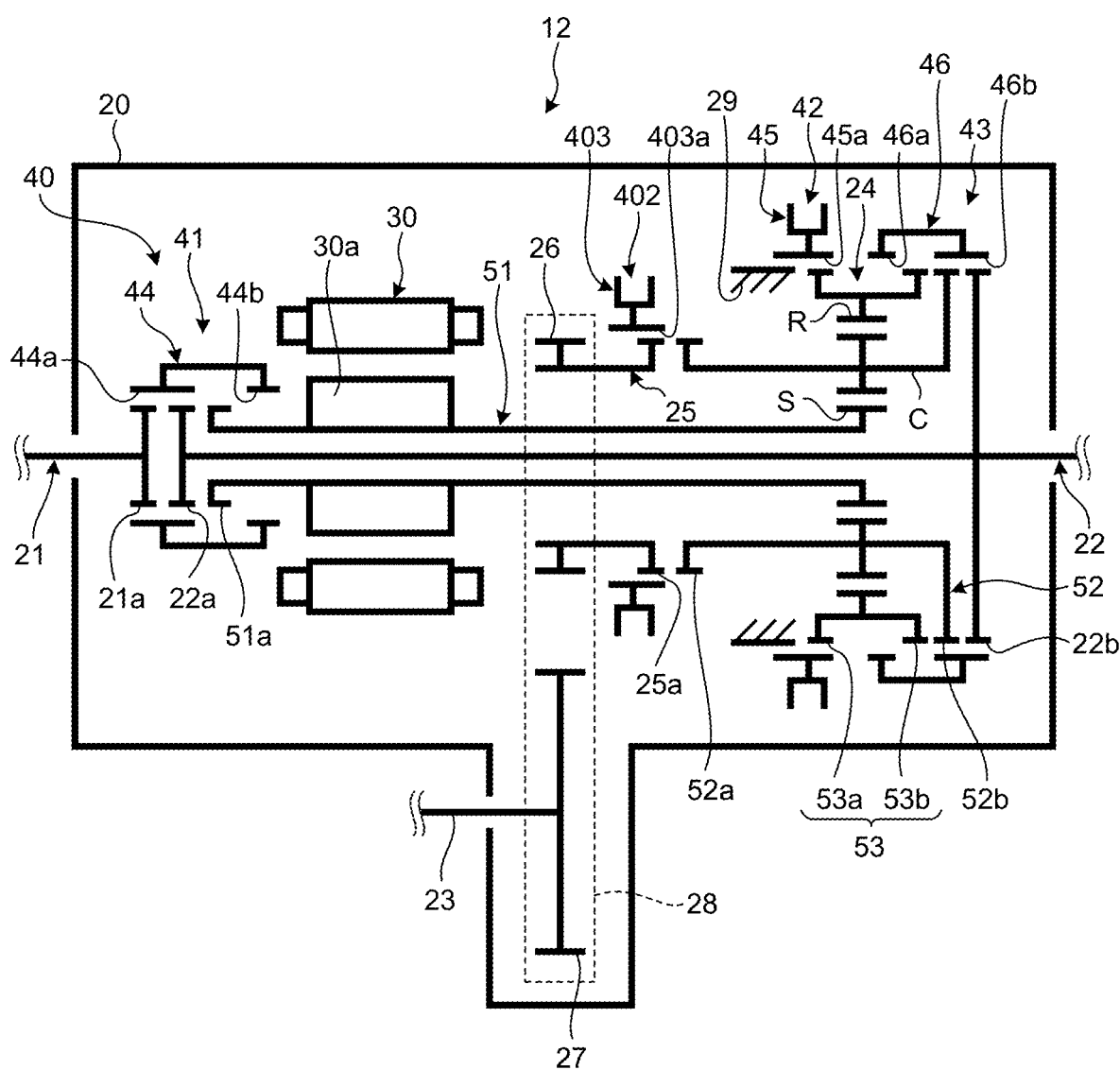
FIG. 23 is a skeleton diagram schematically illustrating a transfer in a power transmission device of a sixth embodiment.

FIG. 23 is a skeleton diagram schematically illustrating a transfer in the power transmission device of the sixth embodiment. In a transfer 12 of the sixth embodiment, a carrier C of a planetary gear device 24 is not constantly coupled to a front wheel-side output shaft 23. The carrier C and the front wheel-side output shaft 23 are configured relatively rotatably.

A connection switching device 40 includes a first dog clutch 41, a second dog clutch 42, a third dog clutch 43, and a fourth dog clutch 402. Note that a third switching sleeve 46 included in the third dog clutch 43 functions as a first distribution switching member and a second distribution switching member.

The fourth dog clutch 402 is an engagement device that functions as a distribution switching unit, and selectively couples the carrier C to the front wheel-side output shaft 23. This fourth dog clutch 402 can be switched between an eighth connection state (engaged state) in which the carrier C and the front wheel-side output shaft 23 are coupled, and a ninth connection state (released state) in which the carrier C and the front wheel-side output shaft 23 are separated. That is, the fourth dog clutch 402 switches a distribution state in which a part of power transmitted to a rear wheel-side output shaft 22 is distributed to the front wheel-side output shaft 23, and a non-distribution state in which the power transmitted to the rear wheel-side output shaft 22 is not distributed to the front wheel-side output shaft 23.

This fourth dog clutch 402 includes a fourth switching sleeve 403 as a third distribution switching member. The fourth switching sleeve 403 has a first gear tooth 403a that meshes with a first input gear tooth 25a of a transmitting unit 25 and that meshes with a second output gear tooth 52b of a second rotational member 52 that rotates integrally with the carrier C. The second rotational member 52 can rotate relative to the transmitting unit 25, and has the second output gear tooth 52a. The fourth switching sleeve 403 is moved in an axial direction by an actuator of the fourth dog clutch 402. Then, the fourth switching sleeve 403 selectively meshes with the second output gear tooth 52b of the second rotational member 52 in a state in which the first gear tooth 403a constantly meshes with the first input gear tooth 25a of the transmitting unit 25. That is, the fourth switching sleeve 403 is switched between a ninth connection state (released state) in which the carrier C and the transmitting unit 25 are not coupled, and an eighth connection state (engaged state) in which the carrier C and the transmitting unit 25 are coupled.

As illustrated in FIG. 23, in a case where the transfer 12 of the sixth embodiment is in a first driving state, the planetary gear device 24 is in a first mode in which a ring gear R is mechanically fixed, and the first dog clutch 41 is in a direct coupling state, the second dog clutch 42 is in an engaged state, the third dog clutch 43 is in a third distribution state (first connection state), and the fourth dog clutch 402 is in a released state (disconnection state) in the connection switching device 40. That is, the fourth switching sleeve 403 does not mesh with the second rotational member 52. The third switching sleeve 46 meshes with the rear wheel-side output shaft 22 and the second rotational member 52 in a state of not meshing with a third rotational member 53.

In such a manner, in the first driving state of the sixth embodiment, although an input shaft 21 is in a state of being directly coupled to the rear wheel-side output shaft 22, the rear wheel-side output shaft 22 is not driven by an engine 2 while the engine 2 is stopped. On the one hand, a motor 30 is coupled to the front wheel-side output shaft 23 via the planetary gear device 24 in a speed-changing state. Thus, in the first driving state, when power of the motor 30 is transmitted to the rear wheel-side output shaft 22, a rotation of the motor 30 is transmitted to the rear wheel-side output shaft 22 with a speed thereof being changed by the planetary gear device 24. That is, in the sixth embodiment, when the EV traveling mode is performed in a case where the transfer 12 is in the first driving state, two-wheel driving in which a speed of a rotation of the motor 30 is changed by the transfer 12 can be performed.

Figure 24:
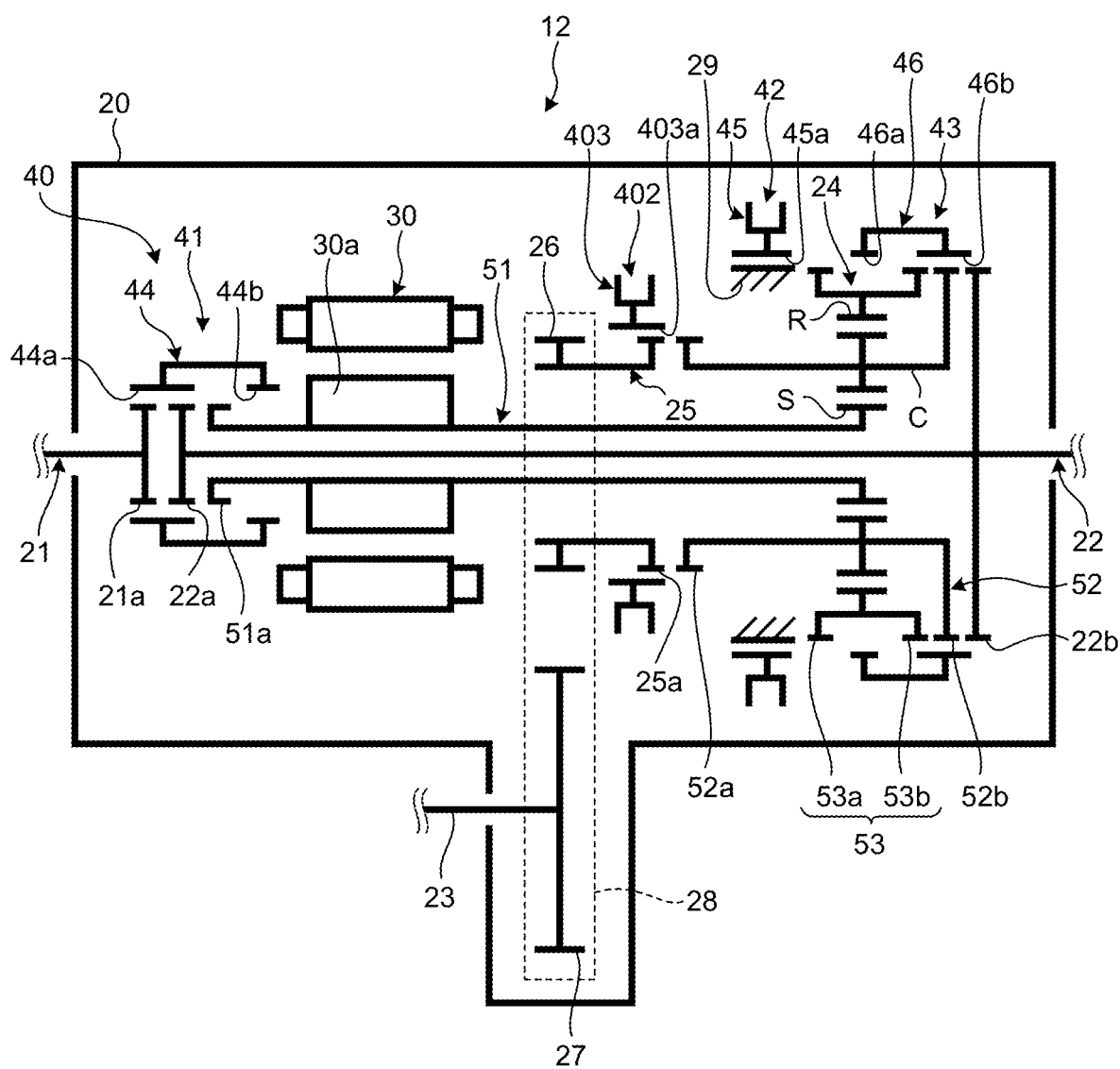
FIG. 24 is a skeleton diagram illustrating a case where the transfer in the power transmission device of the sixth embodiment is in the second driving state.

As illustrated in FIG. 24, in a case where the transfer 12 of the sixth embodiment is in a second driving state, the planetary gear device 24 is in a third mode in which the carrier C and the ring gear R are coupled integrally rotatably, and the first dog clutch 41 is in the direct coupling state, the second dog clutch 42 is in the released state, the third dog clutch 43 is in a second distribution state (third connection state), and the fourth dog clutch 402 is in a released state (disconnection state) in the connection switching device 40. That is, the fourth switching sleeve 403 does not mesh with the second rotational member 52. The third switching sleeve 46 meshes with the rear wheel-side output shaft 22, the third rotational member 53, and the second rotational member 52.

In such a manner, in the second driving state of the sixth embodiment, although the input shaft 21 is in a state of being directly coupled to the rear wheel-side output shaft 22, the rear wheel-side output shaft 22 is not driven by the engine 2 while the engine 2 is stopped. Also, although the motor 30 is coupled to the rear wheel-side output shaft 22 via the planetary gear device 24, the planetary gear device 24 is in a non-speed-changing state. Thus, in the second driving state, when the power of the motor 30 is transmitted to the rear wheel-side output shaft 22, three rotational elements of the planetary gear device 24 have the same rotational speed. That is, a rotation of the motor 30 is transmitted to the rear wheel-side output shaft 22 with a speed thereof not being changed by the planetary gear device 24. That is, in the sixth embodiment, when the EV traveling mode is performed in a case where the transfer 12 is in the second driving state, two-wheel driving in which a speed of a rotation of the motor 30 is changed by the transfer 12 can be performed.

Note that as a modification example of the sixth embodiment, a friction engagement device that selectively couples a carrier C and a ring gear R may be included. This modification example is illustrated in FIG. 25.

Figure 25:
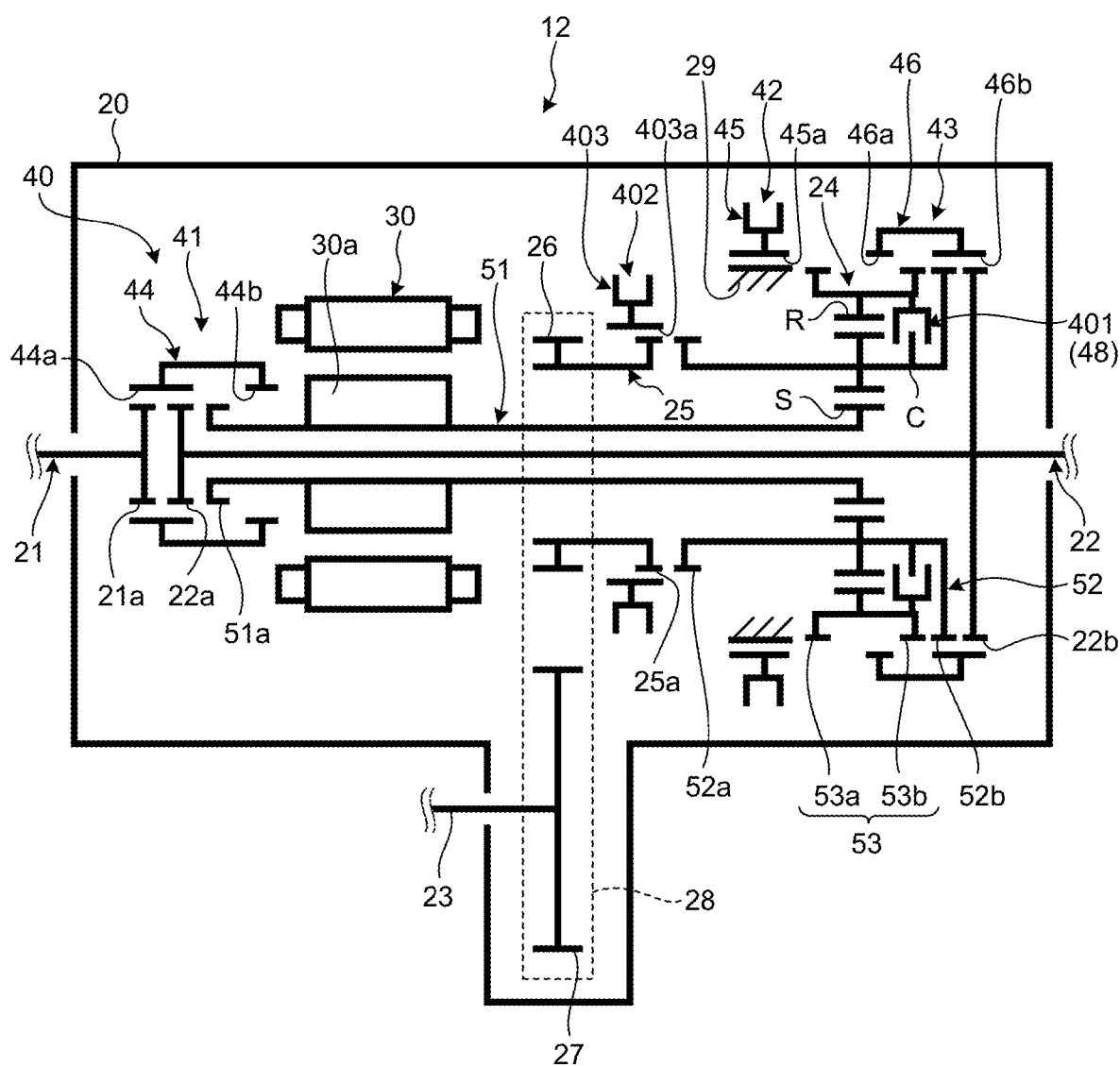
FIG. 25 is a skeleton diagram schematically illustrating a transfer in a first modification example of the sixth embodiment.

As illustrated in FIG. 25, in a transfer 12 in a first modification example of the sixth embodiment, a connection switching device 40 includes a first dog clutch 41, a second dog clutch 42, a third dog clutch 43, and a friction clutch 401. Note that the friction clutch 401 is similar to the friction clutch 401 in the first modification example of the fifth embodiment.

In this first modification example, since the first dog clutch 41 is in a direct coupling state, the second dog clutch 42 is in a released state, and the third dog clutch 43 is in a third distribution state (first connection state), a friction clutch 401 can be switched between an engaged state and a released state in a case where a carrier C and a ring gear R rotates relatively in a planetary gear device 24.

For example, as illustrated in FIG. 25, in a case where the first dog clutch 41 couples an input shaft 21 and a rear wheel-side output shaft 22, the second dog clutch 42 is released, and the third dog clutch 43 couples the carrier C and the rear wheel-side output shaft 22, the friction clutch 401 is in the engaged state and the transfer 12 is in a second driving state. That is, in the first modification example, even when a third switching sleeve 46 is not moved in an axial direction by an actuator of the third dog clutch 43, it is possible to realize the second driving state by switching the friction clutch 401 from the released state to the engaged state.

Also, as a second modification example of the sixth embodiment, a friction engagement device that selectively fixes a ring gear R to a fixing member 29 may be included in addition to a friction engagement device (friction clutch 401) that selectively couples a carrier C and a ring gear R. This second modification example is illustrated in FIG. 26.

Figure 26:
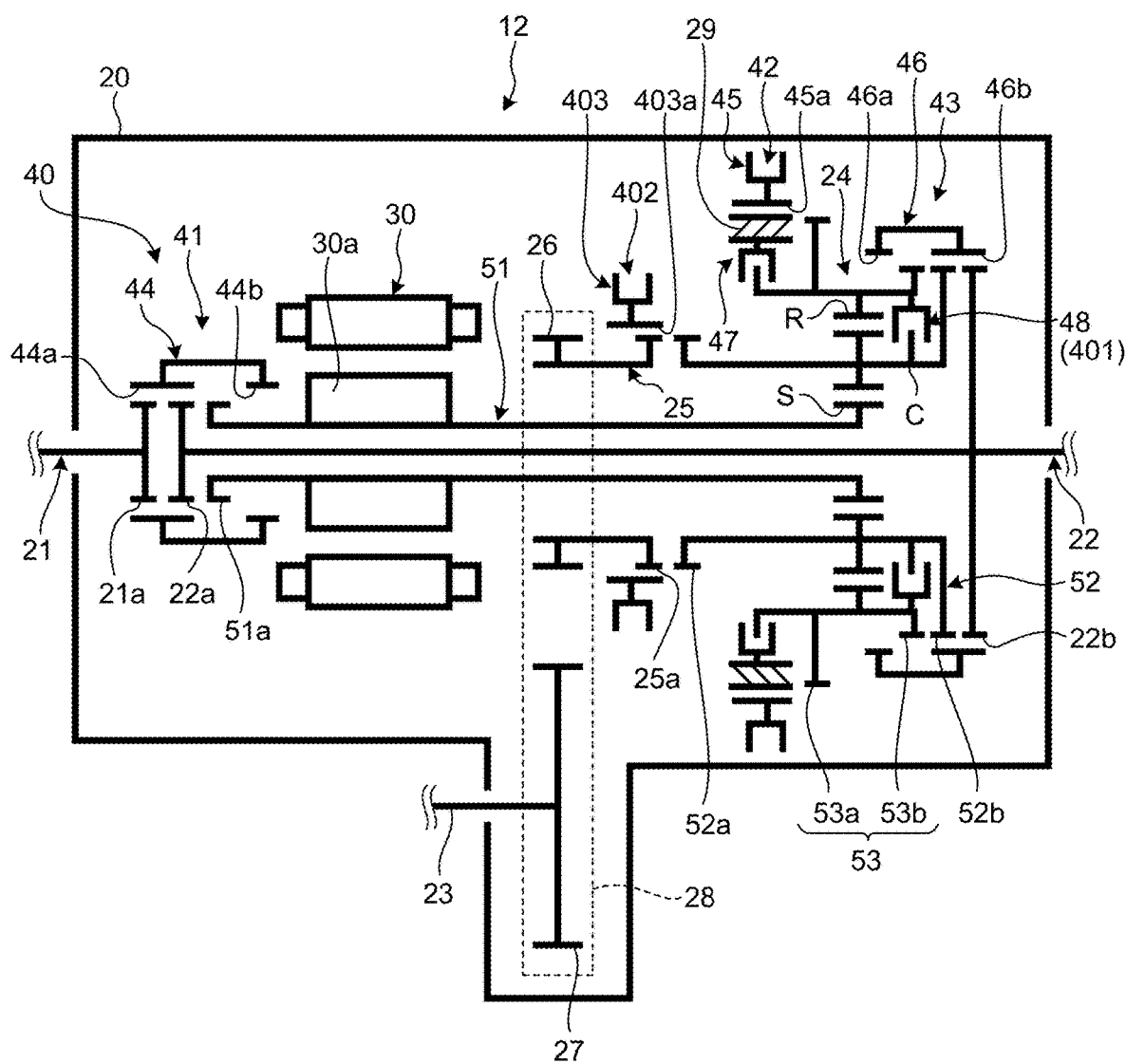
FIG. 26 is a skeleton diagram schematically illustrating a transfer in a second modification example of the sixth embodiment.

As illustrated in FIG. 26, in a transfer 12 in the second modification example of the sixth embodiment, a connection switching device 40 includes a first dog clutch 41, a second dog clutch 42, a third dog clutch 43, a first friction clutch 47, and a second friction clutch 48. Note that the first friction clutch 47 and the second friction clutch 48 are similar to the first friction clutch 47 and the second friction clutch 48 in the fifth embodiment.

In this second modification example, since the first dog clutch 41 is in a direct coupling state, the second dog clutch 42 is in a released state, and the third dog clutch 43 is in a third distribution state (first connection state), an engaged state and a released state of the first friction clutch 47 and the second friction clutch 48 can be switched in a case where a carrier C and a ring gear R rotate relatively in a planetary gear device 24.

For example, as illustrated in FIG. 26, in a case where the first dog clutch 41 couples an input shaft 21 and a rear wheel-side output shaft 22, the second dog clutch 42 is released, and the third dog clutch 43 is coupled to the rear wheel-side output shaft 22 and the carrier C, the transfer 12 is in a first driving state when the first friction clutch 47 is in the engaged state and the second friction clutch 48 is in the released state, and the transfer 12 is in a second driving state when the first friction clutch 47 is in the released state and the second friction clutch 48 is in the engaged state. That is, in the second modification example, even when the second dog clutch 42 and the third dog clutch 43 are not operated, it is possible switch the first driving state and the second driving state by changing states of the first friction clutch 47 and the second friction clutch 48.

Next, a power transmission device of a seventh embodiment will be described. Unlike the fifth embodiment, an engagement device included in a connection switching device 40 is provided for each connection destination of each rotational member in the seventh embodiment. Note that in the description of the seventh embodiment, the same reference signs are used for configurations similar to those of the fifth embodiment, and a description thereof is omitted.

Figure 27:
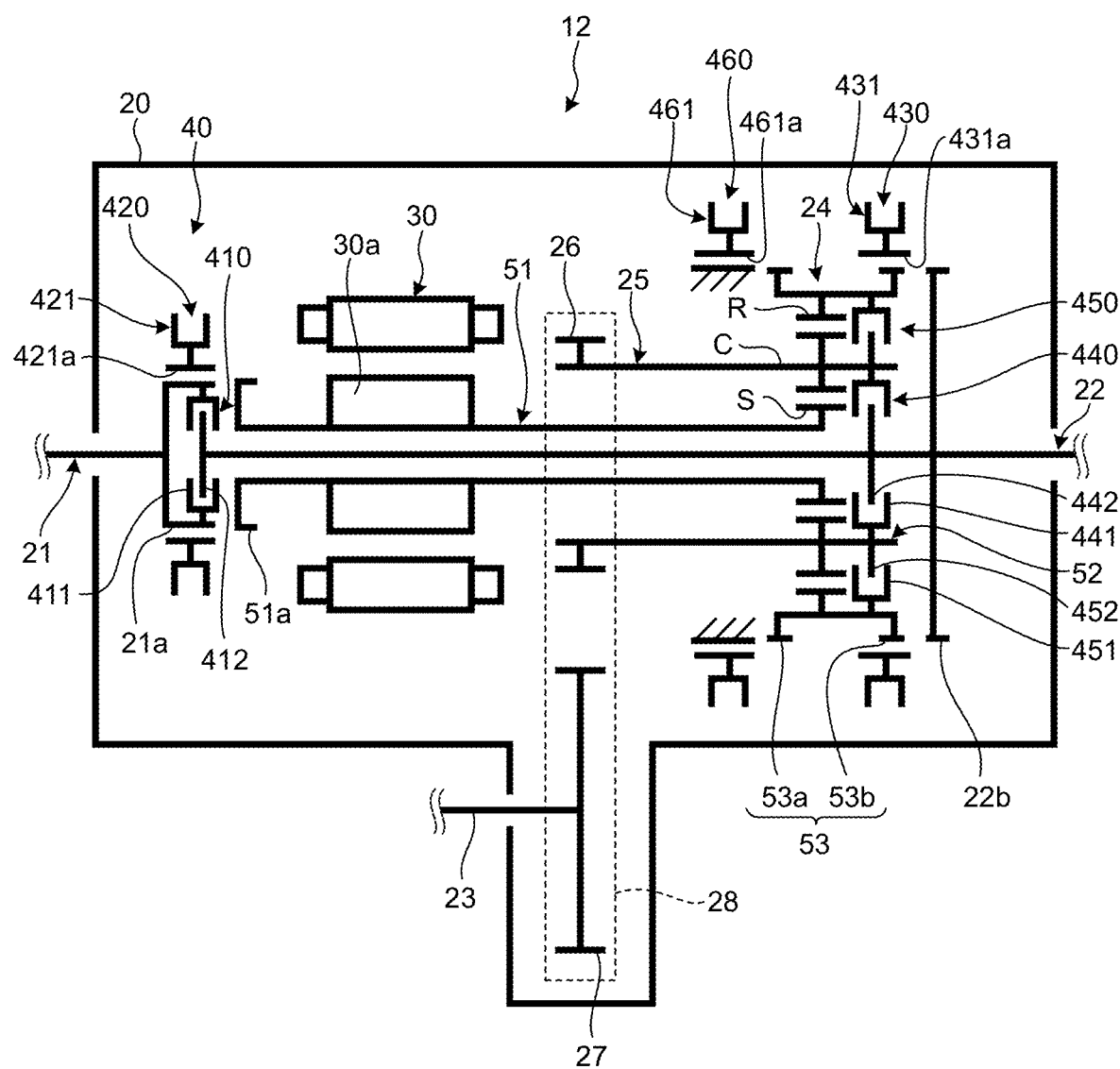
FIG. 27 is a skeleton diagram schematically illustrating a transfer in a power transmission device of a seventh embodiment.

As illustrated in FIG. 27, the connection switching device 40 of the seventh embodiment includes a first clutch 410, a second clutch 420, a third clutch 430, a fourth clutch 440, a fifth clutch 450, and a first brake 460.

The first clutch 410 is an engagement device that functions as an input switching unit and a transmission switching unit, and is a friction engagement device that selectively couples an input shaft 21 to a rear wheel-side output shaft 22. This first clutch 410 includes a first friction engagement element 411 that integrally rotates with the input shaft 21, and a second friction engagement element 412 that integrally rotates with the rear wheel-side output shaft 22. Engagement force is generated by a hydraulic pressure. That is, in the first clutch 410, it is possible to control the engagement force by controlling the hydraulic pressure. Then, the first clutch 410 is switched between an engaged state in which the input shaft 21 is coupled to the rear wheel-side output shaft 22 (direct coupling state), and a released state in which the input shaft 21 is not coupled to the rear wheel-side output shaft 22 (separated state). When the first clutch 410 is engaged, the input shaft 21 and the rear wheel-side output shaft 22 are connected integrally rotatably. When the first clutch 410 is released, the input shaft 21 and rear wheel-side output shaft 22 are separated relatively rotatably.

The second clutch 420 is an engagement device that functions as an input switching unit and a transmission switching unit, and is a dog clutch that selectively couples the input shaft 21 to a sun gear S. Then, the second clutch 420 is switched between an engaged state in which the input shaft 21 is coupled to the sun gear S (input state), and a released state in which the input shaft 21 is not coupled to the sun gear S (separated state). When the second clutch 420 is engaged, the input shaft 21 and the sun gear S are connected integrally rotatably. When the second clutch 420 is released, the input shaft 21 and the sun gear S are separated relatively rotatably.

This second clutch 420 includes a first switching sleeve 421 as an input switching member. The first switching sleeve 421 includes a gear tooth 421a that meshes with a gear tooth 21a of the input shaft 21 and an input gear tooth 51a of a first rotational member 51. This first switching sleeve 421 is moved in an axial direction by an actuator of the second clutch 420. Then, in a state in which the gear tooth 421a constantly meshes with the input shaft 21, the first switching sleeve 421 is switched between an engaged state of meshing with the input gear tooth 51a of the first rotational member 51 and a released state of not meshing with the input gear tooth 51a. That is, in a case where the gear tooth 421a meshes with the input gear tooth 51a of the first rotational member 51, the second clutch 420 is in the engaged state (input state). On the one hand, in a case where the gear tooth 421a does not mesh with the input gear tooth 51a, the second clutch 420 is in the released state (separated state).

In such a manner, the first clutch 410 and the second clutch 420 are so-called high/low switching units (transmission switching unit), and switch a speed-changing state in which a rotation of the input shaft 21 is transmitted to the rear wheel-side output shaft 22 with a speed thereof being changed by the planetary gear device 24, and a direct coupling state in which the rotation of the input shaft 21 is transmitted to the rear wheel-side output shaft 22 without a speed change. That is, by the first clutch 410 and the second clutch 420, a first input state in which power from an engine 2 is transmitted to the rear wheel-side output shaft 22 without a planetary gear device 24, and a second input state in which the power from the engine 2 is transmitted to the rear wheel-side output shaft 22 via the planetary gear device 24 are switched.

The third clutch 430 is an engagement device that functions as a distribution switching unit, and is a dog clutch that selectively couples the rear wheel-side output shaft 22 and a ring gear R. Then, the third clutch 430 is switched between an engaged state in which the rear wheel-side output shaft 22 and the ring gear R are coupled (second connection state), and a released state in which the rear wheel-side output shaft 22 and the ring gear R are not coupled (third connection state). When the third clutch 430 is engaged, a state becomes a distribution state in which a part of the power transmitted to the rear wheel-side output shaft 22 is distributed to the front wheel-side output shaft 23. When the third clutch 430 is released, a state becomes a non-distribution state in which the power transmitted to the rear wheel-side output shaft 22 is not distributed to the front wheel-side output shaft 23.

This third clutch 430 includes a third switching sleeve 431 that functions as a first distribution switching member. The third switching sleeve 431 has a gear tooth 431a that meshes with a second gear tooth 22b of the rear wheel-side output shaft 22 and a second output gear tooth 53b of a third rotational member 53. This third switching sleeve 431 is moved in an axial direction by an actuator of the third clutch 430. Then, in a state in which the gear tooth 431a constantly meshes with the third rotational member, the third switching sleeve 431 is switched between an engaged state of meshing with the second gear tooth 22b of the rear wheel-side output shaft 22 and a released state of not meshing with the second gear tooth 22b. In a case where the gear tooth 431a meshes with the second gear tooth 22b of the rear wheel-side output shaft 22, the second clutch 420 is in the engaged state. On the one hand, in a case where the gear tooth 431a does not mesh with the second gear tooth 22b of the rear wheel-side output shaft 22, the third clutch 430 is in the released state. In such a manner, the third switching sleeve 431 can be switched, as the first distribution switching member, between the second connection state and the third connection state.

The fourth clutch 440 is an engagement device that functions as a distribution switching unit, and is a friction engagement device that selectively couples the carrier C and the rear wheel-side output shaft 22. This fourth clutch 440 includes a first friction engagement element that integrally rotates with the carrier C, and a second friction engagement element that integrally rotates with the rear wheel-side output shaft 22. Engagement force is generated by a hydraulic pressure. The fourth clutch 440 can control the engagement force by controlling the hydraulic pressure. Then, the fourth clutch 440 is switched between an engaged state in which the carrier C is coupled to the rear wheel-side output shaft 22 (first connection state), and a released state in which the carrier C is not coupled to the rear wheel-side output shaft 22 (third connection state). When the fourth clutch 440 is engaged, the carrier C and the rear wheel-side output shaft 22 are connected integrally rotatably. When the fourth clutch 440 is released, the carrier C and the rear wheel-side output shaft 22 are separated relatively rotatably. In such a manner, the fourth clutch 440 has a function as a first distribution switching member, and can be switched between the first connection state and the third connection state. That is, the third clutch 430 and the fourth clutch 440 share a function as the first distribution switching member. Thus, the third clutch 430 and the fourth clutch 440 function as the first distribution switching members, and can be switched among the first connection state, the second connection state, and the third connection state.

The fifth clutch 450 is an engagement device that functions as a transmission switching unit and a distribution switching unit, and is a friction engagement device that selectively couples the carrier C and the ring gear R. This fifth clutch 450 includes a first friction engagement element that rotates integrally with the ring gear R, and a second friction engagement element that rotates integrally with the carrier C. Engagement force is generated by a hydraulic pressure. The fifth clutch 450 can control the engagement force by controlling the hydraulic pressure. Then, the fifth clutch 450 is switched between an engaged state in which the ring gear R and the carrier C are coupled (fourth connection state), and a released state in which the ring gear R and the carrier C are not coupled (fifth connection state). When the fifth clutch 450 is engaged, the carrier C and the ring gear R are integrally rotatably coupled. When the fifth clutch 450 is released, the carrier C and the ring gear R are separated in a relatively rotatable manner (differentially movable manner). In such a manner, the fifth clutch 450 has a function as a second distribution switching member, and can be switched between the fourth connection state and the fifth connection state.

The first brake 460 is an engagement device that functions as a fixation switching unit and a transmission switching unit, and is a dog clutch that selectively couples the ring gear R and the fixing member 29. Then, the first brake 460 is switched between an engaged state in which the ring gear R and the fixing member 29 are coupled (fixed state), and a released state in which the ring gear R and the fixing member 29 are not coupled (non-fixed state). That is, the first brake 460 selectively fixes the ring gear R to the fixing member 29. Thus, the first brake 460 switches the fixed state in which the ring gear R is mechanically fixed, and the released state in which the ring gear R is rotatable.

This first brake 460 includes a second switching sleeve 461 functioning as a transmission switching member and a fixation switching member. The second switching sleeve 461 has a gear tooth 461a that meshes with a first output gear tooth 53a of the third rotational member 53 and the fixing member 29. For example, the second switching sleeve 461 is moved in an axial direction by an actuator of the first brake 460 in a state of constantly meshing with the fixing member 29. The second switching sleeve 461 is switched between an engaged state of meshing with the first output gear tooth 53a of the third rotational member 53, and a released state of not meshing with the first output gear tooth 53a. That is, the second switching sleeve 461 is switched between the fixed state in which the ring gear R is coupled to the fixing member 29, and the released state in which the ring gear R is not coupled to the fixing member 29.

Here, first to fifth driving states realized by the transfer 12 of the seventh embodiment will be described.

In a case where the transfer 12 of the seventh embodiment is in the first driving state, the planetary gear device 24 is in a first mode in which the ring gear R is mechanically fixed, and the first clutch 410 is in the engaged state (direct coupling state), the second clutch 420 is in the released state, the third clutch 430 is in the released state, the fourth clutch 440 is in the released state, the fifth clutch 450 is in the released state, and the first brake 460 is in the engaged state (fixed state) in the connection switching device 40.

Figure 28:
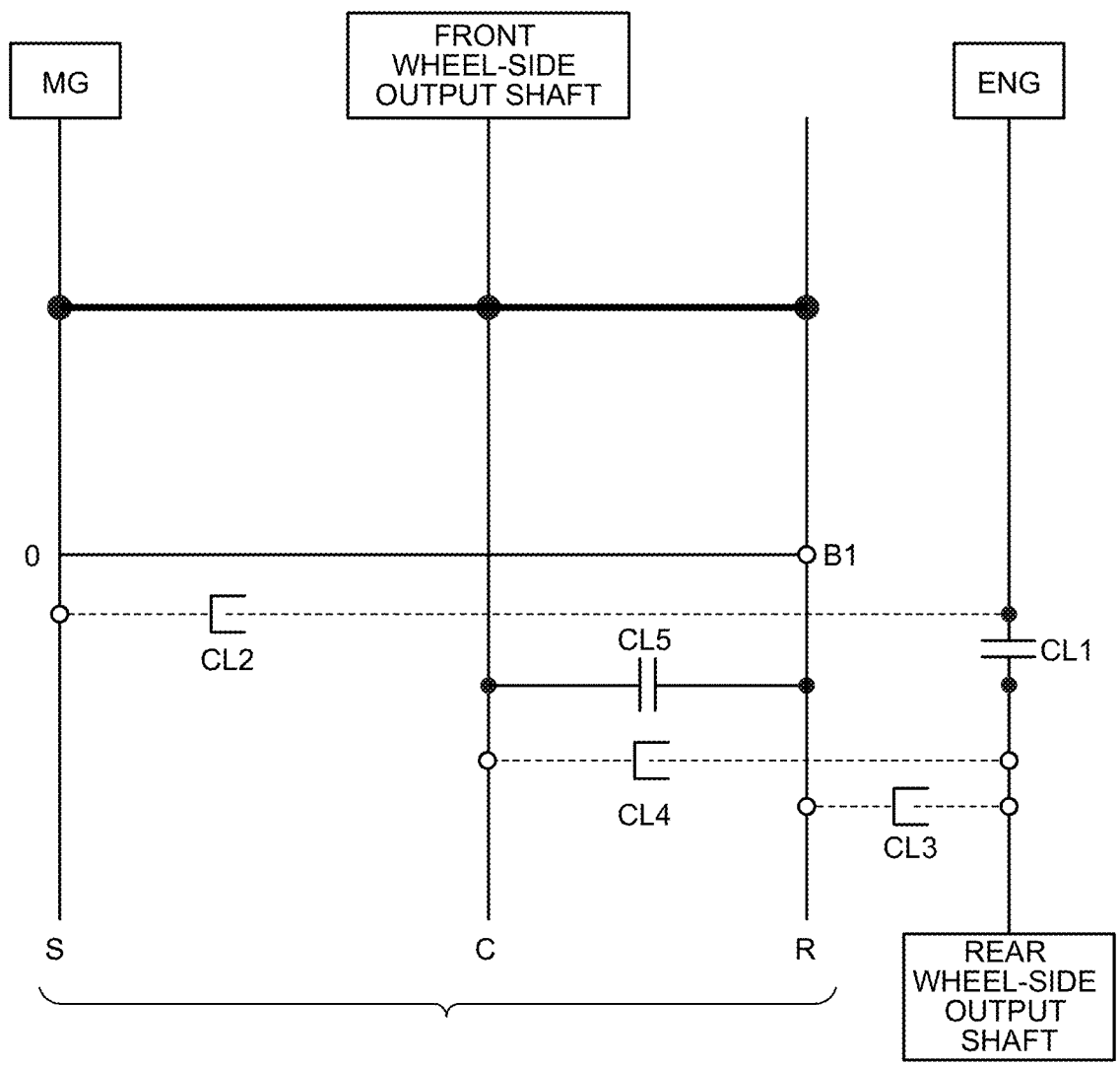
FIG. 28 is a collinear diagram illustrating states of rotational elements in a planetary gear device in a case of the second driving state in the seventh embodiment.

In a case where the transfer 12 of the seventh embodiment is in the second driving state, the planetary gear device 24 is in a third mode in which the carrier C and the ring gear R are coupled integrally rotatably, and the first clutch 410 is in the engaged state (direct coupling state), the second clutch 420 is in the released state, the third clutch 430 is in the released state, the fourth clutch 440 is in the released state, the fifth clutch 450 is in the engaged state (integrated state), and the first brake 460 is the released state in the connection switching device 40. Thus, when power of a motor 30 is transmitted to the front wheel-side output shaft 23 in this second driving state, three rotational elements have the same rotational speed, as illustrated in FIG. 28. Also, in this second driving state, since the first clutch 410 is engaged, the engine 2 and the rear wheel-side output shaft 22 are connected in such a manner that power can be transmitted. However, the power is not transmitted to the rear wheel-side output shaft 22 since the engine 2 is stopped.

Figure 29:
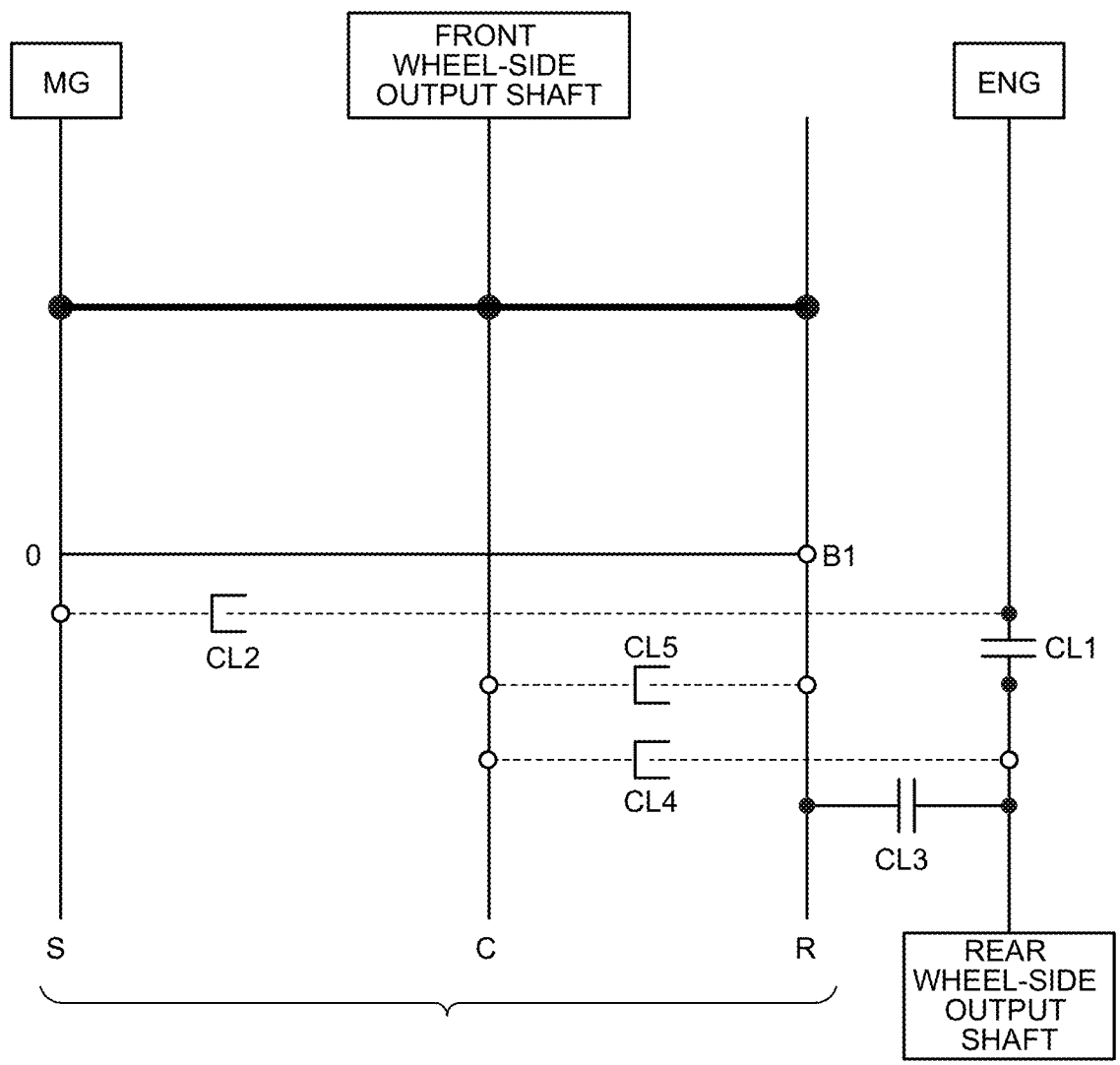
FIG. 29 is a collinear diagram illustrating states of the rotational elements in the planetary gear device in a case of the third driving state in the seventh embodiment.
Figure 30:
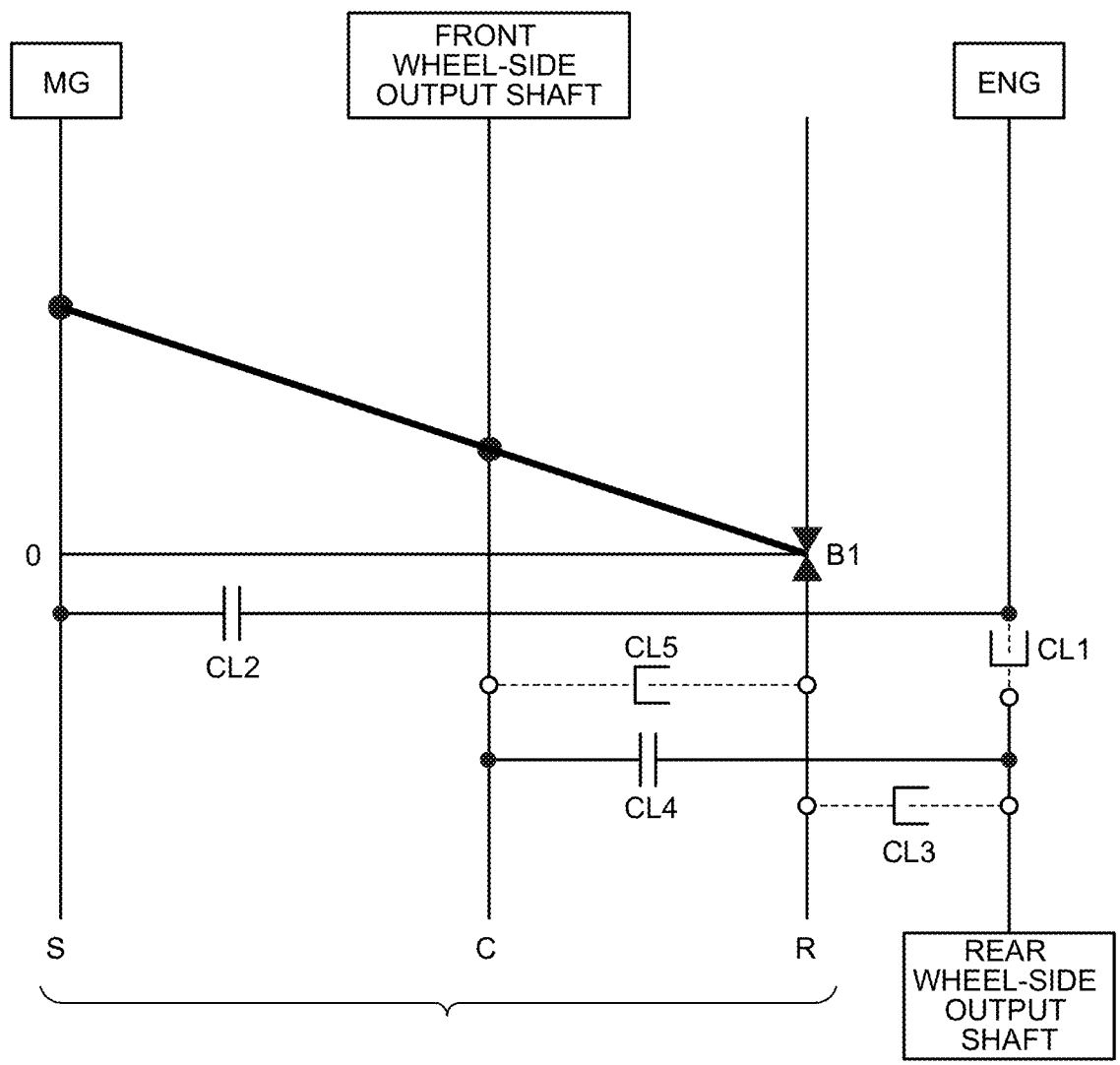
FIG. 30 is a collinear diagram illustrating states of the rotational elements in the planetary gear device in a case of the fifth driving state in the seventh embodiment.

Note that collinear diagrams illustrating rotational states of the planetary gear device 24 are illustrated in FIG. 28, FIG. 29, and FIG. 30. The motor 30 is described as "MG", the engine 2 is described as "ENG", the sun gear S is described as "S", the carrier C is described as "C", the ring gear R is described as "R", the first clutch 410 is described as "CL1", the second clutch 420 is described as "CL2", the third clutch 430 is described as "CL3", the fourth clutch 440 is described as "CL4", and the fifth clutch 450 is described as "CL5".

In a case where the transfer 12 of the seventh embodiment is in the third driving state, the planetary gear device 24 is in a second mode in which the sun gear S, the carrier C, and the ring gear R can make differential motions, and the first clutch 410 is in the engaged state (direct coupling state), the second clutch 420 is in the released state, the third clutch 430 is in the engaged state (distribution state), the fourth clutch 440 is in the released state, the fifth clutch 450 is in the released state, and the first brake 460 is in the released state in the connection switching device 40.

In such a manner, in the third driving state, since the input shaft 21 is in a state of being directly coupled to the rear wheel-side output shaft 22, power transmitted from the engine 2 to the input shaft 21 is transmitted to the rear wheel-side output shaft 22 without the planetary gear device 24. Thus, a rotation of the input shaft 21 is transmitted to the rear wheel-side output shaft 22 with a speed thereof not being changed. Also, since the planetary gear device 24 is in a distribution state in which a differential motion can be made, power of the motor 30 is distributed and transmitted to the transmitting unit 25 and the rear wheel-side output shaft 22 via the planetary gear device 24. Thus, in the third driving state, distribution of the power transmitted to a front wheel side and a rear wheel side can be controlled by torque output from the motor 30 as illustrated in FIG. 29.

In a case where the transfer 12 of the seventh embodiment is in the fourth driving state, the planetary gear device 24 is in the third mode in which the carrier C and the ring gear R are coupled integrally rotatably, and the first clutch 410 is in the engaged state (direct coupling state), the second clutch 420 is in the released state, the third clutch 430 is in the engaged state (distribution state) or released state, the fourth clutch 440 is in the engaged state (distribution state) or released state, and the fifth clutch is in the engaged state (integrated state) or released state in the connection switching device 40.

In this fourth driving state, the planetary gear device 24 a differential motion of which is limited only desired to be coupled to the rear wheel-side output shaft 22. Thus, in a case where the third clutch 430 is in the engaged state, the fourth clutch 440 is in the engaged state, and the fifth clutch 450 may be in any of the released state and the engaged state. In a case where the third clutch 430 is in the released state, the fourth clutch 440 and the fifth clutch 450 are in the engaged state. Also, in a case where the fourth clutch 440 is in the released state, the third clutch 430 and the fifth clutch 450 are in the engaged state.

In such a manner, the input shaft 21 is coupled to the first rotational member 51 in the fifth driving state. Thus, the power transmitted from the engine 2 to the input shaft 21 is transmitted to the rear wheel-side output shaft 22 via the planetary gear device 24. Also, since the planetary gear device 24 is in the speed-changing state, a rotation of the input shaft 21 is transmitted to the rear wheel-side output shaft 22 with a speed thereof being changed by the planetary gear device 24. Similarly, the motor 30 is also coupled to the rear wheel-side output shaft 22 via the planetary gear device 24 in the speed-changing state. Thus, in the fifth driving state, when the power of the motor 30 is transmitted to the rear wheel-side output shaft 22, a rotation of the motor 30 is transmitted to the rear wheel-side output shaft 22 with a speed thereof being changed by the planetary gear device 24 as illustrated in FIG. 30.

Note that as a modification example of the seventh embodiment, functions respectively held by a first clutch 410 and a second clutch 420 may be realized by one engagement device. This modification example is illustrated in FIG. 31.

Figure 31:
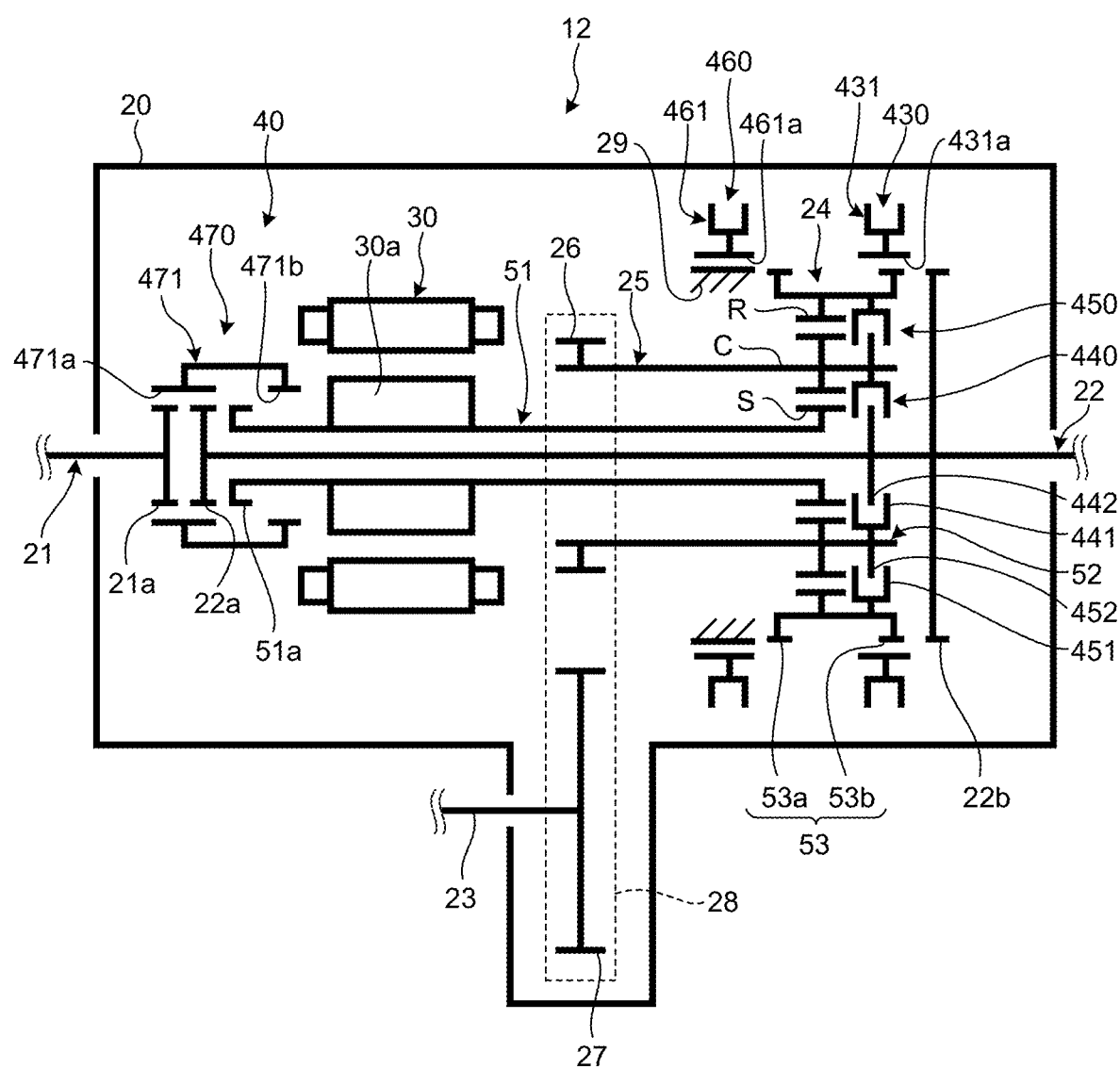
FIG. 31 is a skeleton diagram schematically illustrating a transfer in a first modification example of the seventh embodiment.

As illustrated in FIG. 31, in a transfer 12 in a first modification example of the seventh embodiment, a connection switching device 40 includes a seventh clutch 470, a third clutch 430, a fourth clutch 440, a fifth clutch 450, and a first brake 460. The seventh clutch 470 is similar to the first dog clutch 41 of the fifth embodiment. Thus, the seventh clutch 470 is in a direct coupling state in which an input shaft 21 and a rear wheel-side output shaft 22 are coupled in first to fourth driving states, and is in a second input state (speed-changing state) in which the input shaft 21 and a sun gear S are coupled in a fifth driving state.

Also, as a second modification example of the seventh embodiment, functions respectively held by a fifth clutch 450 and a first brake 460 may be realized by one engagement device, and functions respectively held by a third clutch 430 and a fourth clutch 440 may be realized by one engagement device. This second modification example is illustrated in FIG. 32.

Figure 32:
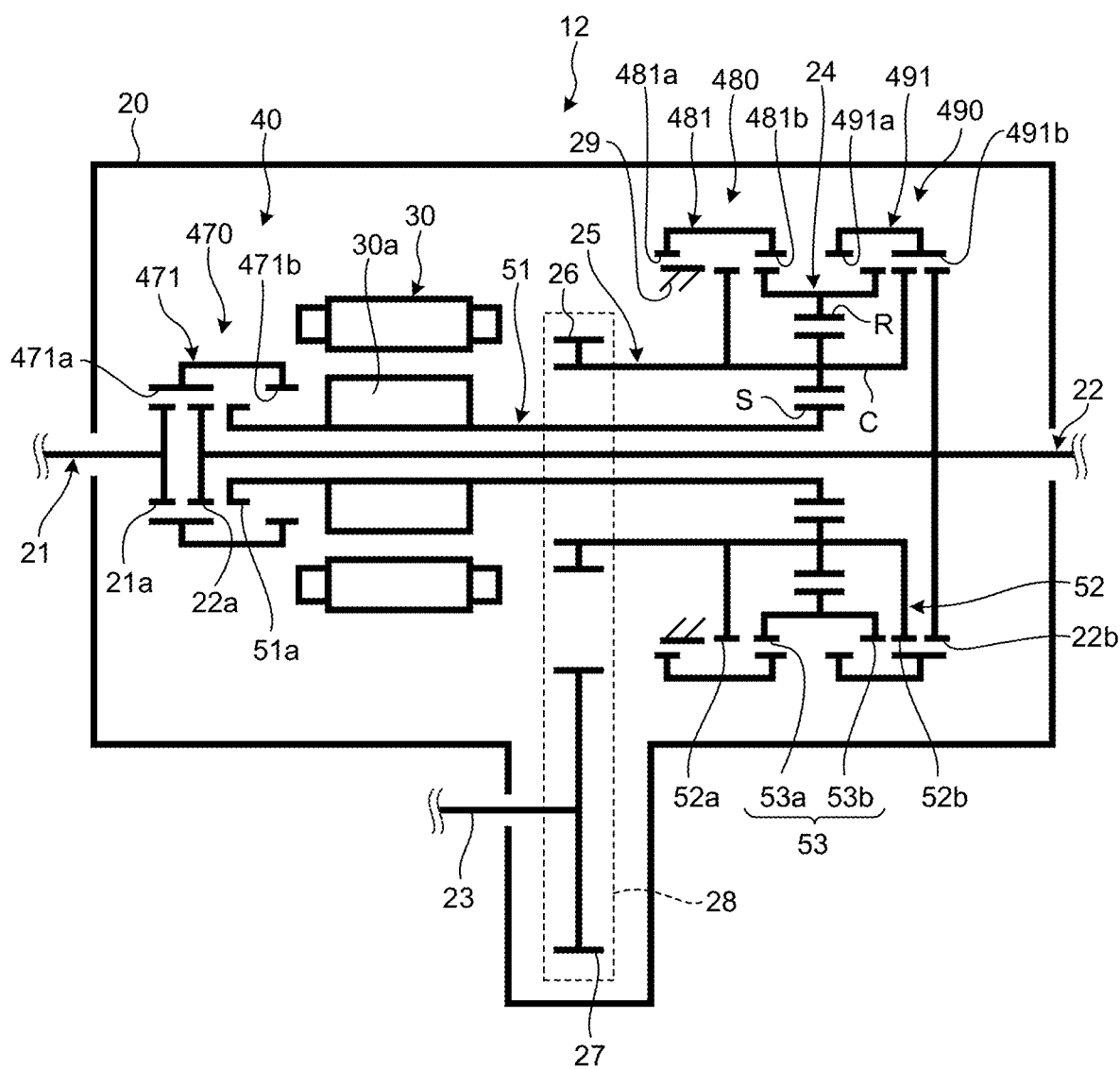
FIG. 32 is a skeleton diagram schematically illustrating a transfer in a second modification example of the seventh embodiment.

As illustrated in FIG. 32, in a transfer 12 in the second modification example of the seventh embodiment, a connection switching device 40 includes a seventh clutch 470, an eighth clutch 480, and a ninth clutch 490.

In the eighth clutch 480, functions respectively held by the fifth clutch 450 and the first brake 460 of the seventh embodiment are combined into one. This eighth clutch 480 is an engagement device that functions as a distribution switching unit and a transmission switching unit, and is a dog clutch to switch a connection relationship among a fixing member 29, a carrier C, and a ring gear R. Then, the eighth clutch 480 is switched among a released state of being coupled only to the fixing member 29 (non-fixed state and fifth connection state), an integrated state in which the ring gear R and the carrier C are coupled (fourth connection state), and a fixed state in which the ring gear R and the fixing member 29 are coupled.

This eighth clutch 480 includes a second switching sleeve 481 functioning as a distribution switching member and a fixation switching member. This second switching sleeve 481 includes a first gear tooth 481a that meshes with a first output gear tooth 52a of a second rotational member 52, a first output gear tooth 53a of a third rotational member 53, and a fixing member 29, and a second gear tooth 481b that meshes with the first output gear tooth 52a of the second rotational member 52, and the first output gear tooth 53a of the third rotational member 53. The second switching sleeve 481 is moved in an axial direction by an actuator of the eighth clutch 480. Then, the second switching sleeve 481 is switched among a released state of meshing only with the fixing member 29 (non-fixed state and fifth connection state), an integrated state of meshing with the second rotational member 52 and the third rotational member 53 in a state of not meshing with the fixing member 29 (fourth connection state), and a fixed state of meshing with the third rotational member 53 and the fixing member 29 in a state of not meshing with the second rotational member 52. That is, the second switching sleeve 481 functions as a second distribution switching member, and can be switched between the fourth connection state and the fifth connection state.

In the ninth clutch 490, functions of the third clutch 430 and the fourth clutch 440 of the seventh embodiment are combined into one. This ninth clutch 490 includes a third switching sleeve 491 as a distribution switching member. Then, the ninth clutch 490 is similar to the third dog clutch 43 of the fifth embodiment. That is, the ninth clutch 490 and the third switching sleeve 491 are switched among a first non-distribution state in which a rear wheel-side output shaft 22 is not coupled to the ring gear R and the carrier C (sixth connection state), a second non-distribution state in which the ring gear R is coupled to the carrier C (seventh connection state), a first distribution state in which the rear wheel-side output shaft 22 is coupled to the ring gear R (second connection state), a second distribution state in which the rear wheel-side output shaft 22 is coupled to the ring gear R and the carrier C (third connection state), and a third distribution state in which the rear wheel-side output shaft 22 is coupled to the carrier C (first connection state). That is, the ninth clutch 490 and the third switching sleeve 491 function as first distribution switching members, and can be switched between the first connection state and the second connection state.

In a case where the transfer 12 of this second modification example is in a second driving state, the planetary gear device 24 is in a first mode in which the ring gear R is mechanically fixed, and the seventh clutch 470 is in a direct coupling state, the eighth clutch 480 is in the fixed state, and the ninth clutch 490 is in the first non-distribution state in the connection switching device 40. That is, the second switching sleeve 481 meshes with the second rotational member 52 and the third rotational member 53. The third switching sleeve 491 meshes only with the rear wheel-side output shaft 22.

In a case where the transfer 12 of this second modification example is in a second driving state, the planetary gear device 24 is in a third mode in which the carrier C and the ring gear R are coupled integrally rotatably, and the seventh clutch 470 is in the direct coupling state, the eighth clutch 480 is in the integrated state, and the ninth clutch 490 is in the first non-distribution state in the connection switching device 40. That is, the second switching sleeve 481 meshes with the second rotational member 52 and the third rotational member 53 in a state of not meshing with the fixing member 29. The third switching sleeve 491 only meshes with the rear wheel-side output shaft 22.

In a case where the transfer 12 of this second modification example is in a third driving state, the planetary gear device 24 is in the second mode in which the sun gear S, the carrier C, and the ring gear R can make differential motions, and the seventh clutch 470 is in the direct coupling state, the eighth clutch 480 is in the released state, and the ninth clutch 490 is in the first distribution state in the connection switching device 40. That is, the second switching sleeve 481 meshes only with the fixing member 29. The third switching sleeve 491 meshes with the third rotational member 53 and the rear wheel-side output shaft 22.

In a case where the transfer 12 of this second modification example is in a fourth driving state, the planetary gear device 24 is in the third mode in which the carrier C and the ring gear R are coupled integrally rotatably, and the seventh clutch 470 is in the direct coupling state, the eighth clutch 480 is in the integrated state, and the ninth clutch 490 is in the third distribution state in the connection switching device 40. That is, the second switching sleeve 481 meshes with the second rotational member 52 and the third rotational member 53 in a state of not meshing with the fixing member 29. The third switching sleeve 491 meshes with the second rotational member 52 and the rear wheel-side output shaft 22.

In a case where the transfer 12 of this second modification example is in a fifth driving state, the planetary gear device 24 is in the first mode in which the ring gear R is mechanically fixed, and the seventh clutch 470 is in a second input state (speed-changing state), the eighth clutch 480 is in the fixed state, and the ninth clutch 490 is in the third distribution state in the connection switching device 40. That is, the second switching sleeve 481 meshes with the fixing member 29 and the third rotational member 53. The third switching sleeve 491 meshes with the second rotational member 52 and the rear wheel-side output shaft 22.

Note that in the fifth to seventh embodiments, a motor 30 is not limited to have a structure arranged on the same axis as an input shaft 21 and a rear wheel-side output shaft 22. That is, the motor 30 may be arranged on an axis different from that of the input shaft 21 and the rear wheel-side output shaft 22, and may be coupled to a sun gear S via a gear mechanism (such as reducer). In the fifth to seventh embodiments, similarly to the first embodiment, a motor 30 may be connected to a first rotational member 51 via a counter gear 32 in such a manner that power can be transmitted. In other words, similarly to the fifth embodiment, in the first to fourth embodiments, a motor 30 may be arranged on the same axis as an input shaft 21 and a rear wheel-side output shaft 22 and may be configured to rotate integrally with a sun gear S.

Also, in the first to seventh embodiments, a planetary gear device 24 only desired to include a differential which has three rotational elements and in which the rotational elements can make differential actions. That is, it is only necessary to be a differential in which any one rotational element among the three rotational elements can be fixed. Also, a motor generator can be described as a rotating electrical machine. In short, since including a rotating electrical machine (motor generator), the motor 30 can generate electricity by power from an engine 2, or can perform regenerative power generation by power input from drive wheels. The electricity generated by the motor 30 is stored in a battery. Moreover, a first power source and a second power source may be either of an engine and a rotating electrical machine. For example, a first power source may be a rotating electrical machine, and a second power source may be an engine. Also, in a first mode, it is only necessary that at least a fixed element among three rotational elements is fixed to a fixing member 29. That is, in the first mode, it is only necessary that the planetary gear device 24 is in a speed-changing state. That is, the first mode includes a state in which a first power source is not connected to an input element.

In the present disclosure, in a power transmission device including a second power source, the second power source is connected to rotational elements other than a rotational element fixed to a fixing member among three rotational elements included in a differential. Accordingly, in a case where power is transmitted in a state in which one rotational element is fixed to the fixing member, power of the second power source can be transmitted to a first output shaft and a second output shaft.

According to an embodiment, in a power transmission device including a second power source, a second power source is connected to rotational elements other than a rotational element fixed to a fixing member among three rotational elements included in a differential. Thus, in a case where power is transmitted in a state in which one rotational element is fixed o the fixing member, power of the second power source can be transmitted to the first output shaft and the second output shaft.

Further, the power transmission device includes: an input shaft that inputs power from a first power source; a motor that functions as a second power source; a first output shaft that transmits power to main drive wheels; a second output shaft that transmits power to auxiliary drive wheels; a planetary gear device having three rotational elements; a transmission switching unit that switches a speed-changing state in which a rotation of the input shaft is transmitted to the first output shaft with a speed thereof being changed by the planetary gear device, and a non-speed-changing state in which the rotation of the input shaft is transmitted to the first output shaft without a speed change; and a distribution switching unit that switches a non-distribution state in which power is transmitted only to the first output shaft between the first output shaft and the second output shaft, and a distribution state in which the power is transmitted to the first output shaft and the second output shaft. Further, any one rotational element of the three rotational elements is fixed to a fixing member in a case where the transmission switching unit is in the speed-changing state, the motor is coupled to a rotational element, which is other than the rotational element fixed by the transmission switching unit to the fixing member, among the three rotational elements, the planetary gear device can be switched between a plurality of modes by the transmission switching unit and the distribution switching unit, and the plurality of modes may include a third mode in which two rotational elements among the three rotational elements are coupled to each other and any one of the rotational elements is coupled to the first output shaft, a first mode in which any one rotational element among the three rotational elements is coupled to the input shaft, one of the remaining rotational elements is fixed to the fixing member, and the other is coupled to the first output shaft, and a second mode in which the three rotational elements are respectively coupled to the motor, the first output shaft, and the second output shaft.

According to this configuration, in a case where the main drive wheels are driven by the power of the first power source in a state in which one rotational element among the three rotational elements included in the planetary gear device is coupled to the fixing member, power of the motor can be transmitted to the main drive wheels.

Further, the three rotational elements include a first rotational element coupled to the motor, a second rotational element, and a third rotational element, the transmission switching unit includes an input switching member that switches connection destinations of the input shaft, the input switching member is switched between a first input state in which the input shaft is coupled to the first rotational element, and a second input state in which the input shaft is directly coupled to the first output shaft, the input switching member is in the second input state and the input shaft is directly coupled to the first output shaft in a case where the planetary gear device is in the third mode and the three rotational elements rotate integrally, the input switching member is in the first input state and the input shaft is coupled to the first rotational element in a case where the planetary gear device is in the first mode, the first rotational element is an input element, the second rotational element is a reaction force element fixed to the fixing member, and the third rotational element is an output element coupled to the first output shaft, and the input switching member is in the second input state and the input shaft is directly coupled to the first output shaft in a case where the planetary gear device is in the second mode and the three rotational elements can make differential motions.

According to this configuration, a power transmission path in which the power of the input shaft is transmitted to the planetary gear device and a power transmission path in which the power of the input shaft is transmitted to the first output shaft without the planetary gear device can be switched by the input switching member.

Further, the power transmission device further includes a transmitting unit that transmits power to the second output shaft. Further, the distribution switching unit includes a first distribution switching member that selectively couples the first output shaft to the transmitting unit, and a second distribution switching member that selectively couples the second rotational element or the third rotational element to the transmitting unit, the first distribution switching member is switched among a first distribution state in which the second rotational element is coupled to the first output shaft in a case where the first output shaft is coupled to the transmitting unit, a first non-distribution state in which the second rotational element is coupled to the first output shaft in a case where the first output shaft is not coupled to the transmitting unit, and a second non-distribution state in which the third rotational element is coupled to the first output shaft in a case where the first output shaft is not coupled to the transmitting unit, the second distribution switching member is a member that also functions as the transmission switching unit, and is switched among an integrated state in which the second rotational element and the third rotational element are coupled, a fixed state in which the third rotational element is coupled to the fixing member, and a second distribution state in which the second rotational element is coupled to the transmitting unit, and the transmission switching unit is an engagement device, in which the second distribution switching member is an engagement element, and is switched between an engaged state in which the second distribution switching member is coupled to the fixing member, and a released state in which the second distribution switching member is rotatably released.

According to this configuration, by the first distribution switching member and the second distribution switching member, a non-distribution state in which the power of the input shaft is transmitted only to the first output shaft, and a distribution state in which a part of the power transmitted to the first output shaft is distributed to the transmitting unit can be switched.

Further, in a case where the second distribution switching member is in the fixed state and the planetary gear device is in the second mode, the input switching member can be switched between the first input state and the second input state, and the first distribution switching member can be switched between the first distribution state and the first non-distribution state, and in a case where the input switching member is in the first input state and the first distribution switching member is in the first distribution state when the planetary gear device is in the second mode, a driving state becomes a first driving state in which the power from the first power source and power of the motor are distributed to the main drive wheels and the auxiliary drive wheels via the planetary gear device, and the rotation of the input shaft and a rotation of the motor are transmitted to the main drive wheels and the auxiliary drive wheels with speeds thereof being changed by the planetary gear device.

According to this configuration, the power of the motor can be transmitted to the main drive wheels via the planetary gear device set to the first mode.

Further, in a case where the input switching member is in the second input state and the first distribution switching member is in the first non-distribution state when the planetary gear device is in the second mode, a driving state becomes a second driving state in which the power from the first power source is directly transmitted from the input shaft to the first output shaft, the power of the motor is transmitted to the first output shaft via the planetary gear device, and the power from the first power source and the power of the motor are not transmitted to the second output shaft.

According to this configuration, the power of the motor can be transmitted to the main drive wheels via the planetary gear device set to the first mode.

Further, in a case where the planetary gear device is in the third mode and the three rotational elements rotate integrally, the first distribution switching member can be switched among the first distribution state, the first non-distribution state, and the second non-distribution state.

According to this configuration, a connection relationship of the first distribution switching member can be switched in a state in which the planetary gear device is set to the third mode.

Further, in a case where the planetary gear device is in the second mode and the three rotational elements can make differential motions, the first distribution switching member is in the second non-distribution state, and the second distribution switching member is in the second distribution state.

With this configuration, it is possible to set the first distribution switching member to the second non-distribution state and the second distribution switching member to the second distribution state in a state in which the planetary gear device is set to the second mode.

The power transmission device further includes a transmitting unit that transmits power to the second output shaft. Further, the transmission switching unit includes a first engagement device in which the third rotational element is an engagement element, and which is switched between an engaged state in which the third rotational element is coupled to the fixing member, and a released state in which the third rotational element is rotatably released, and a second engagement device in which the second rotational element and the third rotational element are engagement elements and which is switched between an engaged state in which the second rotational element and the third rotational element are engaged, and a released state in which the second rotational element is released rotatably relative to the third rotational element, and the distribution switching unit has a distribution switching member that switches a first distribution state in which the first output shaft is coupled to the transmitting unit, and a second distribution state in which the third rotational element is coupled to the transmitting unit.

According to this configuration, it is possible to configure the transfer including the transmission switching unit including the first engagement device and the second engagement device.

Further, in a case where the planetary gear device is in the second mode and the three rotational elements can make differential motions, the first engagement device is in the released state, the second engagement device is in the released state, and the distribution switching member is in the second distribution state of not being coupled to the first output shaft.

According to this configuration, it is possible to release the first engagement device, release the second engagement device, and set the distribution switching member to the second distribution state in a state in which the planetary gear device is set to the second mode.

Further, in a case where the planetary gear device is in the first mode, the first engagement device is in the engaged state and couples the third rotational element to the fixing member, the second engagement device is in the released state and the second rotational element is rotatable, and the distribution switching member is in the first distribution state of not being coupled to the third rotational element.

According to this configuration, by engagement of the first engagement device, the planetary gear device can be set to the first mode and the distribution switching member can be set to the first distribution state.

The power transmission device further includes a transmitting unit that transmits power to the second output shaft. Further, the three rotational elements include a first rotational element coupled to the input shaft, a second rotational element, and a third rotational element coupled to the motor, the transmission switching unit includes a first engagement device in which the second rotational element is an engagement element and which is switched between an engaged state in which the second rotational element is coupled to the fixing member, and a released state in which the second rotational element is rotatably released, and a second engagement device in which the second rotational element and the third rotational element are engagement elements, and which is switched between an engaged state in which the second rotational element and the third rotational element are engaged, and a released state in which the third rotational element is released rotatably relative to the second rotational element, and the distribution switching unit includes a first distribution switching member that is a member also functioning as an input switching unit to switch connection destinations of the input shaft, and that selectively couples the input shaft or the transmitting unit to the first output shaft, and a second distribution switching member that selectively couples the second rotational element or the third rotational element to the transmitting unit.

According to this configuration, it becomes possible to apply, to the transfer, the planetary gear device in which the motor is coupled to the third rotational element.

Further, in a case where the planetary gear device is in the second mode and the three rotational elements can make differential motions, the first engagement device is in the released state, the second engagement device is in the released state, the first distribution switching member is in a non-distribution state in which the input shaft is directly coupled to the first output shaft without being coupled to the transmitting unit, and the second distribution switching member is in a first distribution state in which the second rotational element is coupled to the transmitting unit without being coupled to the third rotational element.

According to this configuration, the power of the motor can be transmitted to the drive wheels even in a case where the motor is coupled to the third rotational element.

Further, in a case where the planetary gear device is in the first mode, the first engagement device is in the engaged state and couples the second rotational element to the fixing member, the second engagement device is in the released state and the third rotational element is rotatable, the first distribution switching member is in a second distribution state in which the first output shaft is coupled to the transmitting unit without being coupled to the input shaft, and the second distribution switching member is in a third distribution state in which the third rotational element is coupled to the transmitting unit without being coupled to the second rotational element.

According to this configuration, even in a case where a motor is coupled to a third rotational element, power of the motor can be transmitted to drive wheels.

The power transmission device further includes a transmitting unit that transmits power to the second output shaft. Further, the three rotational elements include a first rotational element coupled to the motor, a second rotational element, and a third rotational element, the transmission switching unit includes an input switching member that selectively couples the input shaft to the first rotational element, the distribution switching unit includes a first distribution switching member that is a member also functioning as an input switching unit to switch connection destinations of the input shaft, and that selectively couples the first output shaft to the transmitting unit, and a second distribution switching member that selectively couples the second rotational element to the transmitting unit, the first distribution switching member is switched between a first distribution state in which the second rotational element is coupled to the first output shaft without being coupled to the input shaft in a case where the first output shaft is coupled to the transmitting unit, and a non-distribution state in which the input shaft is coupled to the first output shaft in a case where the first output shaft is not coupled to the transmitting unit, the second distribution switching member is switched among an integrated state in which the second rotational element and the third rotational element are coupled, a fixed state in which the third rotational element is coupled to the fixing member, and a second distribution state in which the second rotational element is coupled to the transmitting unit, and the transmission switching unit is an engagement device in which the second distribution switching member is an engagement element, and which is switched between an engaged state in which the second distribution switching member is coupled to the fixing member, and a released state in which the second distribution switching member is rotatably released.

According to this configuration, a connection relationship between the input shaft and the first output shaft can be switched by the first distribution switching member.

Further, in a case where the second distribution switching member is in the fixed state and the planetary gear device is in the second mode, the input switching member is in a first input state in which the input shaft is coupled to the first rotational element, and the first distribution switching member is in the first distribution state and couples the first output shaft to the transmitting unit.

According to this configuration, even with a configuration in which the connection relationship between the input shaft and the first output shaft is switched by the first distribution switching member, the first distribution switching member can couple the first output shaft to the transmitting unit.

Further, in a case where the planetary gear device is in the third mode and the three rotational elements rotate integrally, the input switching member is in a second input state in which the input shaft is not coupled to the first rotational element, the first distribution switching member is in the non-distribution state, and the second distribution switching member is in the fixed state. In a case where the planetary gear device is in the first mode, the input switching member is in a first input state in which the input shaft is coupled to the first rotational element, and the first distribution switching member is in the first distribution state and couples the first output shaft to a transmitting unit. In a case where the planetary gear device is in the second mode and the three rotational elements can make differential motions, the input switching member is in a second input state in which the input shaft is not coupled to the first rotational element, the first distribution switching member is in the non-distribution state, and the second distribution switching member is in the second distribution state and couples the second rotational element to the transmitting unit.

According to this configuration, even in a configuration in which a connection relationship between an input shaft and a first output shaft is switched by a first distribution switching member, the first distribution switching member can couple the first output shaft to a transmitting unit.

Further, the planetary gear device is a single pinion-type planetary gear device, the first rotational element is a sun gear, the second rotational element is a carrier, and the third rotational element is a ring gear.

According to this configuration, the planetary gear device can be configured by a single pinion type.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power transmission device comprising:
an input shaft that inputs power from a first power source;
a second power source;
a first output shaft that transmits power to first drive wheels;

a second output shaft that transmits power to second drive wheels;
a differential having three rotational elements; and
a connection switching device that selectively switches a connection relationship among the input shaft, the first output shaft, the second output shaft, and the three rotational elements, wherein
the connection switching device selectively fixes any one rotational element among the three rotational elements to a fixing member,
the second power source is coupled to rotational elements other than the rotational element fixed by the connection switching device to the fixing member among the three rotational elements,
the differential can be switched between a plurality of modes by the connection switching device, and
the plurality of modes includes
a first mode in which any one rotational element among the three rotational elements is coupled to the input shaft, one of the remaining rotational elements is fixed to the fixing member, and the other is coupled to the first output shaft, and
a second mode in which the three rotational elements are respectively coupled to the second power source, the first output shaft, and the second output shaft, wherein
the three rotational elements include a first rotational element coupled to the second power source, a second rotational element, and a third rotational element,
the connection switching device includes
an input switching unit that switches a connection destination of the input shaft, and
a fixation switching unit that can selectively fix any one rotational element among the three rotational elements to the fixing member,
the input switching unit is switched between a first input state in which the input shaft is coupled to the first rotational element, and a second input state in which the input shaft is directly coupled to the first output shaft,
the fixation switching unit is switched between a fixed state in which the third rotational element is coupled to the fixing member, and a non-fixed state in which the third rotational element is released rotatably,
in a case where the differential is in the first mode, the first rotational element is an input element, the second rotational element is an output element coupled to the first output shaft, and the third rotational element is a reaction force element fixed to the fixing member, the input switching unit is in the first input state and couples the input shaft to the first rotational element, and
in a case where the differential is in the second mode and the three rotational elements can make differential motions, the input switching unit is in the second input state and directly couples the input shaft to the first output shaft.

2. The power transmission device according to claim 1, wherein
the connection switching device includes a distribution switching unit that selectively couples the first output shaft to the second rotational element or the third rotational element, and
the distribution switching unit is switched between a first connection state in which the first output shaft is coupled to the second rotational element, and a second connection state in which the first output shaft is coupled to the third rotational element.

3. The power transmission device according to claim 2, wherein
in a case where the fixation switching unit is in the fixed state and the differential is in the first mode, the input switching unit can be switched between the first input state and the second input state, and
in a case where the input switching unit is in the first input state and the distribution switching unit is in the first connection state when the differential is in the first mode, a state becomes a driving state in which power from the first power source and power from the second power source are distributed to the first drive wheels and the second drive wheels via the differential and a rotation of the input shaft and a rotation of the second power source are transmitted to the first drive wheels and the second drive wheels with speeds thereof being changed by the differential.

4. The power transmission device according to claim 2, wherein
in a case where the differential is in the second mode and the three rotational elements can make differential motions, the distribution switching unit is in the second connection state.

5. The power transmission device according to claim 2, wherein
the plurality of modes includes a third mode in which two rotational elements among the three rotational elements are coupled to each other and any rotational element is coupled to either of the first output shaft and the second output shaft.

6. The power transmission device according to claim 5, wherein
the distribution switching unit can be switched to a third connection state in which the first output shaft is coupled to the second rotational element and the third rotational element, and
in a case where the distribution switching unit is in the third connection state, the differential is in the third mode, and the three rotational elements rotate integrally, the input switching unit can be switched between the first input state and the second input state.

7. The power transmission device according to claim 6, wherein
the distribution switching unit includes
a first distribution switching member that selectively couples the first output shaft to the second rotational element or the third rotational element, and
a second distribution switching member that selectively couples the second rotational element and the third rotational element,
the first distribution switching member is switched among the first connection state, the second connection state, and the third connection state,
the second distribution switching member is switched between a fourth connection state in which the second rotational element and the third rotational element are coupled, and a fifth connection state in which the second rotational element and the third rotational element are not coupled, and
in a case where the first distribution switching member is in the third connection state, the differential is in the third mode, and the three rotational elements rotate integrally, the input switching unit can be switched between the first input state and the second input state, and the second distribution switching member can be switched between the fourth connection state and the fifth connection state.

8. The power transmission device according to claim 5, wherein
the distribution switching unit includes
a first distribution switching member that selectively couples the first output shaft to the second rotational element or the third rotational element, and
a second distribution switching member that selectively couples the second rotational element and the third rotational element,
the first distribution switching member is switched between the first connection state and the second connection state,
the second distribution switching member is switched between a fourth connection state in which the second rotational element and the third rotational element are coupled, and a fifth connection state in which the second rotational element and the third rotational element are not coupled, and
in a case where the second distribution switching member is in the fourth connection state, the differential is in the third mode, and the three rotational elements rotate integrally, the input switching unit can be switched between the first input state and the second input state, and the first distribution switching member can be switched between the first connection state and the second connection state.

9. The power transmission device according to claim 2, wherein
the distribution switching unit can be switched to a sixth connection state in which the first output shaft is not coupled to any of the second rotational element and the third rotational element, and
in a case where the fixation switching unit is in the fixed state and the differential is in the first mode, the input switching unit can be switched between the first input state and the second input state, and the distribution switching unit can select the sixth connection state.

10. The power transmission device according to claim 9, wherein
the distribution switching unit can be switched to a seventh connection state in which the second rotational element and the third rotational element are coupled in a state of not being coupled to the first output shaft, and
in a case where the distribution switching unit is in the seventh connection state and the three rotational elements rotate integrally in the differential, the input switching unit can be switched between the first input state and the second input state.

11. The power transmission device according to claim 7, wherein
the distribution switching unit can be switched to a sixth connection state in which the first output shaft is not coupled to any of the second rotational element and the third rotational element, and
in a case where the second distribution switching member is in the fourth connection state, the differential is in the third mode, and the three rotational elements rotate integrally, the input switching unit can be switched between the first input state and the second input state, and the distribution switching unit can select the sixth connection state.

12. The power transmission device according to claim 7, wherein
the connection switching device includes a third distribution switching member that selectively couples the second rotational element and the second output shaft, and
the third distribution switching member is switched between an eighth connection state in which the second rotational element and the second output shaft are coupled, and a ninth connection state in which the second rotational element and the second output shaft are separated.

13. The power transmission device according to claim 12, wherein
in a case where the input switching unit is in the second input state, the first distribution switching member is in the first connection state, and the third distribution switching member is in the ninth connection state when the differential is in the first mode, a state becomes a driving state in which power of the second power source is transmitted to the first output shaft via the differential in a state in which power from the first power source is not transmitted to the first output shaft and the second output shaft and the power of the second power source is not transmitted to the second output shaft.

14. The power transmission device according to claim 12, wherein
in a case where the second distribution switching member is in the fourth connection state, the differential is in the third mode, and the three rotational elements rotate integrally, the third distribution switching member is set to the ninth connection state and the first distribution switching member can be switched between the first connection state and the second connection state.

15. The power transmission device according to claim 7, wherein
the connection switching device includes a third distribution switching member that selectively couples the second rotational element and the second output shaft,
the third distribution switching member is switched between an eighth connection state in which the second rotational element and the second output shaft are coupled, and a ninth connection state in which the second rotational element and the second output shaft are separated, and
in a case where the first distribution switching member is in the third connection state, the differential is in the third mode, and the three rotational elements rotate integrally, the third distribution switching member is set to the ninth connection state.

16. The power transmission device according to claim 7, wherein
the fixation switching unit includes
a first engagement device that is switched, with the third rotational element as an engaged element, between an engaged state in which the third rotational element is coupled to the fixing member, and a released state in which the third rotational element is released rotatably, and
the distribution switching unit includes
a second engagement device switched, with the second rotational element and the third rotational element as engaged elements, between an engaged state in which the second rotational element and the third rotational element are engaged, and a released state in which the second rotational element is released rotatably relative to the third rotational element.

17. The power transmission device according to claim 7, wherein
the fixation switching unit includes a first engagement device switched, with the third rotational element as an engaged element, between an engaged state in which the third rotational element is coupled to the fixing member, and a released state in which the third rotational element is released rotatably, and the second distribution switching member includes a second engagement device switched, with the second rotational element and the third rotational element as engaged elements, between an engaged state in which the second rotational element and the third rotational element are engaged, and a released state in which the second rotational element is released rotatably relative to the third rotational element.

18. The power transmission device according to claim 12, further comprising a transmitting unit that transmits power to the second output shaft, wherein the first distribution switching member is switched among a first distribution state in which the second rotational element is coupled to the first output shaft in a case where the first output shaft is coupled to the transmitting unit, a first non-distribution state in which the second rotational element is not coupled to the first output shaft in a case where the first output shaft is coupled to the transmitting unit, and a second non-distribution state in which the third rotational element is coupled to the first output shaft in a case where the first output shaft is not coupled to the transmitting unit, and the second distribution switching member is switched among an integrated state in which the second rotational element and the third rotational element are coupled, a fixed state in which the third rotational element is coupled to the fixing member, and a second distribution state in which the second rotational element is coupled to the transmitting unit.

19. The power transmission device according to claim 12, further comprising a transmitting unit that transmits power to the second output shaft, wherein the first distribution switching member can selectively couple the first output shaft to the transmitting unit, and is switched between a first distribution state in which the second rotational element is coupled to the first output shaft without being coupled to the input shaft in a case where the first output shaft is coupled to the transmitting unit, and a non-distribution state in which the input shaft is coupled to the first output shaft in a case where the first output shaft is not coupled to the transmitting unit, and the second distribution switching member can selectively couple the second rotational element to the transmitting unit, and is switched among an integrated state in which the second rotational element and the third rotational element are coupled, a fixed state in which the third rotational element is coupled to the fixing member, and a second distribution state in which the second rotational element is coupled to the transmitting unit.

20. The power transmission device according to claim 1, wherein the differential is a single pinion-type planetary gear device, the first rotational element is a sun gear, the second rotational element is a carrier, and the third rotational element is a ring gear.

* * * * *